US010782122B2

United States Patent
Ishigaki et al.

(10) Patent No.: US 10,782,122 B2
(45) Date of Patent: Sep. 22, 2020

(54) THREE-DIMENSIONAL MEASUREMENT DEVICE

(71) Applicant: CKD Corporation, Aichi (JP)

(72) Inventors: Hiroyuki Ishigaki, Aichi (JP); Takahiro Mamiya, Aichi (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 16/194,576

(22) Filed: Nov. 19, 2018

(65) Prior Publication Data
US 2019/0094016 A1    Mar. 28, 2019

Related U.S. Application Data

(63) Continuation of application No. PCT/JP2017/005425, filed on Feb. 15, 2017.

(30) Foreign Application Priority Data

May 26, 2016 (JP) ................. 2016-104911

(51) Int. Cl.
G01B 11/24      (2006.01)
G01N 21/88      (2006.01)
(Continued)

(52) U.S. Cl.
CPC ............... G01B 11/24 (2013.01); G01B 9/02 (2013.01); G01B 11/02 (2013.01); G01B 11/22 (2013.01);
(Continued)

(58) Field of Classification Search
CPC .......... G01B 11/24; G01B 9/02; G01B 11/02; G01B 11/22; G01B 9/02087;
(Continued)

(56) References Cited

U.S. PATENT DOCUMENTS 5,546,189 A * 8/1996 Svetkoff ................ G01B 11/24
  250/559.23
6,124,931 A * 9/2000 Hill .................... G01B 9/02007
  356/484

(Continued)

FOREIGN PATENT DOCUMENTS

JP    2000-74618 A    3/2000
JP    2000-310518 A   11/2000
(Continued)

OTHER PUBLICATIONS

International Search Report issued in corresponding International Application No. PCT/JP2017/005425 dated May 9, 2017 (3 pages).
(Continued)

Primary Examiner — Mohamed K Amara
(74) Attorney, Agent, or Firm — Osha Liang LLP

(57) ABSTRACT

A three-dimensional measurement device includes: an optical system that splits incident light into two lights, radiates one of the two lights as measurement light to a measurement object and the other as reference light to a reference surface, and recombines the two lights to emit combined light; a first irradiation unit that emits first light entering the optical system; a second irradiation unit that emits second light entering the optical system; a first imaging unit into which output light that is obtained from the first light and is emitted from the optical system enters; a second imaging unit into which output light that is obtained from the second light and is emitted from the optical system enters; and an image processor that executes three-dimensional measurement of the measurement object, based on interference fringe images taken by the first imaging unit and the second imaging unit.

17 Claims, 15 Drawing Sheets

(51) Int. Cl.
*G01B 11/02* (2006.01)
*G01B 9/02* (2006.01)
*G01N 21/956* (2006.01)
*G01B 11/22* (2006.01)
*G02B 27/28* (2006.01)

(52) U.S. Cl.
CPC .......... *G01N 21/88* (2013.01); *G01N 21/956* (2013.01); *G02B 27/283* (2013.01)

(58) Field of Classification Search
CPC ............ G01B 9/02081; G01B 2290/45; G01N 21/956; G01N 21/88; G02B 27/283
See application file for complete search history.

(56) References Cited

U.S. PATENT DOCUMENTS

| | | | | |
|---|---|---|---|---|
| 6,791,752 | B2* | 9/2004 | Sedlmayr | G02B 27/143 359/487.04 |
| 6,882,432 | B2* | 4/2005 | Deck | G01B 11/06 356/512 |
| 8,107,084 | B2* | 1/2012 | Davidson | G01B 9/02043 356/497 |
| 8,477,316 | B2* | 7/2013 | Holzapfel | G01B 9/0207 356/498 |
| 8,514,404 | B2* | 8/2013 | Podoleanu | A61B 5/0066 356/497 |
| 8,830,580 | B2* | 9/2014 | Kurtz | G03B 33/12 359/489.04 |
| 8,873,066 | B2* | 10/2014 | Ensher | G01B 9/02004 356/497 |
| 10,704,888 | B2* | 7/2020 | Ishigaki | G01B 9/02011 |
| 2001/0035961 | A1* | 11/2001 | Mitsutani | G01B 11/2441 356/512 |
| 2002/0093648 | A1* | 7/2002 | Nikoonahad | G01N 21/211 356/237.1 |
| 2004/0080754 | A1* | 4/2004 | Tobiason | G01B 9/02056 356/495 |
| 2004/0235205 | A1* | 11/2004 | Levy | G01N 21/211 438/14 |
| 2004/0239938 | A1* | 12/2004 | Izatt | G01B 9/02004 356/479 |
| 2005/0073590 | A1* | 4/2005 | Mamiya | G01B 11/24 348/222.1 |
| 2009/0262359 | A1* | 10/2009 | Bajraszewski | A61B 5/0066 356/454 |
| 2010/0068655 | A1* | 3/2010 | Moroe | G01B 11/03 430/322 |
| 2010/0268499 | A1* | 10/2010 | Holzapfel | G01B 9/0207 702/76 |
| 2011/0062314 | A1* | 3/2011 | Doege | H01L 27/14643 250/214 R |
| 2011/0109911 | A1* | 5/2011 | Podoleanu | A61B 3/102 356/451 |
| 2012/0138586 | A1* | 6/2012 | Webster | B23K 1/0056 219/121.64 |
| 2012/0212746 | A1* | 8/2012 | Hatada | G01B 9/02004 356/498 |
| 2013/0194582 | A1* | 8/2013 | Tokimitsu | G01B 11/14 356/498 |
| 2015/0055137 | A1* | 2/2015 | Brown | G01B 9/02091 356/479 |
| 2016/0062121 | A1* | 3/2016 | Border | G02B 30/34 359/630 |
| 2016/0334342 | A1* | 11/2016 | Chuang | H04N 5/3722 |
| 2018/0020912 | A1* | 1/2018 | Bublitz | G01B 9/02004 351/206 |
| 2019/0219379 | A1* | 7/2019 | Ishigaki | G01B 9/0201 |

FOREIGN PATENT DOCUMENTS

| | | |
|---|---|---|
| JP | 2001-227927 A | 8/2001 |
| JP | 2006-126192 A | 5/2006 |
| JP | 2010-164389 A | 7/2010 |
| JP | 2010-175499 A | 8/2010 |
| JP | 2017-53832 A | 3/2017 |
| WO | 2016/190151 A1 | 12/2016 |

OTHER PUBLICATIONS

Office Action issued in corresponding Japanese Application No. 2016-104911dated Oct. 3, 2017 (6 pages).

Office Action issued in corresponding Japanese Application No. 2016-104911 dated Jul. 18, 2017 (9 pages).

International Preliminary Report on Patentability for corresponding International Application No. PCT/JP2017/005425, dated Nov. 27, 2018 (25 pages).

* cited by examiner

⊙ Polarized light in the direction perpendicular to the sheet surface (S-polarized light)
↔ Polarized light in the direction parallel to the sheet surface (P-polarized light)
↻ Circularly polarized light
↗ Polarized light in the direction obliquely entering the sheet surface

- ⊙ Polarized light in the direction perpendicular to the sheet surface (S-polarized light)
- ↔ Polarized light in the direction parallel to the sheet surface (P-polarized light)
- ↻ Circularly polarized light
- ⤢ Polarized light in the direction obliquely entering the sheet surface

THREE-DIMENSIONAL MEASUREMENT DEVICE

BACKGROUND

Technical Field

The present invention relates to a three-dimensional measurement device configured to measure the shape of a measurement object.

Description of Related Art

A three-dimensional measurement device using an interferometer has been conventionally known as the three-dimensional measurement device configured to measure the shape of a measurement object.

In such a three-dimensional measurement device, half (for example, 750 nm) the wavelength of the measurement light (for example, 1500 nm) is a measurement range (dynamic range) that allows for measurement.

In the case of a measurement object that has a height difference equal to or greater than half the wavelength of the measurement light, this provides an insufficient measurement range and is likely to fail in appropriately measuring the shape of the measurement object. The longer wavelength of the measurement light, however, reduces the resolution and is likely to decrease the measurement accuracy.

By taking into account the foregoing, in order to deal with the insufficient measurement range, a recently proposed three-dimensional measurement device is configured to execute measurement by using two different lights having different wavelengths (for example, as described in Patent Literature 1).

This three-dimensional measurement device causes combined light of first wavelength light and second wavelength light to enter an interference optical system (for example, a polarizing beam splitter) and causes interfering light emitted from the interference optical system to be subjected to wavelength separation by a predetermined optical separating unit (for example, a dichroic mirror), so as to obtain interfering light with regard to the first wavelength light and interfering light with regard to the second wavelength light. The shape of a measurement object is then measured, based on interference fringe images obtained by individually taking images of the interfering lights with regard to the respective wavelength lights.

CITATION LIST

Patent Literature

PTL 1: JP 2010-164389A

In order to expand the measurement range in three-dimensional measurement by using two different lights having different wavelengths, there is a need to decrease the wavelength difference between the two different lights. The closer wavelengths of the two different lights provide the wider measurement range.

The closer wavelengths of the two different lights, however, cause difficulty in appropriately separating the wavelengths of the two different lights.

In other words, in three-dimensional measurement using two different lights having a small wavelength difference, there is a need to take an image of the interfering light with regard to the first wavelength light and an image of the interfering light with regard to the second wavelength light at different timings. This is likely to decrease the measurement efficiency.

For example, in three-dimensional measurement using the phase-shift method, when phases are changed in four different levels, there is a need to obtain four different image data. Accordingly, in the case of using two different lights, a required imaging time is for four imaging processes at different timings, i.e., a total of eight imaging processes.

SUMMARY

A three-dimensional measurement device according to one or more embodiments of the present invention uses lights having different wavelengths to expand the measurement range and to improve the measurement efficiency.

Embodiments of the present invention are described. Functions and advantageous effects according to one or more embodiments of the present invention are also described as appropriate.

A three-dimensional measurement device according to one or more embodiments of the present invention comprises: a predetermined optical system (specific optical system) configured to split predetermined incident light into two lights, to radiate one of the two lights as measurement light to a measurement object and the other of the two lights as reference light to a reference surface, and to recombine the two lights to combined light and emit the combined light; a first irradiation unit configured to emit first light that enters the predetermined optical system; a second irradiation unit configured to emit second light that enters the predetermined optical system; a first imaging unit configured such that output light with regard to the first light that is emitted from the predetermined optical system enters; a second imaging unit configured such that output light with regard to the second light that is emitted from the predetermined optical system enters; and an image processor configured to execute three-dimensional measurement of the measurement object, based on interference fringe images taken by the first imaging unit and the second imaging unit.

The first light and the second light enter different positions of the predetermined optical system, and the output light with regard to the first light and the output light with regard to the second light are emitted from different positions of the predetermined optical system.

The first irradiation unit comprises a first wavelength light emitter configured to emit first wavelength light that includes polarized light of a first wavelength (for example, 491 nm) and/or a second wavelength light emitter configured to emit second wavelength light that includes polarized light of a second wavelength (for example, 540 nm), and is configured to emit the first light including the polarized light of the first wavelength and/or the polarized light of the second wavelength.

The second irradiation unit comprises a third wavelength light emitter configured to emit third wavelength light that includes polarized light of a third wavelength (for example, 488 nm) and/or a fourth wavelength light emitter configured to emit fourth wavelength light that includes polarized light of a fourth wavelength (for example, 532 nm), and is configured to emit the second light including the polarized light of the third wavelength and/or the polarized light of the fourth wavelength.

The first imaging unit comprises a first wavelength light imaging unit configured to take an image of output light with regard to the polarized light of the first wavelength, which is included in the output light with regard to the first light emitted from the predetermined optical system when the first light including the polarized light of the first wavelength enters the predetermined optical system; and/or a second wavelength light imaging unit configured to take an image of output light with regard to the polarized light of the second wavelength, which is included in the output light with regard to the first light emitted from the predetermined optical system when the first light including the polarized light of the second wavelength enters the predetermined optical system.

The second imaging unit comprises: a third wavelength light imaging unit configured to take an image of output light with regard to the polarized light of the third wavelength, which is included in the output light with regard to the second light emitted from the predetermined optical system when the second light including the polarized light of the third wavelength enters the predetermined optical system; and/or a fourth wavelength light imaging unit configured to take an image of output light with regard to the polarized light of the fourth wavelength, which is included in the output light with regard to the second light emitted from the predetermined optical system when the second light including the polarized light of the fourth wavelength enters the predetermined optical system.

The "output light with regard to the first light" output from the "predetermined optical system (specific optical system)" includes "combined light of the reference light and the measurement light with regard to the first light or interfering light by interference of the combined light", and the "output light with regard to the second light" includes "combined light of the reference light and the measurement light with regard to the second light or interfering light by interference of the combined light". The same applies hereinafter.

Accordingly, the "output light with regard to the polarized light of the first wavelength" included in the "output light with regard to the first light" includes "combined light of the reference light and the measurement light with regard to the polarized light of the first wavelength or interfering light by interference of the combined light", and the "output light with regard to the polarized light of the second wavelength" includes "combined light of the reference light and the measurement light with regard to the polarized light of the second wavelength or interfering light by interference of the combined light".

The "output light with regard to the polarized light of the third wavelength" included in the "output light with regard to the second light" includes "combined light of the reference light and the measurement light with regard to the polarized light of the second wavelength or interfering light by interference of the combined light", and the "output light with regard to the polarized light of the fourth wavelength" includes "combined light of the reference light and the measurement light with regard to the polarized light of the fourth wavelength or interfering light by interference of the combined light".

Accordingly, the "predetermined optical system" includes not only "an optical system that causes interference of the reference light and the measurement light inside thereof and outputs the reference light and the measurement light as interfering lights" but "an optical system that outputs the reference light and the measurement light as simple combined light without causing interference of the reference light and the measurement light inside thereof". When the "output light" output from the "predetermined optical system" is "combined light", the combined light is to be converted into "interfering light" by means of a predetermined interfering unit in a stage at least prior to imaging by an "imaging unit", in order to take "interference fringe images". The same applies hereinafter.

Accordingly, an optical system configured to split predetermined incident light into two lights, to radiate one of the lights as measurement light to a measurement object and the other of the lights as reference light to a reference surface, and to recombine the two lights to combined light and emit the combined light for the purpose of causing interference of lights (taking interference fringe images) may be called "interference optical system". Accordingly, the "predetermined optical system (specific optical system)" may be regarded as "interference optical system."

The "first light" emitted from the "first irradiation unit" may be any light including at least the "polarized light of the first wavelength" and/or the "polarized light of the second wavelength" and may be light (for example, "unpolarized light" or "circularly polarized light") including another extra component that is to be subsequently cut in the "predetermined optical system" or the like.

Similarly, the "first wavelength light" emitted from the "first wavelength light emitter" may be any light including at least the "polarized light of the first wavelength" and may be light including another extra component. The "second wavelength light" emitted from the "second wavelength light emitter" may be any light including at least the "polarized light of the second wavelength" and may be light including another extra component.

The "second light" emitted from the "second irradiation unit" may be any light including at least the "polarized light of the third wavelength" and/or the "polarized light of the fourth wavelength" and may be light (for example, "unpolarized light" or "circularly polarized light") including another extra component that is to be subsequently cut in the "predetermined optical system" or the like.

Similarly, the "third wavelength light" emitted from the "third wavelength light emitter" may be any light including at least the "polarized light of the third wavelength" and may be light including another extra component. The "fourth wavelength light" emitted from the "fourth wavelength light emitter" may be any light including at least the "polarized light of the fourth wavelength" and may be light including another extra component.

The configuration according to one or more embodiments of the present invention causes the first light and the second light to enter different positions of the predetermined optical system and thereby causes the "first light" and the "second light" to be separately emitted from different positions of the predetermined optical system without interfering with each other.

This configuration enables two different polarized lights having close wavelengths to be used as the polarized light included in the "first light" ("polarized light of the first wavelength" and/or "polarized light of the second wavelength") and the polarized light included in the "second light" ("polarized light of the third wavelength" and/or "polarized light of the fourth wavelength"). As a result, this configuration uses the two different polarized lights having close wavelengths to further expand the measurement range in three-dimensional measurement. Especially, the configuration according to one or more embodiments of the present invention uses four different lights of different wavelengths at most. This remarkably expands the measurement range.

Additionally, the configuration according to one or more embodiments of the present invention enables imaging of the output light with regard to the first light ("output light with regard to the polarized light of the first wavelength"

and/or "output light with regard to the polarized light of the second wavelength") and imaging of the output light with regard to the second light ("output light with regard to the polarized light of the third wavelength" and/or "output light with regard to the polarized light of the fourth wavelength") to be executed individually and simultaneously. As a result, this shortens the total imaging time and improves the measurement efficiency. Especially, the configuration according to one or more embodiments of the present invention enables imaging of the output lights with regard to the four different polarized lights at most to be executed individually and simultaneously. This remarkably improves the measurement efficiency and the like.

A configuration that uses a plurality of interference optical systems (interferometer modules) to measure a measurement object may be employed as a configuration that uses a plurality of lights. This configuration, however, uses a different reference surface as the standard for each interference optical system and causes the plurality of lights to have different optical path intervals that respectively give optical path differences between the reference light and the measurement light. This is likely to decrease the measurement accuracy. Additionally, it is difficult to make the optical path lengths of the plurality of interference optical systems precisely equal to one another, and an operation for such adjustment also has extreme difficulty.

The configuration according to one or more embodiments of the present invention, on the other hand, uses a plurality of lights for one interference optical system (predetermined optical system) including one reference surface as the standard and accordingly causes the plurality of lights to have an identical optical path interval that gives an optical path difference between the reference light and the measurement light. As a result, this configuration prevents various troubles caused by providing a plurality of interference optical systems.

Furthermore, the configuration according to one or more embodiments of the present invention enables measurement using two different polarized lights, for example, the "polarized light of the first wavelength" and the "polarized light of the third wavelength" and measurement using two different polarized lights, for example, the "polarized light of the second wavelength" and the "polarized light of the fourth wavelength" to be changed over according to the type of the measurement object. Accordingly, the configuration according to one or more embodiments of the present invention uses two different polarized lights having close wavelengths to expand the measurement range, while changing over the type (wavelength) of the light according to the type of the measurement object. As a result, this improves the convenience and the versatility.

For example, a measurement object such as a wafer substrate, for which red color light is not suitable, may be subjected to measurement using two different polarized lights, the "polarized light of the first wavelength" and the "polarized light of the third wavelength" (two lights in blue color of, for example, 491 nm and 488 nm). A measurement object such as copper, for which blue color light is not suitable, may be subjected to measurement using two different polarized lights, the "polarized light of the second wavelength" and the "polarized light of the fourth wavelength" (two lights in green color of, for example, 540 nm and 532 nm). The wavelengths of the respective polarized lights are not limited to the above example, but polarized lights of other wavelengths may be employed.

A three-dimensional measurement device according to one or more embodiments of the present invention comprises: a predetermined optical system (specific optical system) configured to split predetermined incident light into two polarized lights having polarizing direction that are orthogonal to each other, to radiate one of the polarized lights as measurement light to a measurement object and the other of the polarized lights as reference light to a reference surface, and to recombine the two polarized lights to combined light and emit the combined light; a first irradiation unit configured to emit first light that enters the predetermined optical system; a second irradiation unit configured to emit second light that enters the predetermined optical system; a first imaging unit configured such that output light with regard to the first light that is emitted from the predetermined optical system enters; a second imaging unit configured such that output light with regard to the second light that is emitted from the predetermined optical system enters; and an image processor configured to execute three-dimensional measurement of the measurement object, based on interference fringe images taken by the first imaging unit and the second imaging unit.

The first light and the second light enter different positions of the predetermined optical system.

The predetermined optical system is configured: to split the first light into the reference light that is polarized light having a first polarizing direction (for example, P-polarized light) and the measurement light that is polarized light having a second polarizing direction (for example, S-polarized light); to split the second light into the reference light that is polarized light having the second polarizing direction and the measurement light that is polarized light having the first polarizing direction; and to cause output light with regard to the first light generated by recombining the split lights and output light with regard to the second light generated by recombining the split lights to be emitted from different positions of the predetermined optical system.

The first irradiation unit comprises a first wavelength light emitter configured to emit first wavelength light that includes polarized light of a first wavelength and/or a second wavelength light emitter configured to emit second wavelength light that includes polarized light of a second wavelength, and is configured to emit the first light including the polarized light of the first wavelength and/or the polarized light of the second wavelength.

The second irradiation unit comprises a third wavelength light emitter configured to emit third wavelength light that includes polarized light of a third wavelength and/or a fourth wavelength light emitter configured to emit fourth wavelength light that includes polarized light of a fourth wavelength, and is configured to emit the second light including the polarized light of the third wavelength and/or the polarized light of the fourth wavelength.

The first imaging unit comprises: a first wavelength light imaging unit configured to take an image of output light with regard to the polarized light of the first wavelength, which is included in the output light with regard to the first light emitted from the predetermined optical system when the first light including the polarized light of the first wavelength enters the predetermined optical system; and/or a second wavelength light imaging unit configured to take an image of output light with regard to the polarized light of the second wavelength, which is included in the output light with regard to the first light emitted from the predetermined optical system when the first light including the polarized light of the second wavelength enters the predetermined optical system.

The second imaging unit comprises: a third wavelength light imaging unit configured to take an image of output light with regard to the polarized light of the third wavelength, which is included in the output light with regard to the second light emitted from the predetermined optical system when the second light including the polarized light of the third wavelength enters the predetermined optical system; and/or a fourth wavelength light imaging unit configured to take an image of output light with regard to the polarized light of the fourth wavelength, which is included in the output light with regard to the second light emitted from the predetermined optical system when the second light including the polarized light of the fourth wavelength enters the predetermined optical system.

The configuration according to one or more embodiments of the present invention causes the "first light" ("polarized light of the first wavelength" and/or "polarized light of the second wavelength") and the "second light" ("polarized light of the third wavelength" and/or "polarized light of the fourth wavelength") to enter different positions of the predetermined optical system. This causes the reference light and the measurement light with regard to the "first light" and the reference light and the measurement light with regard to the "second light" to be respectively split into different polarized light components (P-polarized light or S-polarized light). This accordingly enables the "first light" and the "second light" that enter the predetermined optical system to be separately emitted from the predetermined optical system without interfering with each other.

One or more embodiments of the present invention can thus implement the configuration of the aforementioned embodiments by the relatively simple configuration based on the principle of the Michelson interferometer or the Mach-Zehnder interferometer.

A three-dimensional measurement device according to one or more embodiments of the present invention comprises: a predetermined optical system (specific optical system) configured to split predetermined incident light into two lights, to radiate one of the two lights as measurement light to a measurement object and the other of the two lights as reference light to a reference surface, and to recombine the two lights to combined light and emit the combined light; a first irradiation unit configured to emit first light that enters a first input-output element of the predetermined optical system: a second irradiation unit configured to emit second light that enters a second input-output element of the predetermined optical system; a first imaging unit configured such that output light with regard to the first light, which is emitted from the second input-output element when the first light enters the first input-output element, enters; a second imaging unit configured such that output light with regard to the second light, which is emitted from the first input-output element when the second light enters the second input-output element, enters; and an image processor configured to execute three-dimensional measurement of the measurement object, based on interference fringe images taken by the first imaging unit and the second imaging unit.

The first irradiation unit comprises a first wavelength light emitter configured to emit first wavelength light that includes polarized light of a first wavelength and/or a second wavelength light emitter configured to emit second wavelength light that includes polarized light of a second wavelength, and is configured to emit the first light including the polarized light of the first wavelength and/or the polarized light of the second wavelength.

The second irradiation unit comprises a third wavelength light emitter configured to emit third wavelength light that includes polarized light of a third wavelength and/or a fourth wavelength light emitter configured to emit fourth wavelength light that includes polarized light of a fourth wavelength, and is configured to emit the second light including the polarized light of the third wavelength and/or the polarized light of the fourth wavelength.

The first imaging unit comprises: a first wavelength light imaging unit configured to take an image of output light with regard to the polarized light of the first wavelength, which is included in the output light with regard to the first light emitted from the second input-output element when the first light including the polarized light of the first wavelength enters the first input-output element; and/or a second wavelength light imaging unit configured to take an image of output light with regard to the polarized light of the second wavelength, which is included in the output light with regard to the first light emitted from the second input-output element when the first light including the polarized light of the second wavelength enters the first input-output element.

The second imaging unit comprises: a third wavelength light imaging unit configured to take an image of output light with regard to the polarized light of the third wavelength, which is included in the output light with regard to the second light emitted from the first input-output element when the second light including the polarized light of the third wavelength enters the second input-output element; and/or a fourth wavelength light imaging unit configured to take an image of output light with regard to the polarized light of the fourth wavelength, which is included in the output light with regard to the second light emitted from the first input-output element when the second light including the polarized light of the fourth wavelength enters the second input-output element.

The configuration according to one or more embodiments of the present invention causes the "first light" ("polarized light of the first wavelength" and/or "polarized light of the second wavelength") and the "second light" ("polarized light of the third wavelength" and/or "polarized light of the fourth wavelength") to enter different positions (first input-output element and second input-output element) of the predetermined optical system. This causes the "first light" and the "second light" to pass through an identical optical path in reverse directions and to be emitted separately from different positions (first input-output element and second input-output element) of the predetermined optical system without interfering from each other. As a result, this configuration has the similar functions and advantageous effects to those of the configuration of the aforementioned embodiments and the like.

In order to make the configuration according to one or more embodiments of the present invention serve more appropriately, "the polarizing direction of the first light ("polarized light of the first wavelength" and/or "polarized light of the second wavelength") that enters the first input-output element is identical with the polarizing direction of the output light with regard to the second light ("polarized light of the third wavelength" and/or "polarized light of the fourth wavelength") that is emitted from the first input-output element" and that "the polarizing direction of the second light ("polarized light of the third wavelength" and/or "polarized light of the fourth wavelength") that enters the second input-output element is identical with the polarizing direction of the output light with regard to the first light ("polarized light of the first wavelength" and/or "polarized light of the second wavelength") that is emitted from the second input-output element, when the measurement object is arranged to be flush with the reference surface". The same applies to one or more embodiments of the present invention described below.

Similarly, "the polarizing direction of the first light ("polarized light of the first wavelength" and/or "polarized light of the second wavelength") differs from the polarizing direction of the second light ("polarized light of the third wavelength" and/or "polarized light of the fourth wavelength") by 90 degrees, when the incident direction of the first light entering the first input-output element is aligned with the incident direction of the second light entering the second input-output element on a plane including both the incident directions".

Additionally, "the polarizing direction of the first light ("polarized light of the first wavelength" and/or "polarized light of the second wavelength") or its measurement light or reference light that travels in an identical direction on an identical axial line (for example, toward the measurement object or toward the reference surface) in the predetermined optical system differs from the polarizing direction of the second light ("polarized light of the third wavelength" and/or "polarized light of the fourth wavelength") or its measurement light or reference light by 90 degrees".

A three-dimensional measurement device according to one or more embodiments of the present invention comprises: a polarizing beam splitter configured to have a boundary surface that splits predetermined incident light into two polarized lights having polarizing directions that are orthogonal to each other, to radiate one of the split polarized lights as measurement light to a measurement object and the other of the split polarized lights as reference light to a reference surface, and to recombine the two split polarized lights to combined light and emit the combined light; a first irradiation unit configured to emit first light that enters a first surface as a first input-output element of the polarizing beam splitter, out of the first surface and a second surface of the polarizing beam splitter arranged to adjoin to each other across the boundary surface; a second irradiation unit configured to emit second light that enters the second surface as a second input-output element of the polarizing beam splitter; a first quarter wave plate placed between the reference surface and a third surface of the polarizing beam splitter which the reference light enters and is emitted from; a second quarter wave plate placed between the measurement object and a fourth surface of the polarizing beam splitter which the measurement light enters and is emitted from; a first imaging unit configured such that output light with regard to the first light, which is emitted from the second surface when the first light enters the first surface of the polarizing beam splitter, enters; a second imaging unit configured such that output light with regard to the second light, which is emitted from the first surface when the second light enters the second surface of the polarizing beam splitter, enters; and an image processor configured to execute three-dimensional measurement of the measurement object, based on interference fringe images taken by the first imaging unit and the second imaging unit.

The first irradiation unit comprises a first wavelength light emitter configured to emit first wavelength light that includes polarized light of a first wavelength and/or a second wavelength light emitter configured to emit second wavelength light that includes polarized light of a second wavelength, and is configured to emit the first light including the polarized light of the first wavelength and/or the polarized light of the second wavelength.

The second irradiation unit comprises a third wavelength light emitter configured to emit third wavelength light that includes polarized light of a third wavelength and/or a fourth wavelength light emitter configured to emit fourth wavelength light that includes polarized light of a fourth wavelength, and is configured to emit the second light including the polarized light of the third wavelength and/or the polarized light of the fourth wavelength.

The first imaging unit comprises: a first wavelength light imaging unit configured to take an image of output light with regard to the polarized light of the first wavelength, which is included in the output light with regard to the first light emitted from the second surface when the first light including the polarized light of the first wavelength enters the first surface; and/or a second wavelength light imaging unit configured to take an image of output light with regard to the polarized light of the second wavelength, which is included in the output light with regard to the first light emitted from the second surface when the first light including the polarized light of the second wavelength enters the first surface.

The second imaging unit comprises: a third wavelength light imaging unit configured to take an image of output light with regard to the polarized light of the third wavelength, which is included in the output light with regard to the second light emitted from the first surface when the second light including the polarized light of the third wavelength enters the second surface; and/or a fourth wavelength light imaging unit configured to take an image of output light with regard to the polarized light of the fourth wavelength, which is included in the output light with regard to the second light emitted from the first surface when the second light including the polarized light of the fourth wavelength enters the second surface.

One or more embodiments of the present invention can implement the configuration of the aforementioned embodiments by the relatively simple configuration based on the principle of the Michelson interferometer.

The "polarizing beam splitter" has the boundary surface that serves to transmit polarized light having a first polarizing direction (for example, P-polarized light) and to reflect polarized light having a second polarizing direction (for example, S-polarized light). Accordingly, the first light entering the first surface of the polarizing beam splitter is split into, for example, reference light that is the polarized light having the first polarizing direction (for example, P-polarized light) and measurement light that is the polarized light having the second polarizing direction (for example, S-polarized light). The second light entering the second surface of the polarizing beam splitter is split into, for example, reference light that is the polarized light having the second polarizing direction (for example, S-polarized light) and measurement light that is the polarized light having the first polarizing direction (for example, P-polarized light). The same applied to one or more embodiments of the present invention described later.

The configuration according to one or more embodiments of the present invention causes the "first light" ("polarized light of the first wavelength" and/or "polarized light of the second wavelength") and the "second light" ("polarized light of the third wavelength" and/or "polarized light of the fourth wavelength") to enter different positions (first surface and second surface) of the predetermined optical system. This causes the reference light and the measurement light with regard to the "first light" and the reference light and the measurement light with regard to the "second light" to be respectively split into different polarized light components (P-polarized light or S-polarized light). This accordingly enables the "first light" and the "second light" to be separately emitted from the predetermined optical system without interfering with each other.

In the case where a plurality of different lights having different wavelengths are used, the "quarter wave plate"

commonly used for all the lights is likely to fail in serving appropriately with an increase in wavelength difference between the respective lights. Accordingly, lights having small wavelength differences are used at least to such a degree as to ensure appropriate functions of the "quarter wave plate" in the relationship between the "polarized light of the first wavelength" and the "polarized light of the second wavelength" included in the "first light" and the relationship between the "polarized light of the third wavelength" and the "polarized light of the fourth wavelength" included in the "second light", as well as in the relationship between the "first light" ("polarized light of the first wavelength" and/or "polarized light of the second wavelength") and the "second light" ("polarized light of the third wavelength" and/or "polarized light of the fourth wavelength"), although this depends on the performances of the "quarter wave plate".

A three-dimensional measurement device according to one or more embodiments of the present invention comprises: a first irradiation unit configured to emit first light; a second irradiation unit configured to emit second light; a first polarizing beam splitter configured to split the first light entering from the first irradiation unit into two polarized lights having polarizing directions that are orthogonal to each other, to radiate one of the polarized lights as measurement light to a measurement object and the other of the polarized lights as reference light to a reference surface, and to serve as a first input-output element that combines measurement light with regard to the second light entering via the measurement object with reference light with regard to the second light entering via the reference surface to combined light and emits the combined light; a second polarizing beam splitter configured to split the second light entering from the second irradiation unit into two polarized lights having polarizing directions that are orthogonal to each other, to radiate one of the polarized lights as measurement light to the measurement object and the other of the polarized lights as reference light to the reference surface, and to serve as a second input-output element that combines measurement light with regard to the first light entering via the measurement object with reference light with regard to the first light entering via the reference surface to combined light and emits the combined light; a first quarter wave plate placed between the first polarizing beam splitter and the reference surface; a second quarter wave plate placed between the first polarizing beam splitter and the measurement object; a third quarter wave plate placed between the second polarizing beam splitter and the reference surface; a fourth quarter wave plate placed between the second polarizing beam splitter and the measurement object; a first imaging unit configured such that output light with regard to the first light, which is emitted from the second polarizing beam splitter when the first light enters the first polarizing beam splitter, enters; a second imaging unit configured such that output light with regard to the second light, which is emitted from the first polarizing beam splitter when the second light enters the second polarizing beam splitter, enters; and an image processor configured to execute three-dimensional measurement of the measurement object, based on interference fringe images taken by the first imaging unit and the second imaging unit.

The first irradiation unit comprises a first wavelength light emitter configured to emit first wavelength light that includes polarized light of a first wavelength and/or a second wavelength light emitter configured to emit second wavelength light that includes polarized light of a second wavelength, and is configured to emit the first light including the polarized light of the first wavelength and/or the polarized light of the second wavelength.

The second irradiation unit comprises a third wavelength light emitter configured to emit third wavelength light that includes polarized light of a third wavelength and/or a fourth wavelength light emitter configured to emit fourth wavelength light that includes polarized light of a fourth wavelength, and is configured to emit the second light including the polarized light of the third wavelength and/or the polarized light of the fourth wavelength.

The first imaging unit comprises: a first wavelength light imaging unit configured to take an image of output light with regard to the polarized light of the first wavelength, which is included in the output light with regard to the first light emitted from the second polarizing beam splitter when the first light including the polarized light of the first wavelength enters the first polarizing beam splitter; and/or a second wavelength light imaging unit configured to take an image of output light with regard to the polarized light of the second wavelength, which is included in the output light with regard to the first light emitted from the second polarizing beam splitter when the first light including the polarized light of the second wavelength enters the first polarizing beam splitter.

The second imaging unit comprises: a third wavelength light imaging unit configured to take an image of output light with regard to the polarized light of the third wavelength, which is included in the output light with regard to the second light emitted from the first polarizing beam splitter when the second light including the polarized light of the third wavelength enters the second polarizing beam splitter; and/or a fourth wavelength light imaging unit configured to take an image of output light with regard to the polarized light of the fourth wavelength, which is included in the output light with regard to the second light emitted from the first polarizing beam splitter when the second light including the polarized light of the fourth wavelength enters the second polarizing beam splitter.

One or more embodiments of the present invention can implement the configuration of the aforementioned embodiments by the relatively simple configuration based on the principle of the Mach-Zehnder interferometer.

A three-dimensional measurement device according to one or more embodiments of the present invention comprises: a polarizing beam splitter configured to have a boundary surface that transmits or reflects polarizing light having a first polarizing direction (for example, P-polarized light) and that reflects or transmits polarized light having a second polarizing direction (for example, S-polarized light); a first irradiation unit configured to emit first light that include the polarized light having the first polarizing direction and that enters a first surface as a first input-output element of the polarizing beam splitter, out of the first surface and a second surface of the polarizing beam splitter arranged to adjoin to each other across the boundary surface; a second irradiation unit configured to emit second light that includes the polarized light having the second polarizing direction and that enters the second surface as a second input-output element of the polarizing beam splitter; a quarter wave plate arranged to be opposed to a predetermined surface (for example, third surface or fourth surface) of the polarizing beam splitter, from which the first light transmitted through or reflected by the boundary surface and the second light reflected by or transmitted through the boundary surface are emitted; a half mirror (reference surface) arranged to be opposed to the quarter wave plate on an opposite side to the polarizing beam splitter and configured to transmit part of light radiated via the quarter wave plate as measurement light and radiate the measurement light to a measurement object, while reflecting remaining part of the light as reference light; a first imaging unit configured such that output light with regard to the first light, which is emitted from the second surface when the first light enters the first surface of the polarizing beam splitter, enters; a second imaging unit configured such that output light with regard to the second light, which is emitted from the first surface when the second light enters the second surface of the polarizing beam splitter, enters; and an image processor configured to execute three-dimensional measurement of the measurement object, based on interference fringe images taken by the first imaging unit and the second imaging unit.

The first irradiation unit comprises a first wavelength light emitter configured to emit first wavelength light that includes polarized light of a first wavelength and/or a second wavelength light emitter configured to emit second wavelength light that includes polarized light of a second wavelength, and is configured to emit the first light including the polarized light of the first wavelength and/or the polarized light of the second wavelength.

The second irradiation unit comprises a third wavelength light emitter configured to emit third wavelength light that includes polarized light of a third wavelength and/or a fourth wavelength light emitter configured to emit fourth wavelength light that includes polarized light of a fourth wavelength, and is configured to emit the second light including the polarized light of the third wavelength and/or the polarized light of the fourth wavelength.

The first imaging unit comprises: a first wavelength light imaging unit configured to take an image of output light with regard to the polarized light of the first wavelength, which is included in the output light with regard to the first light emitted from the second surface when the first light including the polarized light of the first wavelength enters the first surface; and/or a second wavelength light imaging unit configured to take an image of output light with regard to the polarized light of the second wavelength, which is included in the output light with regard to the first light emitted from the second surface when the first light including the polarized light of the second wavelength enters the first surface.

The second imaging unit comprises: a third wavelength light imaging unit configured to take an image of output light with regard to the polarized light of the third wavelength, which is included in the output light with regard to the second light emitted from the first surface when the second light including the polarized light of the third wavelength enters the second surface; and/or a fourth wavelength light imaging unit configured to take an image of output light with regard to the polarized light of the fourth wavelength, which is included in the output light with regard to the second light emitted from the first surface when the second light including the polarized light of the fourth wavelength enters the second surface.

One or more embodiments of the present invention can implement the configuration of the aforementioned embodiments by the relatively simple configuration based on the principle of the Fizeau interferometer.

The three-dimensional measurement device described in the aforementioned embodiments may further comprise a first light guiding unit configured to cause at least part of the first light emitted from the first irradiation unit to enter the first input-output element and to cause at least part of the output light with regard to the second light emitted from the first input-output element to enter the second imaging unit; and a second light guiding unit configured to cause at least part of the second light emitted from the second irradiation unit to enter the second input-output element and to cause a least part of the output light with regard to the first light emitted from the second input-output element to enter the first imaging unit.

One or more embodiments of the present invention can implement the configuration of the aforementioned embodiments by the relatively simple configuration.

One exemplary configuration may "comprise a first non-polarizing beam splitter (for example, a half mirror) configured to transmit part of the first light emitted from the first irradiation unit and reflect remaining part of the first light, to cause transmitted light or reflected light of the first light to enter the first input-output element, to transmit part of output light with regard to the second light emitted from the first input-output element and reflect remaining part of the output light, and to cause transmitted light or reflected light of the second light to enter the second imaging unit; and a second non-polarizing beam splitter (for example, a half mirror) configured to transmit part of the second light emitted from the second irradiation unit and reflect remaining part of the second light, to cause transmitted light or reflected light of the second light to enter the second input-output element, to transmit part of output light with regard to the first light emitted from the second input-output element and reflect remaining part of the output light, and to cause transmitted light or reflected light of the first light to enter the first imaging unit.

In the three-dimensional measurement device described in the aforementioned embodiments, the first irradiation unit may comprise a first light isolator configured to transmit only light in one direction emitted from the first wavelength light emitter and to block light in a reverse direction; and/or a second light isolator configured to transmit only light in one direction emitted from the second wavelength light emitter and to block light in a reverse direction. The second irradiation unit may comprise a third light isolator configured to transmit only light in one direction emitted from the third wavelength light emitter and to block light in a reverse direction; and/or a fourth light isolator configured to transmit only light in one direction emitted from the fourth wavelength light emitter and to block light in a reverse direction.

In the case where a non-polarizing beam splitter is provided as the light guiding unit of the aforementioned embodiments, the non-polarizing beam splitter serves to transmit part of the light emitted from the input-output element and to reflect remaining part of the light. While one of the transmitted light and the reflected light of this light enters the imaging unit, the other of the transmitted light and the reflected light that does not enter the imaging unit travels toward the irradiation unit. The other light entering a light source (wavelength light emitter) is likely to damage the light source or destabilize the operation of the light source.

The configuration according to one or more embodiments of the present invention, on the other hand, includes the light isolators to prevent damage and destabilization of the light source.

In the three-dimensional measurement device described in the aforementioned embodiments, the first irradiation unit may comprise a first combining unit configured to combine the first wavelength light emitted from the first wavelength light emitter and the second wavelength light emitted from the second wavelength light emitter, as the first light. The second irradiation unit may comprise a second combining unit configured to combine the third wavelength light emitted from the third wavelength light emitter and the fourth wavelength light emitted from the fourth wavelength light emitter, as the second light. The first imaging unit may comprise a first separating unit configured to separate the output light with regard to the first light (for example, emitted from the second input-output element) into the output light with regard to the polarized light of the first wavelength and the output light with regard to the polarized light of the second wavelength when the first light including the polarized light of the first wavelength and the polarized light of the second wavelength is emitted from the first irradiation unit. The second imaging unit may comprise a second separating unit configured to separate the output light with regard to the second light (for example, emitted from the first input-output element) into the output light with regard to the polarized light of the third wavelength and the output light with regard to the polarized light of the fourth wavelength when the second light including the polarized light of the third wavelength and the polarized light of the fourth wavelength is emitted from the second irradiation unit.

The configuration according to one or more embodiments of the present invention causes the combined light of the first wavelength light and the second wavelength light to enter a predetermined optical system (for example, a polarizing beam splitter). The output light emitted from the predetermined optical system is subjected to wavelength separation by means of a separating unit (for example, a dichroic mirror). Accordingly, this configuration obtains output light with regard to the polarized light of the first wavelength and output light with regard to the polarized light of the second wavelength.

Similarly, the configuration according to one or more embodiments of the present invention causes the combined light of the third wavelength light and the fourth wavelength light to enter a predetermined optical system (for example, a polarizing beam splitter). The output light emitted from the predetermined optical system is subjected to wavelength separation by means of a separating unit (for example, a dichroic mirror). Accordingly, this configuration obtains output light with regard to the polarized light of the third wavelength and output light with regard to the polarized light of the fourth wavelength.

As a result, this allows a conventionally used interference optical system (predetermined optical system) to be used and accordingly simplifies the configuration. Additionally, the configuration according to one or more embodiments of the present invention may also use at most four different lights simultaneously. This further expands the measurement range and further improves the measurement efficiency.

Accordingly, in the case where the "polarized light of the first wavelength" and the "polarized light of the second wavelength" are combined by the first combining unit, the "polarized light of the first wavelength" and the "polarized light of the second wavelength" included in the "first light" are polarized lights having separate wavelengths to such a degree as to be separable by the first separating unit (for example, a dichroic mirror). Similarly, in the case where the "polarized light of the third wavelength" and the "polarized light of the fourth wavelength" are combined by the second combining unit, the "polarized light of the third wavelength" and the "polarized light of the fourth wavelength" included in the "second light" are polarized lights having separate wavelengths to such a degree as to be separable by the second separating unit (for example, a dichroic mirror).

The three-dimensional measurement device described in the aforementioned embodiments may further comprise a first phase shift unit configured to give a relative phase difference between the reference light and the measurement light with regard to the polarized light of the first wavelength; and/or a second phase shift unit configured to give a relative phase difference between the reference light and the measurement light with regard to the polarized light of the second wavelength; and a third phase shift unit configured to give a relative phase difference between the reference light and the measurement light with regard to the polarized light of the third wavelength; and/or a fourth phase shift unit configured to give a relative phase difference between the reference light and the measurement light with regard to the polarized light of the fourth wavelength.

The image processor may comprise: a first measurement value obtaining unit configured to execute shape measurement of the measurement object by a phase shift method, based on multiple different interference fringe images of the output light with regard to the polarized light of the first wavelength taken by the first wavelength light imaging unit when the output light with regard to the polarized light of the first wavelength is subjected to multiple (for example, four) phase shifts by the first phase shift unit, and to obtain a measurement value of the shape measurement as a first measurement value; and/or a second measurement value obtaining unit configured to execute shape measurement of the measurement object by the phase shift method, based on multiple different interference fringe images of the output light with regard to the polarized light of the second wavelength taken by the second wavelength light imaging unit when the output light with regard to the polarized light of the second wavelength is subjected to multiple (for example, four) phase shifts by the second phase shift unit, and to obtain a measurement value of the shape measurement as a second measurement value; a third measurement value obtaining unit configured to execute shape measurement of the measurement object by the phase shift method, based on multiple different interference fringe images of the output light with regard to the polarized light of the third wavelength taken by the third wavelength light imaging unit when the output light with regard to the polarized light of the third wavelength is subjected to multiple (for example, four) phase shifts by the third phase shift unit, and to obtain a measurement value of the shape measurement as a third measurement value; and/or a fourth measurement value obtaining unit configured to execute shape measurement of the measurement object by the phase shift method, based on multiple different interference fringe images of the output light with regard to the polarized light of the fourth wavelength taken by the fourth wavelength light imaging unit when the output light with regard to the polarized light of the fourth wavelength is subjected to multiple (for example, four) phase shifts by the fourth phase shift unit, and to obtain a measurement value of the shape measurement as a fourth measurement value; and a height information obtaining unit configured to obtain height information specified from the first measurement value and/or the second measurement value and the third measurement value and/or the fourth measurement value, as height information of the measurement object.

In a conventional three-dimensional measurement device using the phase shift method, there is a need to change the phase, for example, in four different levels and take corresponding four different interference fringe images. When two lights having a small wavelength difference are used for the purpose of improvement of the measurement range, a required imaging time is accordingly for four imaging processes at different timings, i.e., a total of eight imaging processes.

The configuration according to one or more embodiments of the present invention, on the other hand, enables imaging of the "output light with regard to the first light" ("output light with regard to the polarized light of the first wavelength" and/or "output light with regard to the polarized light of the second wavelength") and imaging of the "output light with regard to the second light" ("output light with regard to the polarized light of the third wavelength" and/or "output light with regard to the polarized light of the fourth wavelength") to be executed individually and simultaneously. Accordingly, for example, a total of sixteen (four by four) interference fringe images with regard to the four different lights at most can be obtained in an imaging time for four imaging processes. As a result, this shortens the total imaging time and achieves further improvement of the measurement efficiency.

The three-dimensional measurement device described in the aforementioned embodiments may further comprise: a first spectroscopic unit configured to split the output light with regard to the polarized light of the first wavelength into a plurality of split lights; and a first filter unit configured as the first phase shift unit to give respectively different phase differences to at least a required number of (for example, four) split lights that are required for measurement by the phase shift method, out of the plurality of split lights that are split by the first spectroscopic unit; and/or a second spectroscopic unit configured to split the output light with regard to the polarized light of the second wavelength into a plurality of split lights; and a second filter unit configured as the second phase shift unit to give respectively different phase differences to at least a required number of (for example, four) split lights that are required for measurement by the phase shift method, out of the plurality of split lights that are split by the second spectroscopic unit; and a third spectroscopic unit configured to split the output light with regard to the polarized light of the third wavelength into a plurality of split lights; and a third filter unit configured as the third phase shift unit to give respectively different phase differences to at least a required number of (for example, four) split lights that are required for measurement by the phase shift method, out of the plurality of split lights that are split by the third spectroscopic unit; and/or a fourth spectroscopic unit configured to split the output light with regard to the polarized light of the fourth wavelength into a plurality of split lights; and a fourth filter unit configured as the fourth phase shift unit to give respectively different phase differences to at least a required number of (for example, four) split lights that are required for measurement by the phase shift method, out of the plurality of split lights that are split by the fourth spectroscopic unit.

The first wavelength light imaging unit may be configured to simultaneously take at least images of the plurality of split lights transmitted through the first filter unit, and/or the second wavelength light imaging unit may be configured to simultaneously take at least images of the plurality of split lights transmitted through the second filter unit.

The third wavelength light imaging unit may be configured to simultaneously take at least images of the plurality of split lights transmitted through the third filter unit, and/or the fourth wavelength light imaging unit may be configured to simultaneously take at least images of the plurality of split lights transmitted through the fourth filter unit.

The above phase shift unit may be configured to move, for example, the reference surface along the optical axis and thereby physically change the optical path length. This configuration, however, takes a considerable time to obtain all the interference fringe images required for measurement. This not only increases the measurement time but is likely to decrease the measurement accuracy by the effect of, for example, fluctuation of the air or vibration.

The configuration according to one or more embodiments of the present invention, on the other hand, enables all the interference fringe images required for measurement to be obtained simultaneously. More specifically, this configuration enables a total of sixteen (four by four) interference fringe images with regard to the four different lights at most to be obtained simultaneously. As a result, this improves the measurement accuracy and significantly shortens the total imaging time, thus achieving remarkable improvement of the measurement efficiency.

The "spectroscopic unit" may be, for example, a "spectroscopic unit configured to split incident light into four lights having equal optical path lengths and having optical paths that are arrayed in matrix on a plane perpendicular to the traveling direction of light". One example is a configuration of one or more embodiments of the present invention described below.

In the three-dimensional measurement device described in the aforementioned embodiments, the spectroscopic unit (the first spectroscopic unit and/or the second spectroscopic unit and the third spectroscopic unit and/or the fourth spectroscopic unit) may comprise: a first optical member (first Koester prism) that is a triangular prism having a triangular sectional shape along a first plane and includes a first splitting unit (first half mirror) arranged along a plane that goes through a line of intersection between a first surface and a second surface out of three surfaces along a direction perpendicular to the first plane and that is orthogonal to a third surface; and a second optical member (second Koester prism) that is a triangular prism having a triangular sectional shape along a second plane orthogonal to the first plane and includes a second splitting unit (second half mirror) arranged along a plane that goes through a line of intersection between a first surface and a second surface out of three surfaces along a direction perpendicular to the second plane and that is orthogonal to a third surface.

The third surface of the first optical member may be arranged to be opposed to the first surface of the second optical member, such that light (vertically) entering the first surface of the first optical member is split in two directions by the first splitting unit, wherein split light reflected by the first splitting unit is reflected at the first surface toward the third surface, and split light transmitted through the first splitting unit is reflected at the second surface toward the third surface, so that two parallel split lights are emitted from the third surface, and that the two split lights emitted from the third surface of the first optical member (vertically) enter the first surface of the second optical member, and each of the two split lights is split in two directions by the second splitting unit, wherein two split lights reflected by the second splitting unit are respectively reflected at the first surface toward the third surface, and two split lights transmitted through the second splitting unit are respectively reflected at the second surface toward the third surface, so that four parallel split lights are emitted from the third surface.

The configuration of the aforementioned embodiments enables light emitted from the predetermined optical system (interference optical system) to be split into four lights arrayed in two by two matrix. In a configuration of taking images of a plurality of split lights simultaneously by one single imaging element like one or more embodiments described below, divisional areas determined by dividing the imaging region of the imaging element in matrix of four equal areas may thus be respectively allocated to the four split lights. This configuration accordingly ensures the effective use of the imaging region of the imaging element. For example, when the imaging region of a general imaging element having an aspect ratio of 4 to 3 is divided into four equal areas, the respective divisional areas have the same aspect ratio of 4 to 3. This makes a wider range in each divisional area usable and thereby further improves the measurement accuracy.

Using diffraction grating as the spectroscopic unit is likely to reduce the resolution. The configuration according to one or more embodiments of the present invention, however, splits one light into two parallel lights and further splits each of the two parallel lights into two parallel lights, so as to split one light into four parallel lights. This configuration suppresses reduction of the resolution.

Additionally, one or more embodiments of the present invention employ the optical member having the above configuration (Koester prism) as the means for splitting one light into two parallel lights, so that the two split lights have optically identical optical path lengths. As a result, there is no need to provide an optical path adjusting unit to adjust the optical path lengths of the two split lights. This configuration reduces the total number of components and achieves, for example, the simplified configuration and downsizing of the device.

The configuration that the third surface of the first optical member is in contact with the first surface of the second optical member causes the light to travel only in the optical member and is not exposed to the air until one light entering the spectroscopic unit is emitted as four split lights. This configuration reduces the effect of, for example, fluctuation of the air.

In the three-dimensional measurement device described in the aforementioned embodiments, the first wavelength light imaging unit may include a single imaging element configured to simultaneously take images of at least the plurality of split lights transmitted through the first filter unit, and/or the second wavelength light imaging unit may include a single imaging element configured to simultaneously take images of at least the plurality of split lights transmitted through the second filter unit, and the third wavelength light imaging unit may include a single imaging element configured to simultaneously take images of at least the plurality of split lights transmitted through the third filter unit, and/or the fourth wavelength light imaging unit may include a single imaging element configured to simultaneously take images of at least the plurality of split lights transmitted through the fourth filter unit.

A configuration of taking images of a plurality of split lights simultaneously may use a plurality of cameras (imaging elements) to take images of respective split lights. This configuration is, however, likely to cause a measurement error due to, for example, the difference of the respective cameras (imaging elements).

The configuration according to one or more embodiments of the present invention, on the other hand, simultaneously takes images of a plurality of split lights by one single imaging element. This reduces the possibility of a measurement error or the like and improves the measurement accuracy.

In the three-dimensional measurement device described in the aforementioned embodiments, the measurement object may be either solder paste printed on a printed circuit board or a solder bump formed on a wafer substrate.

The configuration of the aforementioned embodiments allows for, for example, height measurement of solder paste printed on the printed circuit board or a solder bump formed on a wafer substrate. This configuration accordingly enables the quality of the solder paste or the solder bump to be determined, based on the measurement value in inspection of the solder paste or the solder bump. This allows for quality judgement with the high accuracy in this inspection by providing the functions and the advantageous effects of the above embodiments. As a result, this improves the inspection accuracy of a solder printing inspection device or a solder bump inspection device.

DETAILED DESCRIPTION OF EMBODIMENTS

Figure 1:
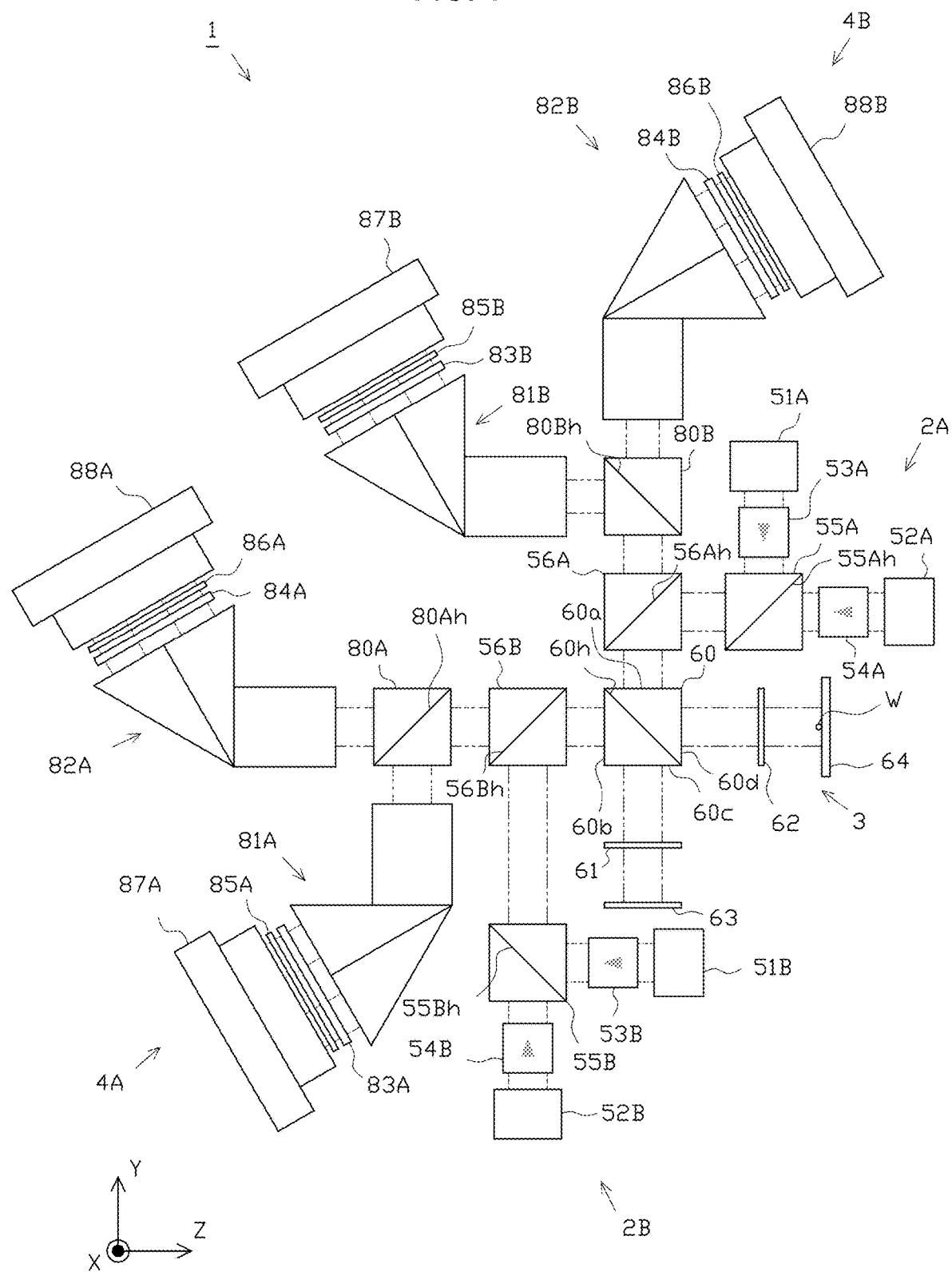
FIG. 1 is a schematic configuration diagram illustrating a three-dimensional measurement device according to one or more embodiments of the present invention.
Figure 2:
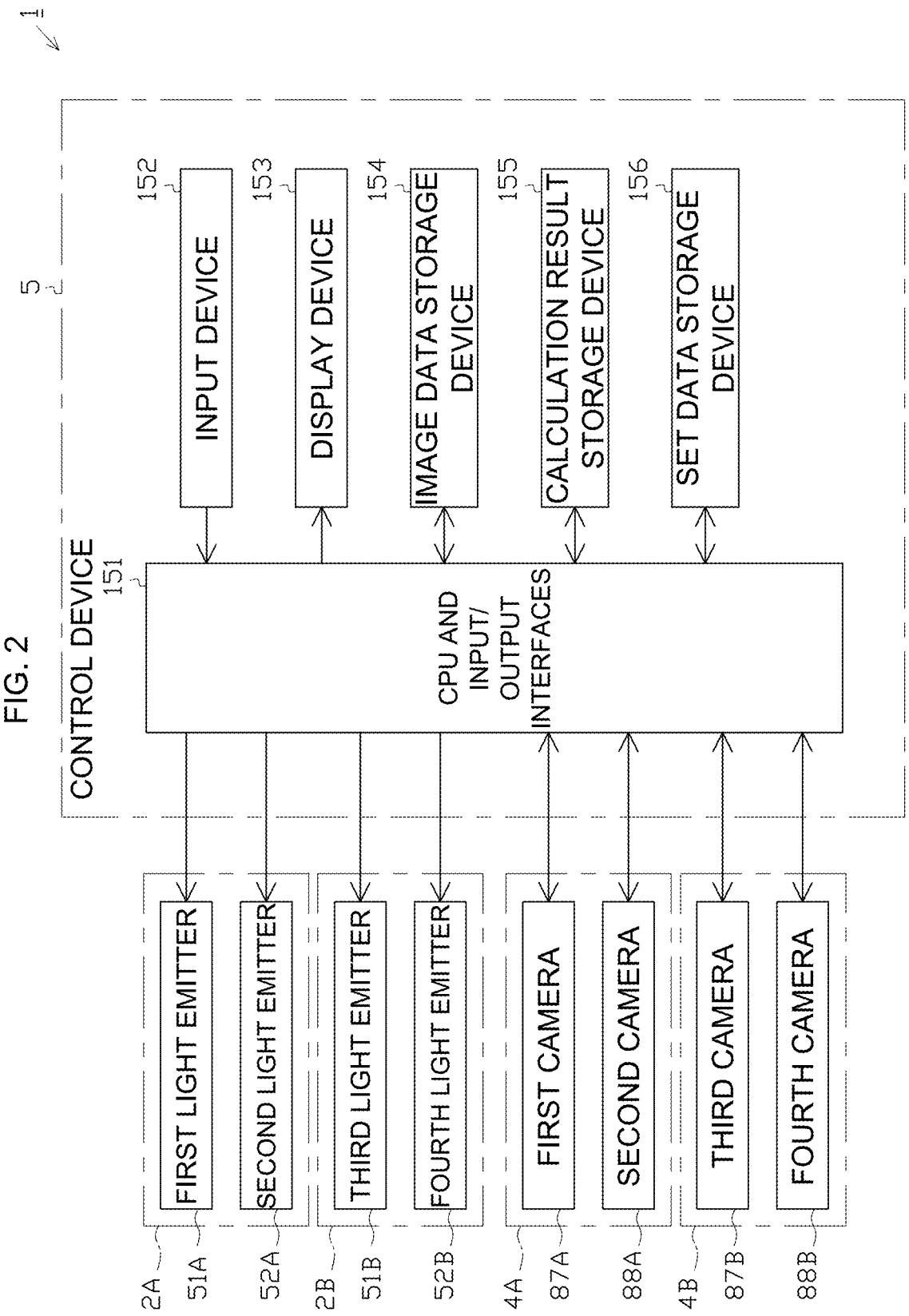
FIG. 2 is a block diagram illustrating the electrical configuration of the three-dimensional measurement device according to one or more embodiments of the present invention.

The following describes embodiments of a three-dimensional measurement device with reference to the drawings. FIG. 1 is a diagram illustrating the schematic configuration of a three-dimensional measurement device 1 according to one or more embodiments. FIG. 2 is a block diagram illustrating the electrical configuration of the three-dimensional measurement device 1. In the description below, as a matter of convenience, a front-back direction of the sheet surface of FIG. 1 is called "X-axis direction", a top-bottom direction of the sheet surface is called "Y-axis direction" and a left-right direction of the sheet surface is called "Z-axis direction".

The three-dimensional measurement device 1 is configured based on the principle of a Michelson interferometer and includes two projection optical systems 2A and 2B (first projection optical system 2A and second projection optical system 2B) configured to emit predetermined lights, an interference optical system 3 in which the lights respectively emitted from the projection optical systems 2A and 2B enter, two imaging systems 4A and 4B (first imaging system 4A and second imaging system 4B) in which the lights emitted from the interference optical system 3 enter, and a control device 5 configured to execute various controls, image processing, calculations and the like involved in the projection optical systems 2A and 2B, the interference optical system 3, the imaging systems 4A and 4B and the like.

The "control device 5" is configured as the "image processor" according to one or more embodiments, and the "interference optical system 3" is configured as the "predetermined optical system (specific optical system)" according to one or more embodiments. In one or more embodiments of the present invention, the "interference optical system" denotes an optical system configured to split predetermined incident light into two lights (measurement light and reference light), provide the two lights with an optical path difference, recombine the two lights and output the combined light, for the purpose of causing interference of light (taking an interference fringe image). In other words, the "interference optical system" denotes not only an optical system that internally causes interference of two lights (measurement light and reference light) and outputs the interfering light but an optical system that simply combines two lights (measurement light and reference light) and outputs the combined light without internally causing interference of the two lights. Accordingly, as described later, when two lights (measurement light and reference light) are output as the combined light without interference from the "interference optical system", the combined light is converted to interfering light by means of a predetermined interfering unit in a stage at least prior to imaging (for example, inside of the imaging system).

The following describes the configuration of the above two projection optical systems 2A and 2B (first projection optical system 2A and second projection optical system 2B) in detail. The configuration of the first projection optical system 2A is described first in detail.

The first projection optical system 2A includes two light emitters 51A and 52A (first light emitter 51A and second light emitter 52A), a first light isolator 53A corresponding to the first light emitter 51A, a second light isolator 54A corresponding to the second light emitter 52A, a first combining dichroic mirror 55A, and a first non-polarizing beam splitter 56A.

Although not being illustrated, each of the light emitters 51A and 52A includes, for example, a laser light source configured to output linearly polarized light of a specific wavelength, a beam expander configured to expand the linearly polarized light output from the laser light source and emit the expanded light as parallel light, a polarizer configured to adjust the intensity and a half wave plate configured to adjust the polarizing direction. The respective light emitters 51A and 52A emit lights of different wavelengths.

More specifically, the first light emitter 51A emits, downward in the Y-axis direction, linearly polarized light of a first wavelength $\lambda_1$ (for example, $\lambda_1=491$ nm) having a polarizing direction that is a direction inclined at 45 degrees to the X-axis direction and the Z-axis direction. The second light emitter 52A emits, leftward in the Z-axis direction, linearly polarized light of a second wavelength $\lambda_2$ (for example, $\lambda_2=540$ nm) having a polarizing direction that is a direction inclined at 45 degrees to the X-axis direction and the Y-axis direction.

The first light isolator 53A is an optical element configured to transmit only a light traveling in one direction (downward in the Y-axis direction according to one or more embodiments) but block a light traveling in a reverse direction (upward in the Y-axis direction according to one or more embodiments). This configuration allows for transmission of only the light emitted from the first light emitter 51A and thereby prevents damage and destabilization of the first light emitter 51A due to return light.

In this configuration, the linearly polarized light of the first wavelength $\lambda_1$ emitted downward in the Y-axis direction from the first light emitter 51A (hereinafter referred to as "first wavelength light") enters the first combining dichroic mirror 55A via the first light isolator 53A.

Similarly, the second light isolator 54A is an optical element configured to transmit only a light traveling in one direction (leftward in the Z-axis direction according to one or more embodiments) but block a light traveling in a reverse direction (rightward in the Z-axis direction according to one or more embodiments). This configuration allows for transmission of only the light emitted from the second light emitter 52A and thereby prevents damage and destabilization of the second light emitter 52A due to return light.

In this configuration, the linearly polarized light of the second wavelength $\lambda_2$ emitted leftward in the Z-axis direction from the second light emitter 52A (hereinafter referred to as "second wavelength light") enters the first combining dichroic mirror 55A via the second light isolator 54A.

The first combining dichroic mirror 55A is a cube-shaped known optical member (dichroic prism) configured by joining right angle prisms (triangular prisms having a bottom face in an isosceles right triangle shape: the same applies hereinafter) together to be integrated, and a dielectric multilayer film is formed on its joint surface 55Ah.

The first combining dichroic mirror 55A is arranged such that one of two surfaces adjoining to each other across the joint surface 55Ah is perpendicular to the Y-axis direction and the other of the two surfaces is perpendicular to the Z-axis direction. In other words, the joint surface 55Ah of the first combining dichroic mirror 55A is arranged to be inclined at 45 degrees to the Y-axis direction and the Z-axis direction.

The first combining dichroic mirror 55A according to one or more embodiments is characterized by at least reflecting the first wavelength light and transmitting the second wavelength light. In the arrangement configuration shown in FIG. 1, the first wavelength light and the second wavelength light entering the first combining dichroic mirror 55A are combined with each other, and the combined light is emitted leftward in the Z-axis direction toward the first non-polarizing beam splitter 56A, as linearly polarized light having a polarizing direction that is a direction inclined at 45 degrees to the X-axis direction and the Y-axis direction.

In the description below, the combined light generated by combining the first wavelength light emitted from the first light emitter 51A with the second wavelength light emitted from the second light emitter 52A is called "first light". Accordingly, the "light emitters 51A and 52A", the "light isolators 53A and 54A", the "first combining dichroic mirror 55A" and the like are configured as the "first irradiation unit" according to one or more embodiments. More specifically, the "first light emitter 51A" is configured as the "first wavelength light emitter", the "second light emitter 52A" is configured as the "second wavelength light emitter", and the "first combining dichroic mirror 55A" is configured as the "first combining unit (first combining mirror)".

The first non-polarizing beam splitter 56A is a cube-shaped known optical member configured by joining right angle prisms together to be integrated, and its joint surface 56Ah is coated with, for example, a metal film. The "first non-polarizing beam splitter 56A" is configured as the "first light guiding unit (first beam splitter)" according to one or more embodiments.

The non-polarizing beam splitter is configured to split incident light including polarization state into transmitted light and reflected light at a predetermined ratio. The same applies hereinafter. According to one or more embodiments, a half mirror having a 1:1 split ratio is employed as the non-polarizing beam splitter. The half mirror splits the incident light to provide a P-polarized light component and an S-polarized light component of the transmitted light and a P-polarized light component and an S-polarized light component of the reflected light all at identical rates and provide the respective polarization states of the transmitted light and the reflected light that are identical with the polarization state of the incident light.

According to one or more embodiments, linearly polarized light having a polarizing direction that is a direction parallel to the sheet surface of FIG. 1 (Y-axis direction or Z-axis direction) is called P-polarized light (P-polarized light component). Linearly polarized light having a polarizing direction that is the X-axis direction perpendicular to the sheet surface of FIG. 1 is called S-polarized light (S-polarized light component). The "P-polarized light" corresponds to the "polarized light having the first polarizing direction". The "S-polarized light" corresponds to the "polarized light having the second polarizing direction".

The first non-polarizing beam splitter 56A is arranged such that one of two surfaces adjoining to each other across the joint surface 56Ah is perpendicular to the Y-axis direction and the other of the two surfaces is perpendicular to the Z-axis direction. In other words, the joint surface 56Ah of the first non-polarizing beam splitter 56A is arranged to be inclined at 45 degrees to the Y-axis direction and the Z-axis direction. More specifically, the first non-polarizing beam splitter 56A is arranged to transmit part (half) of the first light that enters leftward in the Z-axis direction from the first combining dichroic mirror 55A, leftward in the Z-axis direction and reflect the remaining part (remaining half) of the first light downward in the Y-axis direction.

The following describes the configuration of the second optical system 2B in detail. Like the first optical system 2A described above, the second optical system 2B includes two light emitters 51B and 52B (third light emitter 51B and fourth light emitter 52B), a third light isolator 53B corresponding to the third light emitter 51B, a fourth light isolator 54B corresponding to the fourth light emitter 52B, a second combining dichroic mirror 55B, and a second non-polarizing beam splitter 56B.

Although not being illustrated, each of the light emitters 51B and 52B includes, for example, a laser light source configured to output linearly polarized light of a specific wavelength, a beam expander configured to expand the linearly polarized light output from the laser light source and emit the expanded light as parallel light, a polarizer configured to adjust the intensity and a half wave plate configured to adjust the polarizing direction. The respective light emitters 51B and 52B emit lights of different wavelengths.

More specifically, the third light emitter 51B emits, leftward in the Z-axis direction, linearly polarized light of a third wavelength $\lambda_3$ (for example, $\lambda_3$=488 nm) having a polarizing direction that is a direction inclined at 45 degrees to the X-axis direction and the Y-axis direction. The fourth light emitter 52B emits, upward in the Y-axis direction, linearly polarized light of a fourth wavelength $\lambda_4$ (for example, $\lambda_4$=532 nm) having a polarizing direction that is a direction inclined at 45 degrees to the X-axis direction and the Z-axis direction.

The third light isolator 53B is an optical element configured to transmit only a light traveling in one direction (leftward in the Z-axis direction according to one or more embodiments) but block a light traveling in a reverse direction (rightward in the Z-axis direction according to one or more embodiments). This configuration allows for transmission of only the light emitted from the third light emitter 51B and thereby prevents damage and destabilization of the third light emitter 51B due to return light.

In this configuration, the linearly polarized light of the third wavelength $\lambda_3$ emitted leftward in the Z-axis direction from the third light emitter 51B (hereinafter referred to as "third wavelength light") enters the second combining dichroic mirror 55B via the third light isolator 53B.

Similarly, the fourth light isolator 54B is an optical element configured to transmit only a light traveling in one direction (upward in the Y-axis direction according to one or more embodiments) but block a light traveling in a reverse direction (downward in the Y-axis direction according to one or more embodiments). This configuration allows for transmission of only the light emitted from the fourth light emitter 52B and thereby prevents damage and destabilization of the fourth light emitter 52B due to return light.

In this configuration, the linearly polarized light of the fourth wavelength $\lambda_4$ emitted upward in the Y-axis direction from the fourth light emitter 52B (hereinafter referred to as "fourth wavelength light") enters the second combining dichroic mirror 55B via the fourth light isolator 54B.

The second combining dichroic mirror 55B is a cube-shaped known optical member (dichroic prism) configured by joining right angle prisms together to be integrated, and a dielectric multilayer film is formed on its joint surface 55Bh.

The second combining dichroic mirror 55B is arranged such that one of two surfaces adjoining to each other across the joint surface 55Bh is perpendicular to the Y-axis direction and the other of the two surfaces is perpendicular to the Z-axis direction. In other words, the joint surface 55Bh of the second combining dichroic mirror 55B is arranged to be inclined at 45 degrees to the Y-axis direction and the Z-axis direction.

The second combining dichroic mirror 55B according to one or more embodiments is characterized by at least reflecting the third wavelength light and transmitting the fourth wavelength light. In the arrangement configuration shown in FIG. 1, the third wavelength light and the fourth wavelength light entering the second combining dichroic mirror 55B are combined with each other, and the combined light is emitted upward in the Y-axis direction toward the second non-polarizing beam splitter 56B, as linearly polarized light having a polarizing direction that is a direction inclined at 45 degrees to the X-axis direction and the Z-axis direction.

In the description below, the combined light generated by combining the third wavelength light emitted from the third light emitter 51B with the fourth wavelength light emitted from the fourth light emitter 52B is called "second light". Accordingly, the "light emitters 51B and 52B", the "light isolators 53B and 54B", the "second combining dichroic mirror 55B" and the like are configured as the "second irradiation unit" according to one or more embodiments. More specifically, the "third light emitter 51B" is configured as the "third wavelength light emitter", the "fourth light emitter 52B" is configured as the "fourth wavelength light emitter", and the "second combining dichroic mirror 55B" is configured as the "second combining unit (second combining mirror)".

The second non-polarizing beam splitter 56B is a cube-shaped known optical member configured by joining right angle prisms together to be integrated, and its joint surface 56Bh is coated with, for example, a metal film. The "second non-polarizing beam splitter 56B" is configured as the "second light guiding unit (second beam splitter)" according to one or more embodiments.

The second non-polarizing beam splitter 56B is arranged such that one of two surfaces adjoining to each other across the joint surface 56Bh is perpendicular to the Y-axis direction and the other of the two surfaces is perpendicular to the Z-axis direction. In other words, the joint surface 56Bh of the second non-polarizing beam splitter 56B is arranged to be inclined at 45 degrees to the Y-axis direction and the Z-axis direction. More specifically, the second non-polarizing beam splitter 56B is arranged to transmit part (half) of the second light that enters upward in the Y-axis direction from the second combining dichroic mirror 55B, upward in the Y-axis direction and reflect the remaining part (remaining half) of the second light rightward in the Z-axis direction.

The following describes the configuration of the above interference optical system 3 in detail. The interference optical system 3 includes, for example, a polarizing beam splitter (PBS) 60, quarter wave plates 61 and 62, a reference surface 63, and a placement structure 64.

The polarizing beam splitter 60 is a cube-shaped known optical member configured by joining right angle prisms together to be integrated, and its joint surface (boundary surface) 60h is coated with, for example, a dielectric multilayer film.

The polarizing beam splitter 60 is configured to split linearly polarized incident light into two polarized light components (P-polarized light component and S-polarized light component) having polarizing directions perpendicular to each other. According to one or more embodiments, the polarizing beam splitter 60 is configured to transmit the P-polarized light component and reflect the S-polarized light component. According to one or more embodiments, the polarizing beam splitter 60 serves to split predetermined incident light into two split lights (measurement light and reference light) and also serves to recombine the two split lights.

The polarizing beam splitter 60 is arranged such that one of two surfaces adjoining to each other across the joint surface 60h is perpendicular to the Y-axis direction and the other of the two surfaces is perpendicular to the Z-axis direction. In other words, the joint surface 60h of the polarizing beam splitter 60 is arranged to be inclined at 45 degrees to the Y-axis direction and the Z-axis direction.

More specifically, a first surface (upper side face in the Y-axis direction) 60a of the polarizing beam splitter 60, which the first light reflected downward in the Y-axis direction from the above first non-polarizing beam splitter 56A enters, and a third surface (lower side face in the Y-axis direction) 60c opposed to the first surface 60a are arranged to be perpendicular to the Y-axis direction. The "first surface 60a of the polarizing beam splitter 60" corresponds to the "first input-output element" according to one or more embodiments.

A second surface (left side face in the Z-axis direction) 60b of the polarizing beam splitter 60, which is a surface adjoining to the first surface 60a across the joint surface 60h and which the second light reflected rightward in the Z-axis direction from the above second non-polarizing beam splitter 56B enters, and a fourth surface (right side face in the Z-axis direction) 60d opposed to the second surface 60b are arranged to be perpendicular to the Z-axis direction. The "second surface 60b of the polarizing beam splitter 60" corresponds to the "second input-output element" according to one or more embodiments.

The quarter wave plate 61 is arranged to be opposed in the Y-axis direction to the third surface 60c of the polarizing beam splitter 60, and the reference surface 63 is arranged to be opposed in the Y-axis direction to the quarter wave plate 61.

The quarter wave plate 61 corresponds to the "first quarter wave plate" according to one or more embodiments and serves to convert linearly polarized light into circularly polarized light and to convert circularly polarized light into linearly polarized light. Accordingly, linearly polarized light (reference light) emitted from the third surface 60c of the polarizing beam splitter 60 is converted into circularly polarized light by the quarter wave plate 61 and is radiated to the reference surface 63. The reference light reflected by the reference surface 63 is reconverted from the circularly polarized light into the linearly polarized light by the quarter wave plate 61 and enters the third surface 60c of the polarizing beam splitter 60.

The quarter wave plate 62 is arranged, on the other hand, to be opposed in the Z-axis direction to the fourth surface 60d of the polarizing beam splitter 60, and the placement structure 64 is arranged to be opposed in the Z-axis direction to the quarter wave plate 62.

The quarter wave plate 62 corresponds to the "second quarter wave plate" according to one or more embodiments and serves to convert linearly polarized light into circularly polarized light and to convert circularly polarized light into linearly polarized light. Accordingly, linearly polarized light (measurement light) emitted from the fourth surface 60d of the polarizing beam splitter 60 is converted into circularly polarized light by the quarter wave plate 62 and is radiated to a work W as a measurement object placed on the placement structure 64. The measurement light reflected by the work W is reconverted from the circularly polarized light into the linearly polarized light by the quarter wave plate 62 and enters the fourth surface 60d of the polarizing beam splitter 60.

The following describes the configuration of the two imaging systems 4A and 4B (first imaging system 4A and second imaging system 4B) in detail. The first imaging system 4A is configured as the "first imaging unit" and the second imaging system 4B is configured as the "second imaging unit" according to one or more embodiments.

The configuration of the first imaging system 4A is described first. The first imaging system 4A includes a first separating dichroic mirror 80A configured to separate combined light of a reference light component and a measurement light component with regard to the first light transmitted through the second non-polarizing beam splitter 56B (two-wavelength combined light of the first wavelength light and the second wavelength light) into combined light (reference light component and measurement light component) with regard to the first wavelength light and combined light (reference light component and measurement light component) with regard to the second wavelength light. The "first separating dichroic mirror 80A" is configured as the "first separating unit (first separating mirror)" according to one or more embodiments.

The first separating dichroic mirror 80A is a cube-shaped known optical member (dichroic prism) configured by joining right angle prisms together to be integrated, and a dielectric multilayer film is formed on its joint surface 80Ah.

The first separating dichroic mirror 80A is arranged such that one of two surfaces adjoining to each other across the joint surface 80Ah is perpendicular to the Y-axis direction and the other of the two surfaces is perpendicular to the Z-axis direction. In other words, the joint surface 80Ah of the first separating dichroic mirror 80A is arranged to be inclined at 45 degrees to the Y-axis direction and the Z-axis direction.

According to one or more embodiments, the first separating dichroic mirror 80A has similar characteristics to those of the first combining dichroic mirror 55A described above. Accordingly, the first separating dichroic mirror 80A is characterized by at least reflecting the first wavelength light and transmitting the second wavelength light.

In the arrangement configuration shown in FIG. 1, the combined light with regard to the first light that enters the first separating dichroic mirror 80A is separated into combined light with regard to the first wavelength light that is emitted downward in the Y-axis direction and combined light with regard to the second wavelength light that is emitted leftward in the Z-axis direction.

The first imaging system 4A also includes a first spectral optical system 81A configured to split the combined light with regard to the first wavelength light that is emitted downward in the Y-axis direction from the first separating dichroic mirror 80A, into four split lights; a quarter wave plate unit 83A configured to respectively convert the four split lights split by the first spectral optical system 81A into circularly polarized lights; a first filter unit 85A configured to selectively transmit predetermined components of the four split lights transmitted through the quarter wave plate unit 83A; and a first camera 87A configured to simultaneously take images of the four split lights transmitted through the first filter unit 85A. The "first camera 87A" is configured as the "first wavelength light imaging unit" according to one or more embodiments.

Similarly, the first imaging system 4A includes a second spectral optical system 82A configured to split the combined light with regard to the second wavelength light that is emitted leftward in the Z-axis direction from the first separating dichroic mirror 80A, into four split lights; a quarter wave plate unit 84A configured to respectively convert the four split lights split by the second spectral optical system 82A into circularly polarized lights; a second filter unit 86A configured to selectively transmit predetermined components of the four split lights transmitted through the quarter wave plate unit 84A; and a second camera 88A configured to simultaneously take images of the four split lights transmitted through the second filter unit 86A. The "second camera 88A" is configured as the "second wavelength light imaging unit" according to one or more embodiments.

The following describes the configuration of the second imaging system 4B. The second imaging system 4B includes a second separating dichroic mirror 80B configured to separate combined light of a reference light component and a measurement light component with regard to the second light transmitted through the first non-polarizing beam splitter 56A (two-wavelength combined light of the third wavelength light and the fourth wavelength light) into combined light (reference light component and measurement light component) with regard to the third wavelength light and combined light (reference light component and measurement light component) with regard to the fourth wavelength light. The "second separating dichroic mirror 80B" is configured as the "second separating unit (second separating mirror)" according to one or more embodiments.

The second separating dichroic mirror 80B is a cube-shaped known optical member (dichroic prism) configured by joining right angle prisms together to be integrated, and a dielectric multilayer film is formed on its joint surface 80Bh.

The second separating dichroic mirror 80B is arranged such that one of two surfaces adjoining to each other across the joint surface 80Bh is perpendicular to the Y-axis direction and the other of the two surfaces is perpendicular to the Z-axis direction. In other words, the joint surface 80Bh of the second separating dichroic mirror 80B is arranged to be inclined at 45 degrees to the Y-axis direction and the Z-axis direction.

According to one or more embodiments, the second separating dichroic mirror 80B has similar characteristics to those of the second combining dichroic mirror 55B described above. Accordingly, the second separating dichroic mirror 80B is characterized by at least reflecting the third wavelength light and transmitting the fourth wavelength light.

In the arrangement configuration shown in FIG. 1, the combined light with regard to the second light that enters the second separating dichroic mirror 80B is separated into combined light with regard to the third wavelength light that is emitted leftward in the Z-axis direction and combined light with regard to the fourth wavelength light that is emitted upward in the Y-axis direction.

The second imaging system 4B also includes a third spectral optical system 81B configured to split the combined light with regard to the third wavelength light that is emitted leftward in the Z-axis direction from the second separating dichroic mirror 80B, into four split lights; a quarter wave plate unit 83B configured to respectively convert the four split lights split by the third spectral optical system 81B into circularly polarized lights; a third filter unit 85B configured to selectively transmit predetermined components of the four split lights transmitted through the quarter wave plate unit 83B; and a third camera 87B configured to simultaneously take images of the four split lights transmitted through the third filter unit 85B. The "third camera 87B" is configured as the "third wavelength light imaging unit" according to one or more embodiments.

Similarly, the second imaging system 4B includes a fourth spectral optical system 82B configured to split the combined light with regard to the fourth wavelength light that is emitted upward in the Y-axis direction from the second separating dichroic mirror 80B, into four split lights; a quarter wave plate unit 84B configured to respectively convert the four split lights split by the fourth spectral optical system 82B into circularly polarized lights; a fourth filter unit 86B configured to selectively transmit predetermined components of the four split lights transmitted through the quarter wave plate unit 84B; and a fourth camera 88B configured to simultaneously take images of the four split lights transmitted through the fourth filter unit 86B. The "fourth camera 88B" is configured as the "fourth wavelength light imaging unit" according to one or more embodiments.

The configurations of the "first spectral optical system 81A", the "second spectral optical system 82A", the "third spectral optical system 81B" and the "fourth spectral optical system 82B" used in the first imaging system 4A and in the second imaging system 4B are described below in detail with reference to FIGS. 3 to 6.

According to one or more embodiments, the "first spectral optical system 81A", the "second spectral optical system 82A", the "third spectral optical system 81B" and the "fourth spectral optical system 82B" have identical configurations. In the description below, these are collectively called the "spectral optical system 81A, 82A, 81B or 82B".

The "spectral optical system 81A, 82A, 81B or 82B" is configured as the "spectroscopic unit" according to one or more embodiments. More specifically, the spectral optical system 81A" is configured as the "first spectroscopic unit", the "spectral optical system 82A" is configured as the "second spectroscopic unit", the "spectral optical system 81B" is configured as the "third spectroscopic unit", and the "spectral optical system 82B" is configured as the "fourth spectroscopic unit".

Figure 3:
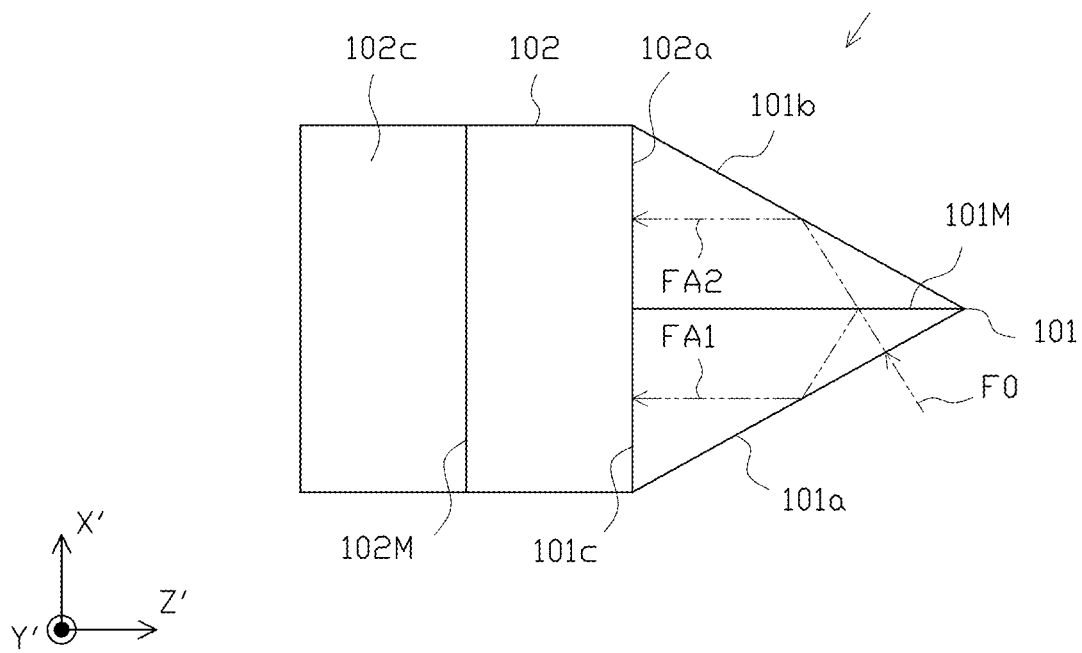
FIG. 3 is a plan view illustrating a spectral optical system according to one or more embodiments of the present invention.

In the description of the spectral optical system 81A, 82A, 81B or 82B with reference to FIGS. 3 to 6, as a matter of convenience, a top-bottom direction of the sheet surface of FIG. 3 is called "X'-axis direction", a front-back direction of the sheet surface is called "Y'-axis direction" and a left-right direction of the sheet surface is called "Z'-axis direction". The coordinate system (X', Y', Z') used for describing the spectral optical system 81A, 82A, 81B or 82B alone is, however, a different coordinate system from the coordinate system (X, Y, Z) used for describing the entire three-dimensional measurement device 1.

The spectral optical system 81A, 82A, 81B or 82B is one non-polarizing optical member configured by joining two non-polarizing optical members (prisms) together to be integrate More specifically, the spectral optical system 81A, 82A, 81B or 82B includes a first prism 101 configured to split the light entering from the first separating dichroic mirror 80A or from the second separating dichroic mirror 80B into two split lights, and a second prism 102 configured to further split each of the two split lights split by the first prism 101 into two split lights and emit a total of four split lights.

Each of the first prism 101 and the second prism 102 is configured by a known optical member called "Koester prism". According to one or more embodiments, the "Koester prism" denotes an "optical member of an equilateral triangular prism having an equilateral triangular sectional shape that is configured by joining a pair of optical members (triangular prisms) having a right triangular sectional shape with inner angles of 30 degrees, 60 degrees and 90 degrees, together to be integrated and that is provided with a non-polarizing half mirror on its joint surface". The Koester prism used for the respective prisms 101 and 102 is, however, not limited to the aforementioned embodiments. Any optical member (Koester prism) that satisfies the functions of the spectral optical system 81A, 82A, 81B or 82B described later and that is different from that of the aforementioned embodiments, for example, an optical member of non-equilateral triangular prism, may be employed for the respective prisms 101 and 102.

More specifically, the first prism 101 as the first optical member (first Koester prism) is an equilateral triangular prism that is in an equilateral triangular shape in the plan view (X'-Z' plane) and that is extended along the Y'-axis direction (as shown in FIG. 3). The "X'-Z' plane" of one or more embodiments corresponds to the "first plane".

The first prism 101 has three rectangular surfaces along the Y'-axis direction (first surface 101a, second surface 101b and third surface 101c) and is provided with a half mirror 101M formed along a plane that goes through a line of intersection between the first surface 101a and the second surface 101b and that is perpendicular to the third surface 101c. The "half mirror 101M" is configured as the "first splitting unit (first splitting mirror)" according to one or more embodiments.

The first prism 101 is arranged such that the third surface 101c is extended along an X'-Y' plane and is perpendicular to the Z'-axis direction and that the half mirror 101M is extended along a Y'-Z' plane and is perpendicular to the X'-axis direction. Accordingly, the first surface 101a and the second surface 101b are respectively arranged to be inclined at 30 degrees or at 60 degrees to the X'-axis direction and the Z'-axis direction.

Figure 4:
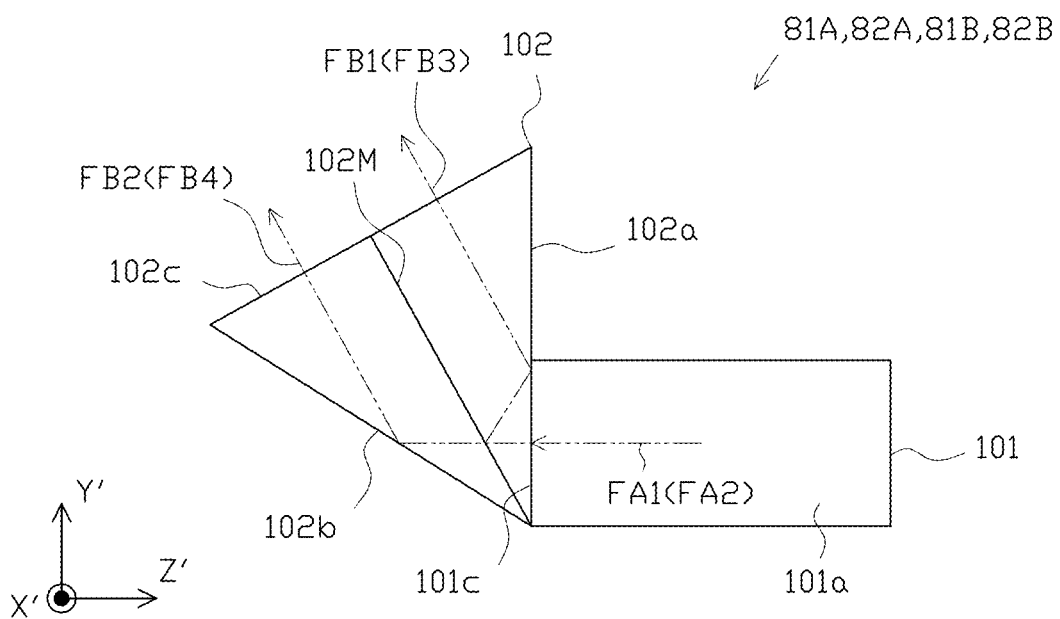
FIG. 4 is a front view illustrating the spectral optical system according to one or more embodiments of the present invention.

The second prism 102 as the second optical member (second Koester prism) is, on the other hand, an equilateral triangular prism that is in an equilateral triangular shape in the front view (Y'-Z' plane) and that is extended along the X'-axis direction (as shown in FIG. 4). The "Y'-Z' plane" of one or more embodiments corresponds to the "second plane".

The second prism 102 has three rectangular surfaces along the X'-axis direction (first surface 102a, second surface 102b and third surface 102c) and is provided with a half mirror 102M formed along a plane that goes through a line of intersection between the first surface 102a and the second surface 102b and that is perpendicular to the third surface 102c. The "half mirror 102M" is configured as the "second splitting unit (second splitting mirror)" according to one or more embodiments.

The second prism 102 is arranged such that the first surface 102a is extended along the X'-Y' plane and is perpendicular to the Z'-axis direction. Accordingly, the second surface 102b, the third surface 102c and the half mirror 102M are respectively arranged to be inclined at 30 degrees or at 60 degrees to the Y'-axis direction and the Z'-axis direction.

The third surface 101c of the first prism 101 and the first surface 102a of the second prism 102 are joined with each other. More specifically, the first prism 101 and the second prism 102 are joined with each other in a direction such that the plane including the half mirror 101M (Y'-Z' plane) is perpendicular to the plane including the half mirror 102M.

Figure 5:
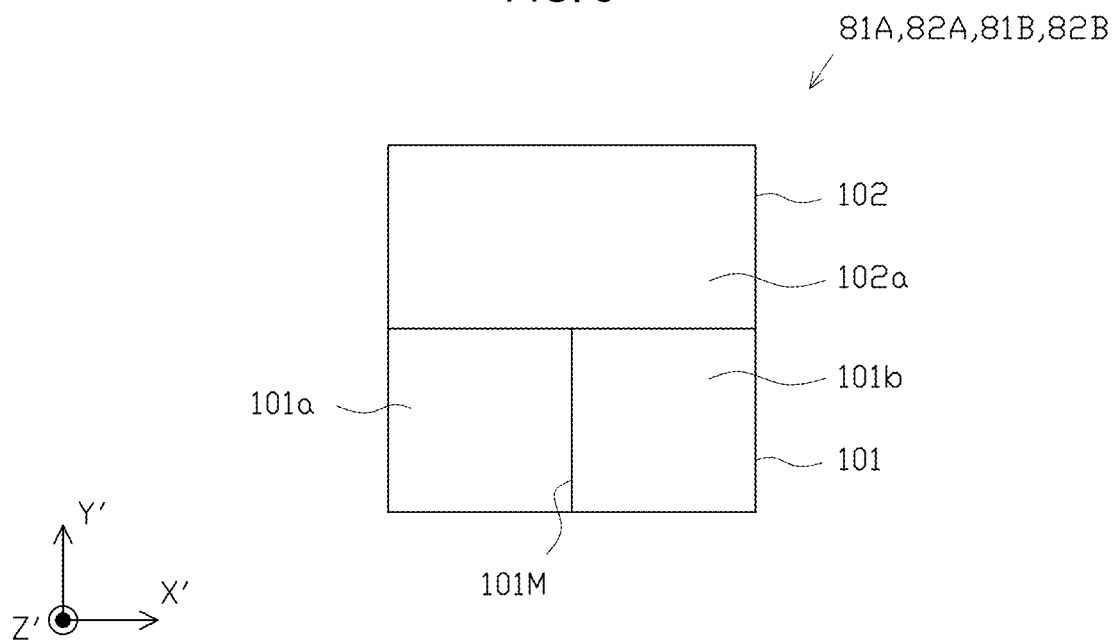
FIG. 5 is a right side view illustrating the spectral optical system according to one or more embodiments of the present invention.
Figure 6:
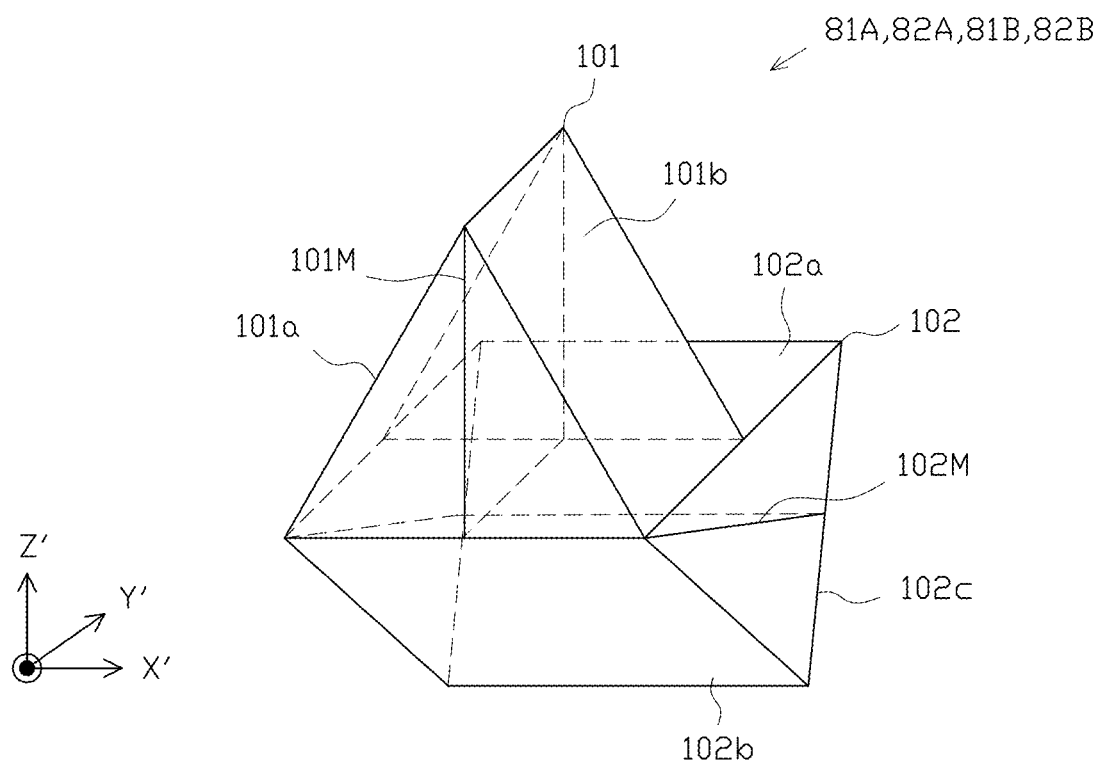
FIG. 6 is a perspective view illustrating the spectral optical system according to one or more embodiments of the present invention.

The length in the X'-axis direction of the third surface 101c of the first prism 101 is equal to the length in the X'-axis direction of the first surface 102a of the second prism 102 (as shown in FIG. 3). The length in the Y'-axis direction of the third surface 101c of the first prism 101 is, on the other hand, half the length in the Y'-axis direction of the first surface 102a of the second prism 102 (as shown in FIGS. 4 and 5). The third surface 101c of the first prism 101 is joined along a line of intersection between the first surface 102a and the second surface 102b of the second prism 102 (as shown in, for example, FIG. 6).

Each of the prisms 101 and 102 is made of an optical material (for example, glass or acrylic resin) having a predetermined refractive index higher than the refractive index of the air. These prisms 101 and 102 may be made of an identical material or may be made of different materials. The material of each of the prisms 101 and 102 may be selected arbitrarily as long as the material satisfies the functions of the spectral optical system 81A, 82A, 81B or 82B described later.

The following describes the functions of the spectral optical system 81A, 82A, 81B or 82B in detail with reference to the drawings.

The spectral optical system 81A, 82A, 81B or 82B is arranged such that a light F0 emitted from the first separating dichroic mirror 80A or from the second separating dichroic mirror 80B vertically enters the first surface 101a of the first prism 101 (as shown in FIGS. 1 and 3). For the simplicity of illustration, however, the first imaging system 4A and the second imaging system 4B are illustrated in FIG. 1 in such a manner that the front surface of the spectral optical system 81A, 82A, 81B or 82B faces the front side.

The light F0 entering the first prism 101 through the first surface 101a is split in two directions by the half mirror 101M. More specifically, the light F0 is split into a split light FA1 that is reflected by the half mirror 101M toward the first surface 101a and a split light FA2 that is transmitted through the half mirror 101M toward the second surface 101b.

The split light FA1 reflected by the half mirror 101M is totally reflected at the first surface 101a toward the third surface 101c and is emitted vertically from the third surface 101c. The split light FA2 transmitted through the half mirror 101M is, on the other hand, totally reflected at the second surface 101b toward the third surface 101c and is emitted vertically from the third surface 101c. The two parallel split lights FA1 and FA2 are accordingly emitted from the third surface 101c of the first prism 101.

The respective split lights FA1 and FA2 emitted from the third surface 101c of the first prism 101 vertically enter the first surface 102a of the second prism 102 (as shown in FIG. 4).

Each of the split lights FA1 and FA2 entering the second prism 102 through the first surface 102a is split in two directions by the half mirror 102M.

More specifically, one split light FA1 is split into a split light FB1 that is reflected by the half mirror 102M toward the first surface 102a and a split light FB2 that is transmitted through the half mirror 102M toward the second surface 102b.

The other split light FA2 is split into a split light FB3 that is reflected by the half mirror 102M toward the first surface 102a and a split light FB4 that is transmitted through the half mirror 102M toward the second surface 102b.

The respective split lights FB1 and FB3 reflected by the half mirror 102M are totally reflected at the first surface 102a toward the third surface 102c and are emitted vertically from the third surface 102c. The respective split lights FB2 and FB4 transmitted through the half mirror 102M are, on the other hand, totally reflected at the second surface 102b toward the third surface 102c and are emitted vertically from the third surface 102c. The four lights FB1 to FB4 arrayed in two by two matrix are accordingly emitted in parallel from the third surface 102c of the second prism 102.

The respective lights (four split lights FB1 to FB4) emitted from the third surface 102c of the second prism 102 in the "first spectral optical system 81A", the "second spectral optical system 82A", the "third spectral optical system 81B" or the "fourth spectral optical system 82B" enter the corresponding "quarter wave plate unit 83A", "quarter wave plate unit 84A", "quarter wave plate unit 83B" or "quarter wave plate unit 84B" (as shown in FIG. 1).

The following describes in detail the configuration of the "quarter wave plate unit 83A", the "quarter wave plate unit 84A", the "quarter wave plate unit 83B" and the "quarter wave plate unit 84B" used in the first imaging system 4A and in the second imaging system 4B.

According to one or more embodiments, the "quarter wave plate unit 83A", the "quarter wave plate unit 84A", the "quarter wave plate unit 83B" and the "quarter wave plate unit 84B" have identical configurations. In the description below, these are collectively called the "quarter wave plate unit 83A, 84A, 83B or 84B".

The quarter wave plate unit 83A, 84A, 83B or 84B is configured by arranging four quarter wave plates that are in an identical rectangular shape in the plan view in the incident directions of the split lights FB1 to FB4, in two by two matrix (not shown). The four quarter wave plates are provided corresponding to the four split lights FB1 to FB4 split by the spectral optical system 81A, 82A, 81B or 82B described above and are configured such that the respective split lights FB1 to FB4 individually enter.

The respective lights (four split lights FB1 to FB4) that are transmitted through the "quarter wave plate unit 83A", the "quarter wave plate unit 84A", the "quarter wave plate unit 83B" or the "quarter wave plate unit 84B" to be converted into circularly polarized lights enter the corresponding "first filter unit 85A", "second filter unit 86A", "third filter unit 85B" or "fourth filter unit 86B" (as shown in FIG. 1).

The following describes in detail the configuration of the "first filter unit 85A", the "second filter unit 86A", the "third filter unit 85B" and the "fourth filter unit 86B" used in the first imaging system 4A and in the second imaging system 4B.

According to one or more embodiments, the "first filter unit 85A", the "second filter unit 86A", the "third filter unit 85B" and the "fourth filter unit 86B" have identical configurations. In the description below, these are collectively called the "filter unit 85A, 86A, 85B or 86B".

Figure 7:
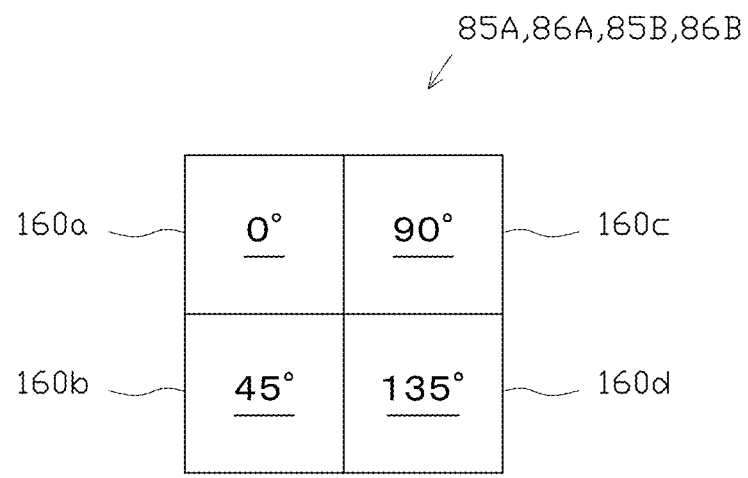
FIG. 7 is a schematic configuration diagram illustrating a filter unit according to one or more embodiments of the present invention.

The filter unit 85A, 86A, 85B or 86B is configured by arranging four polarizers 160a, 160b, 160c and 160d that are in an identical rectangular shape in the plan view in the incident directions of the split lights FB1 to FB4, in two by two matrix (as shown in FIG. 7). FIG. 7 is a plan view illustrating the schematic configuration of the filter unit 85A, 86A, 85B or 86B.

The four polarizers 160a to 160d are polarizers respectively having transmission axis directions that differ by 45 degrees each. More specifically, the filter unit 85A, 86A, 85B or 86B includes the first polarizer 160a having the transmission axis direction of 0 degree, the second polarizer 160b having the transmission axis direction of 45 degrees, the third polarizer 160c having the transmission axis direction of 90 degrees, and the fourth polarizer 160d having the transmission axis direction of 135 degrees.

The four split lights FB1 to FB4 are respectively converted into circularly polarized lights by the quarter wave plate unit 83A, 84A, 83B or 84B described above and subsequently enter the respective polarizers 160a to 160d of the filter unit 85A, 86A, 85B or 86B. More specifically, the split light FB1 enters the first polarizer 160a, the split light FB2 enters the second polarizer 160b, the split light FB3 enters the third polarizer 160c, and the split light FB4 enters the fourth polarizer 160d.

This configuration interferes with the reference light components and the measurement light components of the respective split lights FB1 to FB4 to generate four interfering lights having phases that differ by 90 degrees each. More specifically, the split light FB1 transmitted through the first polarizer 160a is provided as interfering light having the phase of "0 degree"; the split light FB2 transmitted through the second polarizer 160b is provided as interfering light having the phase of "90 degrees"; the split light FB3 transmitted through the third polarizer 160c is provided as interfering light having the phase of "180 degrees"; and the split light FB4 transmitted through the fourth polarizer 160d is provided as interfering light having the phase of "270 degrees".

Accordingly, the "filter unit 85A, 86A, 85B or 86B" is configured as the "filter unit", the "interfering unit" and the "phase shift unit" according to one or more embodiments. More specifically, the "first filter unit 85A" is configured as the "first phase shift unit (first phase shifter)" and the "first filter unit (first filter)". The "second filter unit 86A" is configured as the "second phase shift unit (second phase shifter)" and the "second filter unit (second filter)". The "third filter unit 85B" is configured as the "third phase shift unit (third phase shifter)" and the "third filter unit (third filter)". The "fourth filter unit 86B" is configured as the "fourth phase shift unit (fourth phase shifter)" and the "fourth filter unit (fourth filter)".

The images of the four split lights FB1 to FB4 (interfering lights) emitted from the "first filter unit 85A", the "second filter unit 86A", the "third filter unit 85B" or the "fourth filter unit 86B" are simultaneously taken by the corresponding "first camera 87A", "second camera 88A", "third camera 87B" or "fourth camera 88B" (as shown in FIG. 1).

As a result, the first camera 87A obtains four interference fringe images with regard to the first wavelength light having the phases that differ by 90 degrees each. The second camera 88A obtains four interference fringe images with regard to the second wavelength light having the phases that differ by 90 degrees each. The third camera 87B obtains four interference fringe images with regard to the third wavelength light having the phases that differ by 90 degrees each. The fourth camera 88B obtains four interference fringe images with regard to the fourth wavelength light having the phases that differ by 90 degrees each.

The following describes in detail the configuration of the "first camera 87A", the "second camera 88A", the "third camera 87B" and the "fourth camera 88B" used in the first imaging system 4A and in the second imaging system 4B.

According to one or more embodiments, the "first camera 87A", the "second camera 88A", the "third camera 87B" and the "fourth camera 88B" have identical configurations. In the description below, these are collectively called the "camera 87A, 88A, 87B or 88B".

The camera 87A, 88A, 87B or 88B has a known configuration including a lens, an imaging element and the like. According to one or more embodiments, a CCD area sensor is employed as the imaging element of the camera 87A, 88A, 87B or 88B. The imaging element is, however, not limited to one or more embodiments. For example, a CMOS area sensor may be employed as the imaging element.

Image data taken by the camera 87A, 88A, 87B or 88B are converted into digital signals inside of the camera 87A, 88A, 87B or 88B and are input in the form of digital signals into the control device 5 (image data storage device 154).

Figure 8:
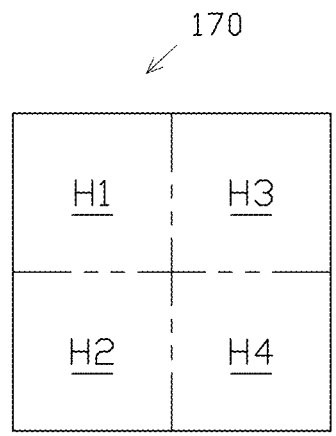
FIG. 8 is a schematic configuration diagram illustrating imaging areas of an imaging element according to one or more embodiments of the present invention.

An imaging region of an imaging element 170 of the camera 87A, 88A, 87B or 88B according to one or more embodiments is divided into four imaging areas H1, H2, H3 and H4 corresponding to (the polarizers 160a to 160d of) the filter unit 85A, 86A, 85B or 86B described above. More specifically, the imaging region is divided into four imaging areas H1, H2, H3 and H4 that are in identical rectangular shapes in the plan view in the incident directions of the splits lights FB1 to FB4 and that are arranged in two by two matrix (as shown in FIG. 8). FIG. 8 is a plan view illustrating the schematic configuration of the imaging region of the imaging element 170.

Accordingly, an image of the split light FB1 transmitted through the first polarizer 160a is taken in the first imaging area H1; an image of the split light FB2 transmitted through the second polarizer 160b is taken in the second imaging area H2; an image of the split light FB3 transmitted through the third polarizer 160c is taken in the third imaging area H3; and an image of the split light FB4 transmitted through the fourth polarizer 160d is taken in the fourth imaging area H4.

In other words, an interference fringe image having the phase of "0 degree" is taken in the first imaging area H1; an interference fringe image having the phase of "90 degrees" is taken in the second imaging area H2; an interference fringe image having the phase of "180 degrees" is taken in the third imaging area H3; and an interference fringe image having the phase of "270 degrees" is taken in the fourth imaging area H4.

As a result, an interference fringe image having the phase of "0 degree", an interference fringe image having the phase of "90 degrees", an interference fringe image having the phase of "180 degrees", and an interference fringe image having the phase of "270 degrees" with regard to the first wavelength light are taken simultaneously by the first camera 87A.

An interference fringe image having the phase of "0 degree", an interference fringe image having the phase of "90 degrees", an interference fringe image having the phase of "180 degrees", and an interference fringe image having the phase of "270 degrees" with regard to the second wavelength light are taken simultaneously by the second camera 88A.

An interference fringe image having the phase of "0 degree", an interference fringe image having the phase of "90 degrees", an interference fringe image having the phase of "180 degrees", and an interference fringe image having the phase of "270 degrees" with regard to the third wavelength light are taken simultaneously by the third camera 87B.

An interference fringe image having the phase of "0 degree", an interference fringe image having the phase of "90 degrees", an interference fringe image having the phase of "180 degrees", and an interference fringe image having the phase of "270 degrees" with regard to the fourth wavelength light are taken simultaneously by the fourth camera 88B.

The following describes the electrical configuration of the control device 5. As shown in FIG. 2, the control device 5 includes CPU and input/output interfaces 151 configured to control the entire three-dimensional measurement device 1, an input device 152 configured by a keyboard and a mouse or by a touch panel as the "input unit", a display device 153 configured as the "display unit" including a display screen such as a liquid crystal screen, an image data storage device 154 configured to store the image data taken by the cameras 87A, 88A, 87B and 88B and the like, a calculation result storage device 155 configured to store results of various calculations, and a set data storage device 156 configured to store various information in advance. These devices 152 to 156 are electrically connected with the CPU and input/output interfaces 151.

The image data storage device 154 according to one or more embodiments includes four image memories corresponding to each of the "first camera 87A", the "second camera 88A", the "third camera 87B" and the "fourth camera 88B". More specifically, the image data storage device 154 includes a first image memory configured to store interference fringe image data taken in the first imaging area H1 of the imaging element 170, a second image memory configured to store interference fringe image data taken in the second imaging area H2, a third image memory configured to store interference fringe image data taken in the third imaging area H3, and a fourth image memory configured to store interference fringe image data taken in the fourth imaging area H4, corresponding to each of the cameras 87A, 88A, 87B and 88B.

The following describes the functions of the three-dimensional measurement device 1. The configuration of one or more embodiments simultaneously executes radiation of the first wavelength light and radiation of the second wavelength light by the first projection optical system 2A and radiation of the third wavelength light and radiation of the fourth wavelength light by the second projection optical system 2B. Accordingly, the optical path of the first light as the combined light of the first wavelength light and the second wavelength light and the optical path of the second light as the combined light of the third wavelength light and the fourth wavelength light partly overlap each other. For the better understanding, the optical path of the first light and the optical path of the second light are illustrated in different drawings and are described individually.

Figure 9:
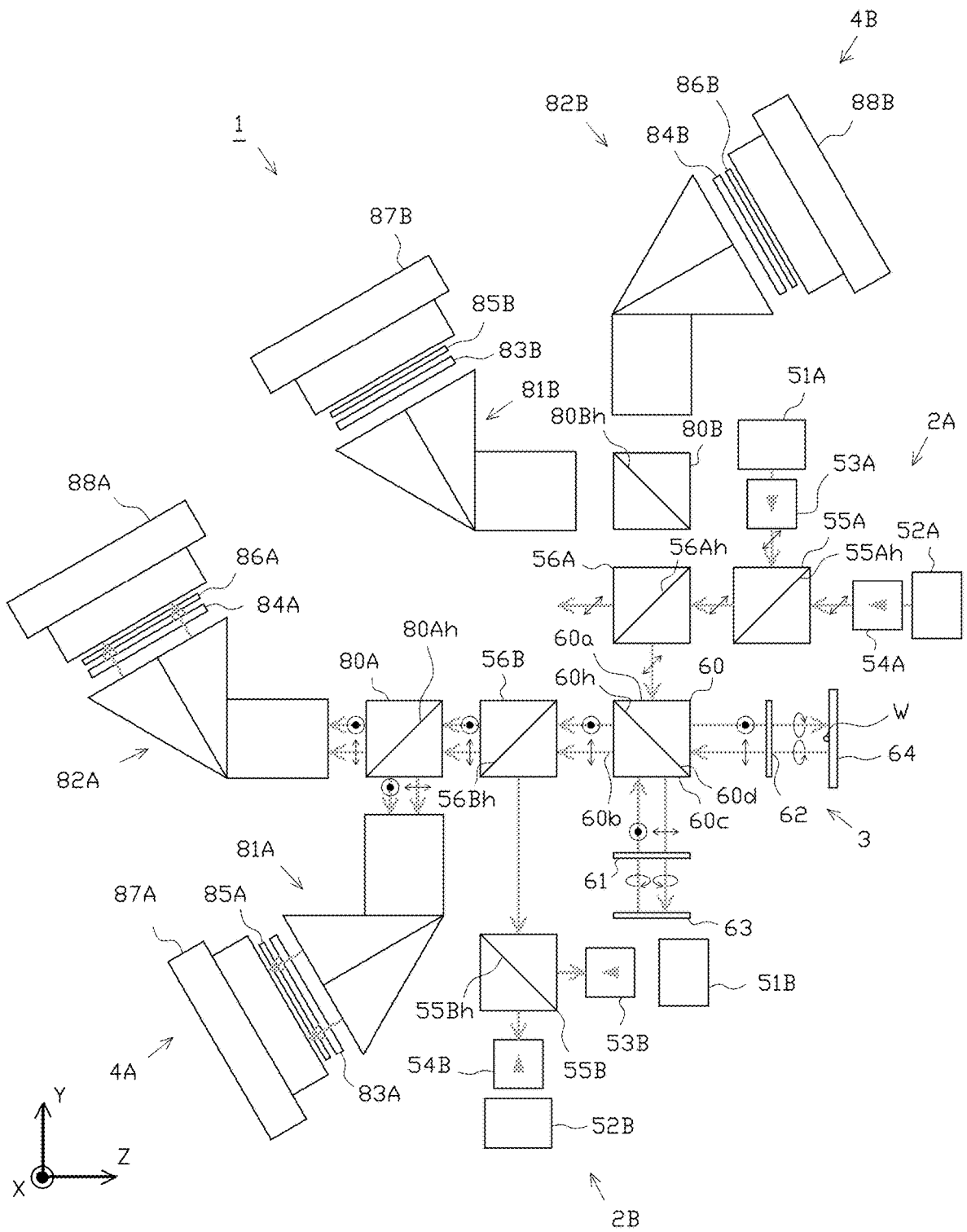
FIG. 9 is an optical path diagram illustrating an optical path of first light (first wavelength light and second wavelength light) according to one or more embodiments of the present invention.

The optical path of the first light (first wavelength light and second wavelength light) is described first with reference to FIG. 9. As shown in FIG. 9, the first wavelength light of the first wavelength $\lambda_1$ (linearly polarized light having the polarizing direction that is inclined at 45 degrees to the X-axis direction and the Z-axis direction) is emitted downward in the Y-axis direction from the first light emitter 51A. Simultaneously, the second wavelength light of the second wavelength $\lambda_2$ (linearly polarized light having the polarizing direction that is inclined at 45 degrees to the X-axis direction and the Y-axis direction) is emitted leftward in the Z-axis direction from the second light emitter 52A.

The first wavelength light emitted from the first light emitter 51A passes through the first light isolator 53A and enters the first combining dichroic mirror 55A. Simultaneously, the second wavelength light emitted from the second light emitter 52A passes through the second light isolator 54A and enters the first combining dichroic mirror 55A.

The first wavelength light and the second wavelength light entering the first combining dichroic mirror 55A are combined with each other, and the combined light is emitted leftward in the Z-axis direction toward the first non-polarizing beam splitter 56A, as the first light (linearly polarized light having the polarizing direction that is inclined at 45 degrees to the X-axis direction and the Y-axis direction).

Part of the first light entering the first non-polarizing beam splitter 56A is transmitted leftward in the Z-axis direction, while the remaining part is reflected downward in the Y-axis direction. The first light reflected downward in the Y-axis direction (linearly polarized light having the polarizing direction that is inclined at 45 degrees to the X-axis direction and the Z-axis direction) enters the first surface 60a of the polarizing beam splitter 60. The first light transmitted leftward in the Z-axis direction, on the other hand, does not enter any optical system or the like but is left as waste light.

This waste light may be used for measurement of the wavelength or for measurement of the light power as appropriate. This stabilizes the light source and thereby improves the measurement accuracy (the same applies hereinafter).

With regard to the first light entering the first surface 60a of the polarizing beam splitter 60 downward in the Y-axis direction, its P-polarized light component is transmitted downward in the Y-axis direction and is emitted from the third surface 60c as reference light, whereas its S-polarized light component is reflected rightward in the Z-axis direction and is emitted from the fourth surface 60d as measurement light.

The reference light (P-polarized light) with regard to the first light emitted from the third surface 60c of the polarizing beam splitter 60 passes through the quarter wave plate 61 to be converted into clockwise circularly polarized light and is then reflected by the reference surface 63. In this process, the rotating direction relative to the traveling direction of light is maintained. The reference light with regard to the first light subsequently passes through the quarter wave plate 61 again to be converted from the clockwise circularly polarized light into S-polarized light and reenters the third surface 60c of the polarizing beam splitter 60.

The measurement light (S-polarized light) with regard to the first light emitted from the fourth surface 60d of the polarizing beam splitter 60, on the other hand, passes through the quarter wave plate 62 to be converted into counterclockwise circularly polarized light and is then reflected by the work W. In this process, the rotating direction relative to the traveling direction of light is maintained. The measurement light with regard to the first light subsequently passes through the quarter wave plate 62 again to be converted from the counterclockwise circularly polarized light into P-polarized light and then reenters the fourth surface 60d of the polarizing beam splitter 60.

The reference light (S-polarized light) with regard to the first light reentering the third surface 60c of the polarizing beam splitter 60 is reflected by the joint surface 60h leftward in the Z-axis direction, while the measurement light (P-polarized light) with regard to the first light reentering the fourth surface 60d is transmitted through the joint surface 60h leftward in the Z-axis direction. The combined light generated by combining the reference light and the measurement light with regard to the first light is then emitted as the output light from the second surface 60b of the polarizing beam splitter 60.

The combined light (reference light and measurement light) with regard to the first light emitted from the second surface 60b of the polarizing beam splitter 60 enters the second non-polarizing beam splitter 56B. Part of the combined light with regard to the first light entering the second non-polarizing beam splitter 56B leftward in the Z-axis direction is transmitted leftward in the Z-axis direction, while the remaining part is reflected downward in the Y-axis direction. The combined light (reference light and measurement light) transmitted leftward in the Z-axis direction enters the first separating dichroic mirror 80A of the first imaging system 4A. The combined light reflected downward in the Y-axis direction, on the other hand, enters the second combining dichroic mirror 55B but is blocked by the third light isolator 53B or by the fourth light isolator 54B to be left as waste light.

In the combined light (reference light and measurement light) with regard to the first light entering the first separating dichroic mirror 80A, the combined light (reference light and measurement light) with regard to the first wavelength light is reflected by the joint surface 80Ah downward in the Y-axis direction and enters the first spectral optical system 81A, while the combined light (reference light and measurement light) with regard to the second wavelength light is transmitted through the joint surface 80Ah leftward in the Z-axis direction and enters the second spectral optical system 82A.

The combined light (reference light and measurement light) with regard to the first wavelength light entering the first spectral optical system 81A is split into four lights (split lights FB1 to FB4) as described above. Simultaneously, the combined light (reference light and measurement light) with regard to the second wavelength light entering the second spectral optical system 82A is split into four lights (split lights FB1 to FB4).

With regard to each of the four split combined lights (reference lights and measurement lights) of the first wavelength light split by the first spectral optical system 81A, the quarter wave plate unit 83A converts its reference light component (S-polarized light component) into counterclockwise circularly polarized light, while converting its measurement light component (P-polarized light component) into clockwise circularly polarized light.

Simultaneously, with regard to each of the four split combined lights (reference lights and measurement lights) of the second wavelength light split by the second spectral optical system 82A, the quarter wave plate unit 84A converts its reference light component (S-polarized light component) into counterclockwise circularly polarized light, while converting its measurement light component (P-polarized light component) into clockwise circularly polarized light. The counterclockwise circularly polarized light and the clockwise circularly polarized light have different rotating directions and accordingly do not interfere with each other.

The four combined lights with regard to the first wavelength light passing through the quarter wave plate unit 83A then respectively pass through (the four polarizers 160a to 160d of) the first filter unit 85A, so that the reference light component and the measurement light component interfere with each other in the phase according to the angle of each of the polarizers 160a to 160d. Simultaneously, the four combined lights with regard to the second wavelength light passing through the quarter wave plate unit 84A then respectively pass through (the four polarizers 160a to 160d of) the second filter unit 86A, so that the reference light component and the measurement light component interfere with each other in the phase according to the angle of each of the polarizers 160a to 160d.

The four interfering lights with regard to the first wavelength light passing through (the four polarizers 160a to 160d of) the first filter unit 85A (interfering light having the phase of "0 degree" passing through the first polarizer 160a, interfering light having the phase of "90 degrees" passing through the second polarizer 160b, interfering light having the phase of "180 degrees" passing through the third polarizer 160c and interfering light having the phase of "270 degrees" passing through the fourth polarizer 160d) enter the first camera 87A.

Simultaneously, the four interfering lights with regard to the second wavelength light passing through (the four polarizers 160a to 160d of) the second filter unit 86A (interfering light having the phase of "0 degree" passing through the first polarizer 160a, interfering light having the phase of "90 degrees" passing through the second polarizer 160b, interfering light having the phase of "180 degrees" passing through the third polarizer 160c and interfering light having the phase of "270 degrees" passing through the fourth polarizer 160d) enter the second camera 88A.

Figure 10:
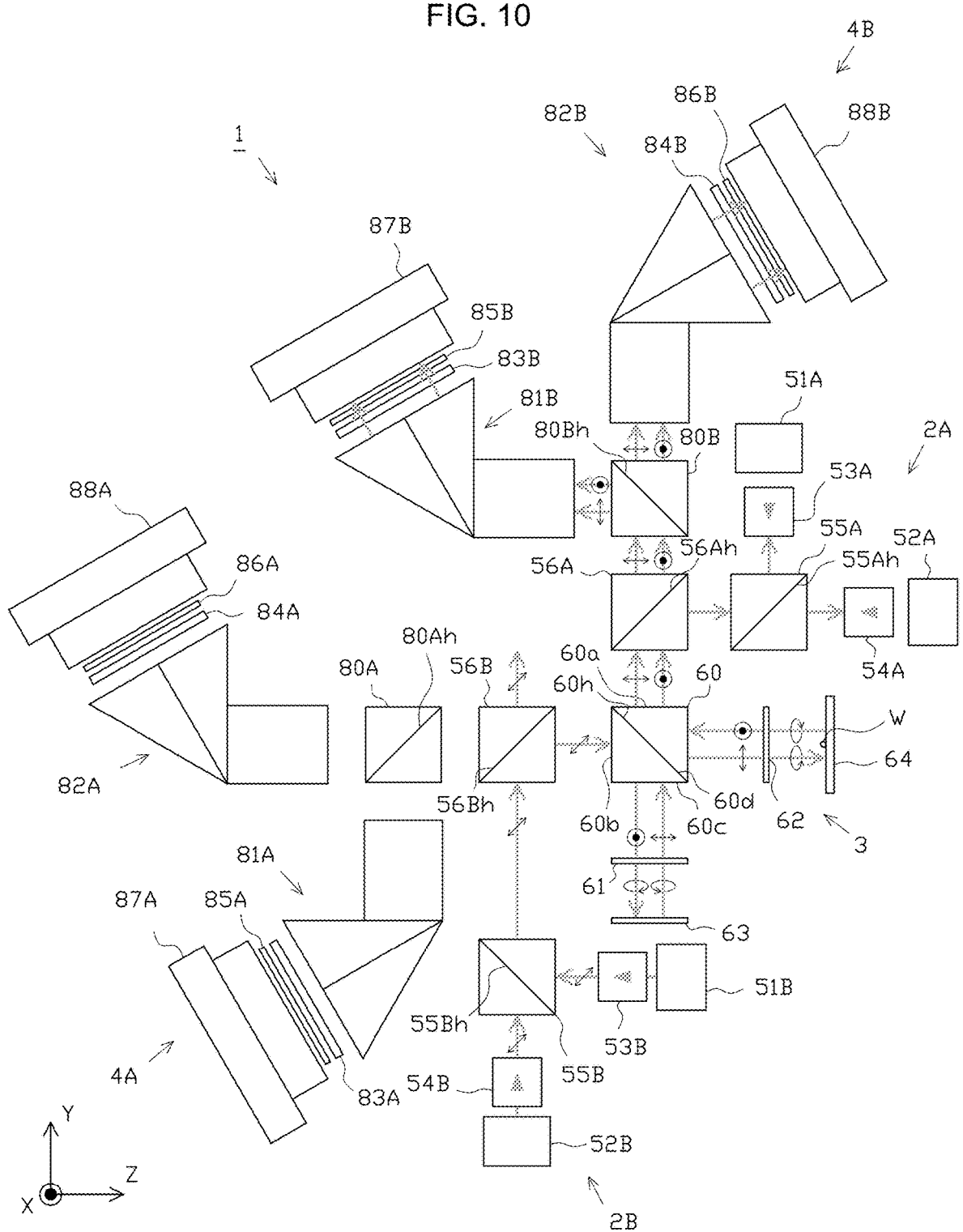
FIG. 10 is an optical path diagram illustrating an optical path of second light (third wavelength light and fourth wavelength light) according to one or more embodiments of the present invention.

The following describes the optical path of the second light (third wavelength light and fourth wavelength light) with reference to FIG. 10. As shown in FIG. 10, the third wavelength light of the third wavelength $\lambda_3$ (linearly polarized light having the polarizing direction that is inclined at 45 degrees to the X-axis direction and the Y-axis direction) is emitted leftward in the Z-axis direction from the third light emitter 51B. Simultaneously, the fourth wavelength light of the fourth wavelength $\lambda_4$ (linearly polarized light having the polarizing direction that is inclined at 45 degrees to the X-axis direction and the Z-axis direction) is emitted upward in the Y-axis direction from the fourth light emitter 52B.

The third wavelength light emitted from the third light emitter 51B passes through the third light isolator 53B and enters the second combining dichroic mirror 55B. Simultaneously, the fourth wavelength light emitted from the fourth light emitter 52B passes through the fourth light isolator 54B and enters the second combining dichroic mirror 55B.

The third wavelength light and the fourth wavelength light entering the second combining dichroic mirror 55B are combined with each other, and the combined light is emitted upward in the Y-axis direction toward the second non-polarizing beam splitter 56B, as the second light (linearly polarized light having the polarizing direction that is inclined at 45 degrees to the X-axis direction and the Z-axis direction).

Part of the second light entering the second non-polarizing beam splitter 56B is transmitted upward in the Y-axis direction, while the remaining part is reflected rightward in the Z-axis direction. The second light reflected rightward in the Z-axis direction (linearly polarized light having the polarizing direction that is inclined at 45 degrees to the X-axis direction and the Y-axis direction) enters the second surface 60b of the polarizing beam splitter 60. The second light transmitted upward in the Y-axis direction, on the other hand, does not enter any optical system or the like but is left as waste light.

With regard to the second light entering the second surface 60b of the polarizing beam splitter 60 rightward in the Z-axis direction, its S-polarized light component is reflected downward in the Y-axis direction and is emitted from the third surface 60c as the reference light, while its P-polarized light component is transmitted rightward in the Z-axis direction and is emitted from the fourth surface 60d as the measurement light.

The reference light (S-polarized light) with regard to the second light emitted from the third surface 60c of the polarizing beam splitter 60 passes through the quarter wave plate 61 to be converted into counterclockwise circularly polarized light and is then reflected by the reference surface 63. In this process, the rotating direction relative to the traveling direction of light is maintained. The reference light with regard to the second light subsequently passes through the quarter wave plate 61 again to be converted from the counterclockwise circularly polarized light into P-polarized light and reenters the third surface 60c of the polarizing beam splitter 60.

The measurement light (P-polarized light) with regard to the second light emitted from the fourth surface 60d of the polarizing beam splitter 60, on the other hand, passes through the quarter wave plate 62 to be converted into clockwise circularly polarized light and is then reflected by the work W. In this process, the rotating direction relative to the traveling direction of light is maintained. The measurement light with regard to the second light subsequently passes through the quarter wave plate 62 again to be converted from the clockwise circularly polarized light into S-polarized light and then reenters the fourth surface 60d of the polarizing beam splitter 60.

The reference light (P-polarized light) with regard to the second light reentering the third surface 60c of the polarizing beam splitter 60 is transmitted through the joint surface 60h upward in the Y-axis direction, while the measurement light (S-polarized light) with regard to the second light reentering the fourth surface 60d is reflected by the joint surface 60h upward in the Y-axis direction. The combined light generated by combining the reference light and the measurement light with regard to the second light is then emitted as the output light from the first surface 60a of the polarizing beam splitter 60.

The combined light (reference light and measurement light) with regard to the second light emitted from the first surface 60a of the polarizing beam splitter 60 enters the first non-polarizing beam splitter 56A. Part of the combined light with regard to the second light entering the first non-polarizing beam splitter 56A upward in the Y-axis direction is transmitted upward in the Y-axis direction, while the remaining part is reflected rightward in the Z-axis direction. The combined light (reference light and measurement light) transmitted upward in the Y-axis direction enters the second separating dichroic mirror 80B of the second imaging system 4B. The combined light reflected rightward in the Z-axis direction, on the other hand, enters the first combining dichroic mirror 55A but is blocked by the first light isolator 53A or by the second light isolator 54A to be left as waste light.

In the combined light (reference light and measurement light) with regard to the second light entering the second separating dichroic mirror 80B, the combined light (reference light and measurement light) with regard to the third wavelength light is reflected by the joint surface 80Bh leftward in the Z-axis direction and enters the third spectral optical system 81B, while the combined light (reference light and measurement light) with regard to the fourth wavelength light is transmitted through the joint surface 80Bh upward in the Y-axis direction and enters the fourth spectral optical system 82B.

The combined light (reference light and measurement light) with regard to the third wavelength light entering the third spectral optical system 81B is split into four lights (split lights FB1 to FB4) as described above. Simultaneously, the combined light (reference light and measurement light) with regard to the fourth wavelength light entering the fourth spectral optical system 82B is split into four lights (split lights FB1 to FB4).

With regard to each of the four split combined lights (reference lights and measurement lights) of the third wavelength light split by the third spectral optical system 81B, the quarter wave plate unit 83B converts its reference light component (P-polarized light component) into clockwise circularly polarized light, while converting its measurement light component (S-polarized light component) into counterclockwise circularly polarized light.

Simultaneously, with regard to each of the four split combined lights (reference lights and measurement lights) of the fourth wavelength light split by the fourth spectral optical system 82B, the quarter wave plate unit 84B converts its reference light component (P-polarized light component) into clockwise circularly polarized light, while converting its measurement light component (S-polarized light component) into counterclockwise circularly polarized light. The counterclockwise circularly polarized light and the clockwise circularly polarized light have different rotating directions and accordingly do not interfere with each other.

The four combined lights with regard to the third wavelength light passing through the quarter wave plate unit 83B then respectively pass through (the four polarizers 160a to 160d of) the third filter unit 85B, so that the reference light component and the measurement light component interfere with each other in the phase according to the angle of each of the polarizers 160a to 160d. Simultaneously, the four combined lights with regard to the fourth wavelength light passing through the quarter wave plate unit 84B then respectively pass through (the four polarizers 160a to 160d of) the fourth filter unit 86B, so that the reference light component and the measurement light component interfere with each other in the phase according to the angle of each of the polarizers 160a to 160d.

The four interfering lights with regard to the third wavelength light passing through (the four polarizers 160a to 160d of) the third filter unit 85B (interfering light having the phase of "0 degree" passing through the first polarizer 160a, interfering light having the phase of "90 degrees" passing through the second polarizer 160b, interfering light having the phase of "180 degrees" passing through the third polarizer 160c and interfering light having the phase of "270 degrees" passing through the fourth polarizer 160d) enter the third camera 87B.

Simultaneously, the four interfering lights with regard to the fourth wavelength light passing through (the four polarizers 160a to 160d of) the fourth filter unit 86B (interfering light having the phase of "0 degree" passing through the first polarizer 160a, interfering light having the phase of "90 degrees" passing through the second polarizer 160b, interfering light having the phase of "180 degrees" passing through the third polarizer 160c and interfering light having the phase of "270 degrees" passing through the fourth polarizer 160d) enter the fourth camera 88B.

The following describes a procedure of shape measurement process executed by the control device 5. The control device 5 first drives and controls the first projection optical system 2A and the second projection optical system 2B to simultaneously execute radiation of the first wavelength light from the first light emitter 51A, radiation of the second wavelength light from the second light emitter 52A, radiation of the third wavelength light from the third light emitter 51B, and radiation of the fourth wavelength light from the fourth light emitter 52B.

This causes the first light that is the combined light of the first wavelength light and the second wavelength light to enter the first surface 60a of the polarizing beam splitter 60, while causing the second light that is the combined light of the third wavelength light and the fourth wavelength light to enter the second surface 60b of the polarizing beam splitter 60.

As a result, the combined light (reference light and measurement light) with regard to the first light is emitted from the second surface 60b of the polarizing beam splitter 60, while the combined light (reference light and measurement light) with regard to the second light is emitted from the first surface 60a of the polarizing beam splitter 60.

Part of the combined light with regard to the first light emitted from the polarizing beam splitter 60 enters the first imaging system 4A to be separated into combined light (reference light and measurement light) with regard to the first wavelength light and combined light (reference light and measurement light) with regard to the second wavelength light. The combined light with regard to the first wavelength light is split into four by the first spectral optical system 81A and then enters the first camera 87A via the quarter wave plate unit 83A and the first filter unit 85A. Simultaneously, the combined light with regard to the second wavelength light is split into four by the second spectral optical system 82A and then enters the second camera 88A via the quarter wave plate unit 84A and the second filter unit 86A.

Part of the combined light with regard to the second light emitted from the polarizing beam splitter 60, on the other hand, enters the second imaging system 4B to be separated into combined light (reference light and measurement light) with regard to the third wavelength light and combined light (reference light and measurement light) with regard to the fourth wavelength light. The combined light with regard to the third wavelength light is split into four by the third spectral optical system 81B and then enters the third camera 87B via the quarter wave plate unit 83B and the third filter unit 85B. Simultaneously, the combined light with regard to the fourth wavelength light is split into four by the fourth spectral optical system 82B and then enters the fourth camera 88B via the quarter wave plate unit 84B and the fourth filter unit 86B.

The control device 5 subsequently drives and controls the first imaging system 4A and the second imaging system 4B to simultaneously execute imaging with the first camera 87A, imaging with the second camera 88A, imaging with the third camera 87B and imaging with the fourth camera 88B.

As a result, the first camera 87A (imaging areas H1 to H4 of the imaging element 170) obtains four interference fringe images with regard to the first wavelength light having the phases that differ by 90 degrees each, as one image data. The second camera 88A (imaging areas H1 to H4 of the imaging element 170) obtains four interference fringe images with regard to the second wavelength light having the phases that differ by 90 degrees each, as one image data. The third camera 87B (imaging areas H1 to H4 of the imaging element 170) obtains four interference fringe images with regard to the third wavelength light having the phases that differ by 90 degrees each, as one image data. The fourth camera 88B (imaging areas H1 to H4 of the imaging element 170) obtains four interference fringe images with regard to the fourth wavelength light having the phases that differ by 90 degrees each, as one image data.

The control device 5 divides one image data obtained from the first camera 87A into four interference fringe image data (respective ranges corresponding to the imaging areas H1 to H4 of the imaging element 170) and stores the four interference fringe image data into first to fourth image memories provided in the image data storage device 154 corresponding to the first camera 87A.

Simultaneously, the control device 5 executes the similar process with regard to the image data obtained respectively from the second camera 88A, the third camera 87B and the fourth camera 88B, and stores interference fringe image data into first to fourth image memories corresponding to each of the cameras 88A, 87B and 88B.

The control device 5 subsequently measures the surface shape of the work W by a phase shift method, based on the four interference fringe image data with regard to the first wavelength light, the four interference fringe image data with regard to the second wavelength light, the four interference fringe image data with regard to the third wavelength light and the four interference fringe image data with regard to the fourth wavelength light stored in the image data storage device 154. More specifically, the control device 5 calculates height information at respective positions on the surface of the work W.

The following describes the principle of height measurement by a standard phase shift method using an interference optical system.

Interference fringe intensities of four interference fringe image data of predetermined light (for example, first wavelength light) at an identical coordinate position (x,y), i.e., luminance values $I_1(x,y)$, $I_2(x,y)$, $I_3(x,y)$ and $I_4(x,y)$, are expressed by relational expressions of [Math. 1] given below:

$$I_1(x,y)=B(x,y)+A(x,y)\cos[\Delta\phi(x,y)]$$

$$I_2(x,y)=B(x,y)+A(x,y)\cos[\Delta\phi(x,y)+90°]$$

$$I_3(x,y)=B(x,y)+A(x,y)\cos[\Delta\phi(x,y)+180°]$$

$$I_4(x,y)=B(x,y)+A(x,y)\cos[\Delta\phi(x,y)+270°] \quad \text{[Math. 1]}$$

Herein $\Delta\phi(x,y)$ denotes a phase difference based on the optical path difference between the measurement light and the reference light at the coordinates (x,y). A(x,y) denotes an amplitude of the interfering light, and B(x,y) denotes a bias. The reference light is, however, uniform. From this point of view, $\Delta\phi(x,y)$ denotes a "phase of the measurement light", and A(x,y) denotes an "amplitude of the measurement light".

Accordingly the phase $\Delta\phi(x,y)$ of the measurement light is determined by a relational expression of [Math. 2] given below, based on the relational expressions of [Math. 1] given above:

$$\Delta\phi(x, y) = \arctan\frac{I_4(x, y) - I_2(x, y)}{I_1(x, y) - I_3(x, y)} \quad \text{[Math. 2]}$$

The amplitude A(x,y) of the measurement light is determined by a relational expression of [Math. 3] given below, based on the relational expressions of [Math. 1] given above:

$$A(x, y) = \frac{1}{2} \times \sqrt{\{I_1(x, y) - I_3(x, y)\}^2 + \{I_4(x, y) - I_2(x, y)\}^2} \quad \text{[Math. 3]}$$

A complex amplitude Eo(x,y) on an imaging element surface is then calculated from the above phase Δφ(x,y) and amplitude A(x,y) according to a relational expression of [Math. 4] given below, where i denotes an imaginary unit.

$$E_0(x,y) = A(x,y)e^{i\phi(x,y)} \quad \text{[Math. 4]}$$

A complex amplitude Eo(ξ,η) at coordinates (ξ,η) on a surface of the work W is subsequently calculated, based on the complex amplitude Eo(x,y).

The above complex amplitude Eo(x,y) is subjected to Fresnel transform as shown by [Math. 5] given below, where λ denotes a wavelength:

$$E_0(x, y) = \quad \text{[Math. 5]}$$

$$\frac{i}{\lambda} \int_{-\infty}^{\infty} \int_{-\infty}^{\infty} E_0(\xi, \eta) \frac{\exp\left(-i\frac{2\pi}{\lambda}\sqrt{d^2 + (\xi - x)^2 + (\eta - y)^2}\right)}{\sqrt{d^2 + (\xi - x)^2 + (\eta - y)^2}}$$

$$d\xi d\eta = \mathcal{F}^{-1}\{\mathcal{F}(E_0(\xi, \eta)) \cdot \mathcal{F}(g(\xi, \eta, x, y))\}$$

$$g(\xi, \eta, x, y) = \frac{i}{\lambda} \frac{\exp\left(-i\frac{2\pi}{\lambda}\sqrt{d^2 + (\xi - x)^2 + (\eta - y)^2}\right)}{\sqrt{d^2 + (\xi - x)^2 + (\eta - y)^2}}$$

$\mathcal{F}$: Fourier Transform $\mathcal{F}^{-1}$: Inverse Fourier Transform

[Math. 6] given below is obtained by solving this expression with respect to Eo(ξ,η):

$$E_0(\xi, \eta) = \mathcal{F}^{-1}\left\{\frac{\mathcal{F}(E_0(x, y))}{\mathcal{F}(g(\xi, \eta, x, y))}\right\} \quad \text{[Math. 6]}$$

A phase φ(ξ,η) of the measurement light and an amplitude A(ξ,η) of the measurement light are then calculated from the obtained complex amplitude Eo(ξ,η) according to a relational expression of [Math. 7] given below:

$$E_0(\xi,\eta) = A(\xi,\eta)e^{i\phi(\xi,\eta)} \quad \text{[Math. 7]}$$

The phase φ(ξ,η) of the measurement light is determined according to a relational expression of [Math. 8] given below:

$$\phi(\xi, \eta) = \arctan\frac{\text{Im}[E_0(\xi, \eta)]}{\text{Re}[E_0(\xi, \eta)]} \quad \text{[Math. 8]}$$

The amplitude A(ξ,η) of the measurement light is determined according to a relational expression of [Math. 9] given below:

$$A(\xi,\eta) = \sqrt{(\text{Re}[E_0(\xi,\eta)])^2 + (\text{Im}[E_0(\xi,\eta)])^2} \quad \text{[Math. 9]}$$

Height information z(ξ,η) representing a concavo-convex shape on the surface of the work W three-dimensionally is then calculated by a phase-height conversion process.

The height information z(ξ,η) is calculated according to a relational expression of [Math. 10] given below:

$$Z(\xi, \eta) = \frac{1}{2}\phi(\xi, \eta)\frac{\lambda}{2\pi} \quad \text{[Math. 10]}$$

The following describes the principle of a two-wavelength phase shift method using two different lights having different wavelengths (for example, the "first wavelength light" and the "third wavelength light"). Using the two different lights having different wavelengths expands the measurement range. This principle is also applicable to the case of using three different lights or four different lights.

Measurement using two different lights having different wavelengths (for example, first light having a wavelengths $\lambda_{c1}$ and second light having a wavelength $\lambda_{c2}$) is equivalent to measurement using a light of a combined wavelength $\lambda_{c0}$, and the measurement range is expanded to $\lambda_{c0}/2$. The combined wavelength $\lambda_{c0}$ is expressed by Equation (M1) given below:

$$\lambda_{c0} = (\lambda_{c1} \times \lambda_{c2})/(\lambda_{c2} - \lambda_{c1}) \quad \text{(M1)}$$

where $\lambda_{c2} > \lambda_{c1}$.

For example, when $\lambda_{c1} = 1500$ nm and $\lambda_{c2} = 1503$ nm, $\lambda_{c0} = 751.500$ μm according to Equation (M1) given above, and the measurement range is $\lambda_{c0}/2 = 375.750$ μm.

In the two-wavelength phase shift method, a phase $\varphi_1(\xi, \eta)$ of the measurement light with regard to the first light at coordinates (ξ,η) on the surface of the work W is calculated (as shown by [Math. 8] given above), based on the luminance values $I_1(x,y)$, $I_2(x,y)$, $I_3(x,y)$ and $I_4(x,y)$ of the four interference fringe image data with regard to the first light having the wavelength $\lambda_{c1}$ (as shown by [Math. 1] given above). The phase $\varphi_1(\xi,\eta)$ calculated here corresponds to the "first measurement value" or the "second measurement value" according to one or more embodiments, and the "first measurement value obtaining unit" or the "second measurement value obtaining unit" is configured by the processing function of calculating this phase.

In measurement with regard to the first light, height information z(ξ,η) at coordinates (ξ,η) is expressed by Equation (M2) given below:

$$z(\xi, \eta) = d_1(\xi, \eta)/2 \quad \text{(M2)}$$
$$= [\lambda_{c1} \times \varphi_1(\xi, \eta)/4\pi] + [m_1(\xi, \eta) \times \lambda_{c1}/2]$$

where $d_1(\xi,\eta)$ denotes an optical path difference between the measurement light and the reference light with regard to the first light, and $m_1(\xi,\eta)$ denotes a fringe order with regard to the first light.

The phase $\varphi_1(\xi,\eta)$ is accordingly expressed by Equation (M2') given below:

$$\varphi_1(\xi,\eta) = (4\pi/\lambda_{c1}) \times z(\xi,\eta) - 2\pi m_1(\xi,\eta) \quad \text{(M2')}$$

Similarly, a phase $\varphi_2(\xi,\eta)$ of the measurement light with regard to the second light at coordinates (ξ,η) on the surface of the work W is calculated (as shown by [Math. 8] given above), based on the luminance values $I_1(x,y)$, $I_2(x,y)$, $I_3(x,y)$ and $I_4(x,y)$ of the four interference fringe image data with regard to the second light having the wavelength $\lambda_{c2}$ (as shown by [Math. 1] given above). The phase $\varphi_2(\xi,\eta)$ calculated here corresponds to the "third measurement value" or the "fourth measurement value" according to one or more embodiments, and the "third measurement value obtaining unit" or the "fourth measurement value obtaining unit" is configured by the processing function of calculating this phase.

In measurement with regard to the second light, height information $z(\xi,\eta)$ at coordinates $(\xi,\eta)$ is expressed by Equation (M3) given below:

$$z(\xi, \eta) = d_2(\xi, \eta)/2 \qquad (M3)$$
$$= [\lambda_{c2} \times \varphi_2(\xi, \eta)/4\pi] + [m_2(\xi, \eta) \times \lambda_{c2}/2]$$

where $d_2(\xi,\eta)$ denotes an optical path difference between the measurement light and the reference light with regard to the second light, and $m_2(\xi,\eta)$ denotes a fringe order with regard to the second light.

The phase $\varphi_2(\xi,\eta)$ is accordingly expressed by Equation (M3') given below:

$$\varphi_2(\xi,\eta)=(4\pi/\lambda_{c2})\times z(\xi,\eta)-2\pi m_2(\xi,\eta) \qquad (M3')$$

Subsequently, the fringe order $m_1(\xi,\eta)$ with regard to the first light having the wavelength $\lambda_{c1}$ or the fringe order $m_2(\xi,\eta)$ with regard to the second light having the wavelength $\lambda_{c2}$ is determined. The fringe orders $m_1$ and $m_2$ may be determined, based on an optical path difference $\Delta d$ and a wavelength difference $\Delta\lambda$ of the two different lights (having the wavelengths $\lambda_{c1}$ and $\lambda_{c2}$). The optical path difference $\Delta d$ and the wavelength difference $\Delta\lambda$ are respectively expressed by Equations (M4) and (M5) given below:

$$\Delta d=(\lambda_{c1}\times\varphi_1-\lambda_{c2}\times\varphi_2)/2\pi \qquad (M4)$$

$$\Delta\lambda=\lambda_{c2}-\lambda_{c1} \qquad (M5)$$

where $\lambda_{c2}>\lambda_{c1}$.

In the measurement range of the combined wavelength $\lambda_{c0}$ of the two wavelengths, the relationship between the fringe orders $m_1$ and $m_2$ is classified into the following three cases. Different computation expressions are employed to determine the fringe orders $m_1(\xi,\eta)$ and $m_2(\xi,\eta)$ in the respective cases. The following describes a technique of determining, for example, the fringe order $m_1(\xi,\eta)$. A similar technique may be employed to determine the fringe order $m_2(\xi,\eta)$.

For example, in the case of "$\varphi_1-\varphi_2<-\pi$", "$m_1-m_2=-1$". In this case, $m_1$ is expressed by Equation (M6) given below:

$$m_1 = (\Delta d/\Delta\lambda) - (\lambda_{c2}/\Delta\lambda) \qquad (M6)$$
$$= (\lambda_{c1}\times\varphi_1 - \lambda_{c2}\times\varphi_2)/2\pi(\lambda_{c2}-\lambda_{c1}) - \lambda_{c2}/(\lambda_{c2}-\lambda_{c1})$$

In the case of "$-\pi<\varphi_1-\varphi_2<\pi$", "$m_1-m_2=0$". In this case, $m_1$ is expressed by Equation (M7) given below:

$$m_1 = \Delta d/\Delta\lambda \qquad (M7)$$
$$= (\lambda_{c1}\times\varphi_1 - \lambda_{c2}\times\varphi_2)/2\pi(\lambda_{c2}-\lambda_{c1})$$

In the case of "$\varphi_1-\varphi_2>\pi$", "$m_1-m_2=+1$". In this case, $m_1$ is expressed by Equation (M8) given below:

$$m_1 = (\Delta d/\Delta\lambda) - (\lambda_2/\Delta\lambda) \qquad (M8)$$
$$= (\lambda_{c1}\times\varphi_1 - \lambda_{c2}\times\varphi_2)/2\pi(\lambda_{c2}-\lambda_{c1}) + \lambda_{c2}/(\lambda_{c2}-\lambda_{c1})$$

The height information $z(\xi,\eta)$ is obtained according to Equation (M2) or (M3) given above, based on the fringe order $m_1(\xi,\eta)$ or $m_2(\xi,\eta)$ thus obtained. The "height information obtaining unit" is configured by this processing function. The measurement results (height information) of the work W thus determined are stored in the calculation result storage device 155 of the control device 5.

As described above in detail, the embodiments are configured to cause the first light that is the combined light of the first wavelength light and the second wavelength light to enter the first surface 60a of the polarizing beam splitter 60 and to cause the second light that is the combined light of the third wavelength light and the fourth wavelength light to enter the second surface 60b of the polarizing beam splitter 60. This configuration causes the reference light and the measurement light with regard to the first light and the reference light and the measurement light with regard to the second light to be respectively split into different polarized light components (P-polarized light and S-polarized light). The first light and the second light entering the polarizing beam splitter 60 accordingly do not interfere with each other but are separately emitted from the polarizing beam splitter 60.

This configuration enables two different polarized lights having wavelengths close to each other to be used as the polarized lights included in the first light (first wavelength light and/or second wavelength light) and the polarized lights included in the second light (third wavelength light and/or fourth wavelength light). As a result, this configuration further expands the measurement range in three-dimensional measurement by using the two different polarized lights having wavelengths close to each other. Especially, one or more embodiments may use four different lights having different wavelengths at most and thereby remarkably expands the measurement range.

One or more embodiments are configured to separate the combined light (reference light component and measurement light component) with regard to the first light emitted from the interference optical system 3 into the combined light with regard to the first wavelength light and the combined light with regard to the second wavelength light, to separate the combined light with regard to the second light emitted from the interference optical system 3 into the combined light with regard to the third wavelength light and the combined light with regard to the fourth wavelength light, and to individually and simultaneously execute imaging of the combined light with regard to the first wavelength light, imaging of the combined light with regard to the second wavelength light, imaging of the combined light with regard to the third wavelength light and imaging of the combined light with regard to the fourth wavelength light. This configuration shortens the total imaging time and improves the efficiency of measurement.

Additionally, one or more embodiments are configured to split the combined light with regard to each wavelength light into four split lights by using the spectral optical systems 81A, 82A, 81B and 82B and to convert the four split lights into four interfering lights having the phases that differ by 90 degrees each by using the filter units 85A, 86A, 85B and 86B. This configuration simultaneously obtains all the interference fringe images required for three-dimensional measurement by the phase shift method. More specifically, this configuration simultaneously obtains a total of 16 (=4×4) interference fringe images with regard to the four different polarized lights. As a result, this further enhances the functions and the advantageous effects described above.

In the spectral optical systems 81A, 82A, 81B and 82B, the prisms 101 and 102 that are the Koester prisms are employed as means of splitting one light into two parallel lights, so that the two split lights have optically identical optical path lengths. As a result, there is no need to provide an optical path adjusting unit that adjusts the optical path lengths of the two split lights. This configuration reduces the total number of components and achieves, for example, the simplified configuration and downsizing of the device.

The light travels only in the optical members and is not exposed to the air until one light F0 entering the spectral optical system 81A, 82A, 81B or 82B is emitted as four split lights FB1 to FB4. This configuration reduces the effect of, for example, fluctuation of the air.

Furthermore, one or more embodiments are configured to change over measurement using, for example, two different polarized lights of the first wavelength light and the third wavelength light or measurement using two different polarized lights of the second wavelength light and the fourth wavelength light according to the type of the work W. The configuration of one or more embodiments enables the type (wavelength) of light to be changed over according to the type of the work W, while expanding the measurement range by using the two different polarized lights having wavelengths close to each other. As a result, this improves the convenience and versatility.

For example, a work W such as a wafer substrate for which red light is unsuitable may be subjected to measurement using two different polarized lights of the first wavelength light and the third wavelength light (for example, two blue color lights of 491 nm and 488 nm), whereas a work W such as copper for which blue color light is unsuitable may be subjected to measurement using two different polarized lights of the second wavelength light and the fourth wavelength light (for example, two green color lights of 540 nm and 532 nm).

One or more embodiments are configured to use four different polarized lights for one interference optical system 3 including one reference surface 63 as the standard, so that the four different polarized lights have an identical optical path interval which provides the optical path difference between the reference light and the measurement light. Compared with a configuration using four interference optical systems (interferometer modules), this configuration enhances the measurement accuracy and does not require a difficult task to make the optical path lengths of the four interference optical systems exactly equal to one another.

The following describes embodiments of the present invention with reference to the drawings. One or more embodiments include a different interference optical system that is different from that of the aforementioned embodiments employing the configuration of the Michelson interferometer and has a different configuration involved in the interference optical system from that of the aforementioned embodiments. The following describes the configuration of one or more embodiments different from that of the aforementioned embodiments in detail. The like components to those of the aforementioned embodiments are expressed by the like reference signs, and their detailed description is omitted.

Figure 11:
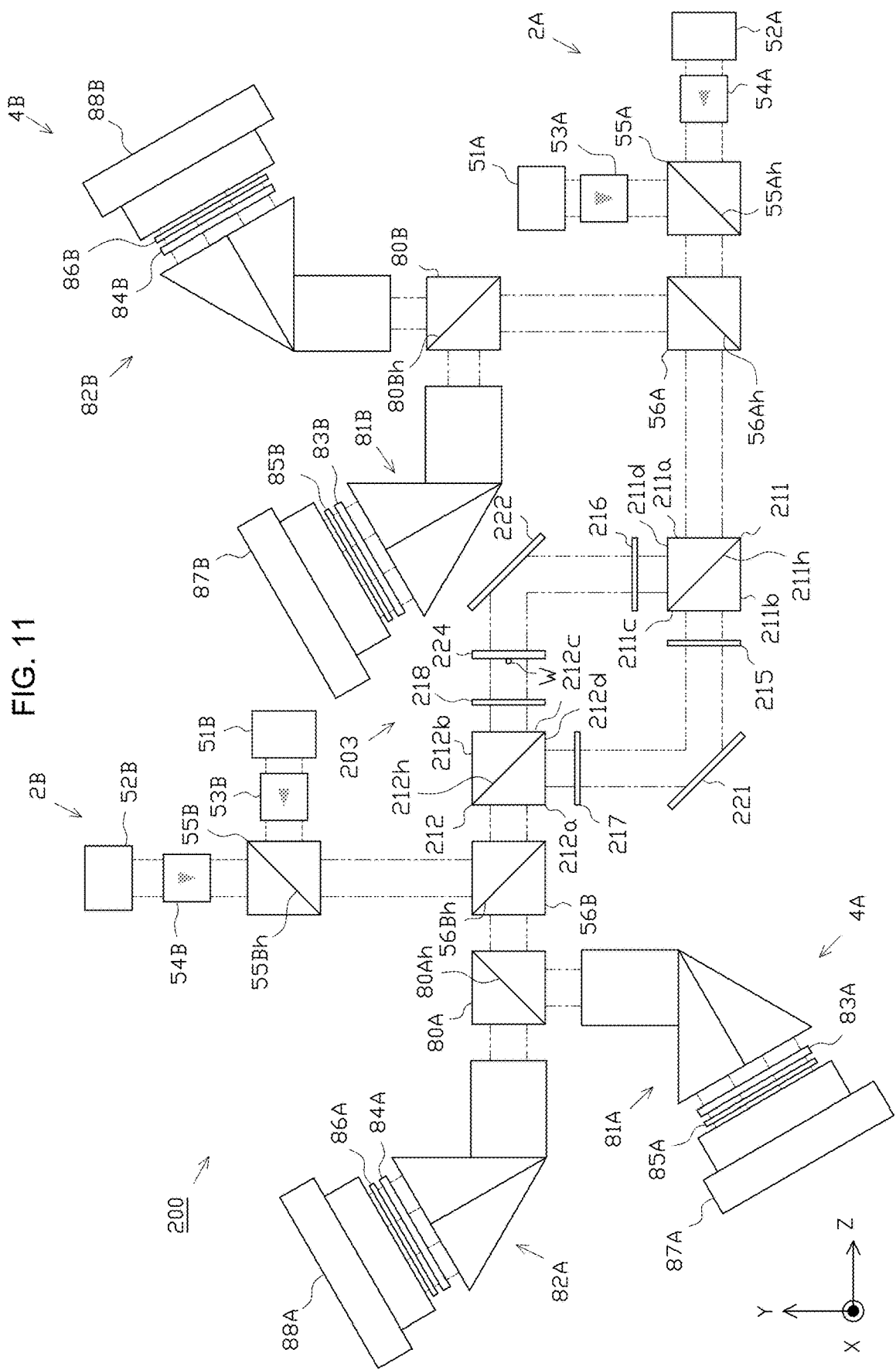
FIG. 11 is a schematic configuration diagram illustrating a three-dimensional measurement device according to one or more embodiments of the present invention.

FIG. 11 is a diagram illustrating the schematic configuration of a three-dimensional measurement device 200 according to one or more embodiments. In the description below, as a matter of convenience, a front-back direction of the sheet surface of FIG. 11 is called "X-axis direction", a top-bottom direction of the sheet surface is called "Y-axis direction" and a left-right direction of the sheet surface is called "Z-axis direction".

The three-dimensional measurement device 200 is configured based on the principle of a Mach-Zehnder interferometer and includes two projection optical systems 2A and 2B (first projection optical system 2A and second projection optical system 2B) configured to emit predetermined lights, an interference optical system 203 in which the lights respectively emitted from the projection optical systems 2A and 2B enter, two imaging systems 4A and 4B (first imaging system 4A and second imaging system 4B) in which the lights emitted from the interference optical system 203 enter, and a control device 5 configured to execute various controls, image processing, calculations and the like involved in the projection optical systems 2A and 2B, the interference optical system 203, the imaging systems 4A and 4B and the like. The "control device 5" is configured as the "image processor" according to one or more embodiments, and the "interference optical system 203" is configured as the "predetermined optical system" according to one or more embodiments.

The following describes the configuration of the interference optical system 203 in detail. The interference optical system 203 includes, for example, two polarizing beam splitters 211 and 212 (first polarizing beam splitter 211 and second polarizing beam splitter 212), four quarter wave plates 215, 216, 217 and 218 (first quarter wave plate 215, second quarter wave plate 216, third quarter wave plate 217 and fourth quarter wave plate 218), two total reflection mirrors 221 and 222 (first total reflection mirror 221 and second total reflection mirror 222) and a placement structure 224.

The polarizing beam splitters 211 and 212 are cube-shaped known optical members, each being configured by joining right angle prisms together to be integrated, and their joint surfaces (boundary surfaces) 211h and 212h are coated with, for example, a dielectric multilayer film.

Each of the polarizing beam splitters 211 and 212 is configured to split linearly polarized incident light into two polarized light components (P-polarized light component and S-polarized light component) having polarizing directions perpendicular to each other. According to one or more embodiments, the polarizing beam splitters 211 and 212 are configured to transmit the P-polarized light component and reflect the S-polarized light component. The polarizing beam splitters 211 and 212 according to one or more embodiments serve as means of splitting predetermined incident light into two lights and also serves as means of combining two predetermined incident lights.

The first polarizing beam splitter 211 is arranged such that one of two surfaces adjoining to each other across its joint surface 211h is perpendicular to the Y-axis direction and the other of the two surfaces is perpendicular to the Z-axis direction. In other words, the joint surface 211h of the first polarizing beam splitter 211 is arranged to be inclined at 45 degrees to the Y-axis direction and the Z-axis direction.

More specifically, a first surface (right side face in the Z-axis direction) 211a of the first polarizing beam splitter 211, which first light emitted leftward in the Z-axis direction from a first non-polarizing beam splitter 56A of the first projection optical system 2A enters, and a third surface (left side face in the Z-axis direction) 211c opposed to the first surface 211a are arranged to be perpendicular to the Z-axis direction. The "first polarizing beam splitter 211 (first surface 211a)" corresponds to the "first input-output element" according to one or more embodiments.

A second surface (lower side face in the Y-axis direction) 211b of the first polarizing beam splitter 211 that is a surface adjoining to the first surface 211a across the joint surface 211h and a fourth surface (upper side face in the Y-axis direction) 211d opposed to the second surface 211b are arranged to be perpendicular to the Y-axis direction.

The second polarizing beam splitter 212 is arranged such that one of two surfaces adjoining to each other across its joint surface 212h is perpendicular to the Y-axis direction and the other of the two surfaces is perpendicular to the Z-axis direction. In other words, the joint surface 212h of the second polarizing beam splitter 212 is arranged to be inclined at 45 degrees to the Y-axis direction and the Z-axis direction.

More specifically, a first surface (left side face in the Z-axis direction) 212a of the second polarizing beam splitter 212, which second light emitted rightward in the Z-axis direction from a second non-polarizing beam splitter 56B of the second projection optical system 2B enters, and a third surface (right side face in the Z-axis direction) 212c opposed to the first surface 212a are arranged to be perpendicular to the Z-axis direction. The "second polarizing beam splitter 212 (first surface 212a)" corresponds to the "second input-output element" according to one or more embodiments.

A second surface (upper side face in the Y-axis direction) 212b of the second polarizing beam splitter 212 that is a surface adjoining to the first surface 212a across the joint surface 212h and a fourth surface (lower side face in the Y-axis direction) 212d opposed to the second surface 212b are arranged to be perpendicular to the Y-axis direction.

The quarter wave plates 215, 216, 217 and 218 are optical members, each serving to convert linearly polarized light into circularly polarized light and to convert circularly polarized light into linearly polarized light.

The first quarter wave plate 215 is arranged to be opposed in the Z-axis direction to the third surface 211c of the first polarizing beam splitter 211. The first quarter wave plate 215 converts the linearly polarized light emitted from the third surface 211c of the first polarizing beam splitter 211 into circularly polarized light and emits the circularly polarized light leftward in the Z-axis direction. The first quarter wave plate 215 also converts the circularly polarized light entering rightward in the Z-axis direction into linearly polarized light and emits the linearly polarized light rightward in the Z-axis direction toward the third surface 211c of the first polarizing beam splitter 211.

The second quarter wave plate 216 is arranged to be opposed in the Y-axis direction to the fourth surface 211d of the first polarizing beam splitter 211. The second quarter wave plate 216 converts the linearly polarized light emitted from the fourth surface 211d of the first polarizing beam splitter 211 into circularly polarized light and emits the circularly polarized light upward in the Y-axis direction. The second quarter wave plate 216 also converts the circularly polarized light entering downward in the Y-axis direction into linearly polarized light and emits the linearly polarized light downward in the Y-axis direction toward the fourth surface 211d of the first polarizing beam splitter 211.

The third quarter wave plate 217 is arranged to be opposed in the Y-axis direction to the fourth surface 212d of the second polarizing beam splitter 212. The third quarter wave plate 217 converts the linearly polarized light emitted from the fourth surface 212d of the second polarizing beam splitter 212 into circularly polarized light and emits the circularly polarized light downward in the Y-axis direction. The third quarter wave plate 217 also converts the circularly polarized light entering upward in the Y-axis direction into linearly polarized light and emits the linearly polarized light upward in the Y-axis direction toward the fourth surface 212d of the second polarizing beam splitter 212.

The fourth quarter wave plate 218 is arranged to be opposed in the Z-axis direction to the third surface 212c of the second polarizing beam splitter 212. The fourth quarter wave plate 218 converts the linearly polarized light emitted from the third surface 212c of the second polarizing beam splitter 212 into circularly polarized light and emits the circularly polarized light rightward in the Z-axis direction. The fourth quarter wave plate 218 also converts the circularly polarized light entering leftward in the Z-axis direction into linearly polarized light and emits the linearly polarized light leftward in the Z-axis direction toward the third surface 212c of the second polarizing beam splitter 212.

The total reflection mirrors 221 and 222 are optical members, each serving to totally reflect the incident light. The first total reflection mirror 221 configured as the reference surface according to one or more embodiments is arranged to be inclined at 45 degrees to the Y-axis direction and the Z-axis direction at the position of an intersection of an axis line that passes through the first polarizing beam splitter 211 and the first quarter wave plate 215 and that is extended in the Z-axis direction and an axis line that passes through the second polarizing beam splitter 212 and the third quarter wave plate 217 and that is extended in the Y-axis direction.

The first total reflection mirror 221 enables the light emitted leftward in the Z-axis direction from the third surface 211c of the first polarizing beam splitter 211 (via the first quarter wave plate 215) to be reflected upward in the Y-axis direction and enter the fourth surface 212d of the second polarizing beam splitter 212 (via the third quarter wave plate 217). The first total reflection mirror 221 enables, on the contrary, the light emitted downward in the Y-axis direction from the fourth surface 212d of the second polarizing beam splitter 212 (via the third quarter wave plate 217) to be reflected rightward in the Z-axis direction and enter the third surface 211c of the first polarizing beam splitter 211 (via the first quarter wave plate 215).

The second total reflection mirror 222 is, on the other hand, arranged to be inclined at 45 degrees to the Y-axis direction and the Z-axis direction at the position of an intersection of an axis line that passes through the first polarizing beam splitter 211 and the second quarter wave plate 216 and that is extended in the Y-axis direction and an axis line that passes through the second polarizing beam splitter 212 and the fourth quarter wave plate 218 and that is extended in the Z-axis direction.

The second total reflection mirror 222 enables the light emitted upward in the Y-axis direction from the fourth surface 211d of the first polarizing beam splitter 211 (via the second quarter wave plate 216) to be reflected leftward in the Z-axis direction and enter the third surface 212c of the second polarizing beam splitter 212 (via the fourth quarter wave plate 218). The second total reflection mirror 222 enables, on the contrary, the light emitted rightward in the Z-axis direction from the third surface 212c of the second polarizing beam splitter 212 (via the fourth quarter wave plate 218) to be reflected downward in the Y-axis direction and enter the fourth surface 211d of the first polarizing beam splitter 211 (via the second quarter wave plate 216).

The placement structure 224 is used to place a work W as a measurement object thereon. According to one or more embodiments, a translucent object such as film is assumed as the work W. The placement structure 224 is placed between the fourth quarter wave plate 218 and the second total reflection mirror 222 on an axis line that passes through the second polarizing beam splitter 212 and the second total reflection mirror 222 and that is extended in the Z-axis direction.

The following describes the functions of the three-dimensional measurement device 200. Like the aforementioned embodiments, the configuration of one or more embodiments simultaneously executes radiation of first wavelength light and radiation of second wavelength light by the first projection optical system 2A and radiation of third wavelength light and radiation of fourth wavelength light by the second projection optical system 2B. Accordingly, the optical path of the first light as combined light of the first wavelength light and the second wavelength light and the optical path of the second light as combined light of the third wavelength light and the fourth wavelength light partly overlap each other. For the better understanding, the optical path of the first light and the optical path of the second light are illustrated in different drawings and are described individually.

Figure 12:
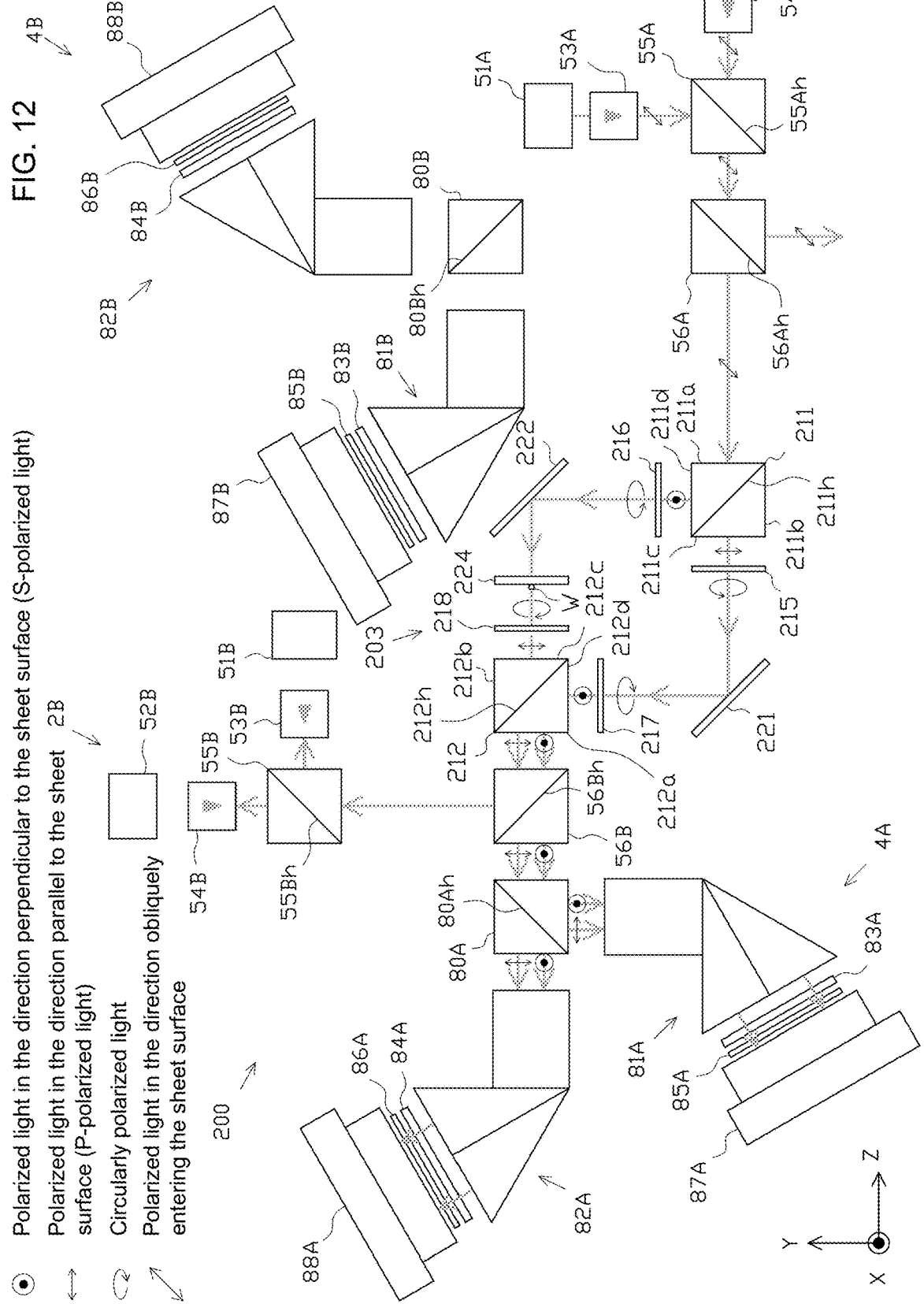
FIG. 12 is an optical path diagram illustrating an optical path of first light (first wavelength light and second wavelength light) according to one or more embodiments of the present invention.

The optical path of the first light (first wavelength light and second wavelength light) is described first with reference to FIG. 12. As shown in FIG. 12, first wavelength light of a first wavelength $\lambda_1$ (linearly polarized light having the polarizing direction that is inclined at 45 degrees to the X-axis direction and the Z-axis direction) is emitted downward in the Y-axis direction from a first light emitter 51A. Simultaneously, second wavelength light of a second wavelength $\lambda_2$ (linearly polarized light having the polarizing direction that is inclined at 45 degrees to the X-axis direction and the Y-axis direction) is emitted leftward in the Z-axis direction from a second light emitter 52A.

The first wavelength light emitted from the first light emitter 51A passes through a first light isolator 53A and enters a first combining dichroic mirror 55A. Simultaneously, the second wavelength light emitted from the second light emitter 52A passes through a second light isolator 54A and enters the first combining dichroic mirror 55A.

The first wavelength light and the second wavelength light entering the first combining dichroic mirror 55A are combined with each other, and the combined light is emitted leftward in the Z-axis direction toward the first non-polarizing beam splitter 56A, as the first light (linearly polarized light having the polarizing direction that is inclined at 45 degrees to the X-axis direction and the Y-axis direction).

Part (half) of the first light entering the first non-polarizing beam splitter 56A is transmitted leftward in the Z-axis direction, while the remaining part (half) is reflected downward in the Y-axis direction. The first light transmitted leftward in the Z-axis direction enters the first surface 211a of the first polarizing beam splitter 211. The first light reflected downward in the Y-axis direction, on the other hand, does not enter any optical system or the like but is left as waste light.

With regard to the first light entering the first surface 211a of the first polarizing beam splitter 211 leftward in the Z-axis direction, its P-polarized light component is transmitted leftward in the Z-axis direction and is emitted from the third surface 211c as reference light, whereas its S-polarized light component is reflected upward in the Y-axis direction and is emitted from the fourth surface 211d as measurement light.

The reference light (P-polarized light) with regard to the first light emitted from the third surface 211c of the first polarizing beam splitter 211 passes through the first quarter wave plate 215 to be converted into clockwise circularly polarized light and is then reflected upward in the Y-axis direction by the first total reflection mirror 221. In this process, the rotating direction relative to the traveling direction of light is maintained.

The reference light with regard to the first light then passes through the third quarter wave plate 217 to be converted from the clockwise circularly polarized light into S-polarized light and enters the fourth surface 212d of the second polarizing beam splitter 212.

The measurement light (S-polarized light) with regard to the first light emitted from the fourth surface 211d of the first polarizing beam splitter 211, on the other hand, passes through the second quarter wave plate 216 to be converted into counterclockwise circularly polarized light and is then reflected leftward in the Z-axis direction by the second total reflection mirror 222. In this process, the rotating direction relative to the traveling direction of light is maintained.

The measurement light with regard to the first light is then transmitted through the work W placed on the placement structure 224, subsequently passes through the fourth quarter wave plate 218 to be converted from the counterclockwise circularly polarized light into P-polarized light and then enters the third surface 212c of the second polarizing beam splitter 212.

The reference light (S-polarized light) with regard to the first light entering the fourth surface 212d of the second polarizing beam splitter 212 is reflected by the joint surface 212h leftward in the Z-axis direction, while the measurement light (P-polarized light) with regard to the first light entering the third surface 212c of the second polarizing beam splitter 212 is transmitted through the joint surface 212h leftward in the Z-axis direction. The combined light generated by combining the reference light and the measurement light with regard to the first light then emitted as the output light from the first surface 212a of the second polarizing beam splitter 212.

The combined light (reference light and measurement light) with regard to the first light emitted from the first surface 212a of the second polarizing beam splitter 212 enters the second non-polarizing beam splitter 56B. Part of the combined light with regard to the first light entering the second non-polarizing beam splitter 56B leftward in the Z-axis direction is transmitted leftward in the Z-axis direction, while the remaining part is reflected upward in the Y-axis direction.

The combined light (reference light and measurement light) transmitted leftward in the Z-axis direction enters the first separating dichroic mirror 80A of the first imaging system 4A. The combined light reflected upward in the Y-axis direction, on the other hand, enters the second combining dichroic mirror 55B but is blocked by the third light isolator 53B or by the fourth light isolator 54B to be left as waste light.

In the combined light (reference light and measurement light) with regard to the first light entering the first separating dichroic mirror 80A, the combined light (reference light and measurement light) with regard to the first wavelength light is reflected by the joint surface 80Ah downward in the Y-axis direction and enters the first spectral optical system 81A, while the combined light (reference light and measurement light) with regard to the second wavelength light is transmitted through the joint surface 80Ah leftward in the Z-axis direction and enters the second spectral optical system 82A.

The combined light (reference light and measurement light) with regard to the first wavelength light entering the first spectral optical system 81A is split into four split lights, and images of the four split lights are taken by the first camera 87A via the quarter wave plate unit 83A and the first filter unit 85A. This provides four interference fringe images with regard to the first wavelength light having phases that differ by 90 degrees each.

Simultaneously, the combined light with regard to the second wavelength light entering the second spectral optical system 82A is split into four split lights, and images of the four split lights are taken by the second camera 88A via the quarter wave plate unit 84A and the second filter unit 86A. This provides four interference fringe images with regard to the second wavelength light having phases that differ by 90 degrees each.

Figure 13:
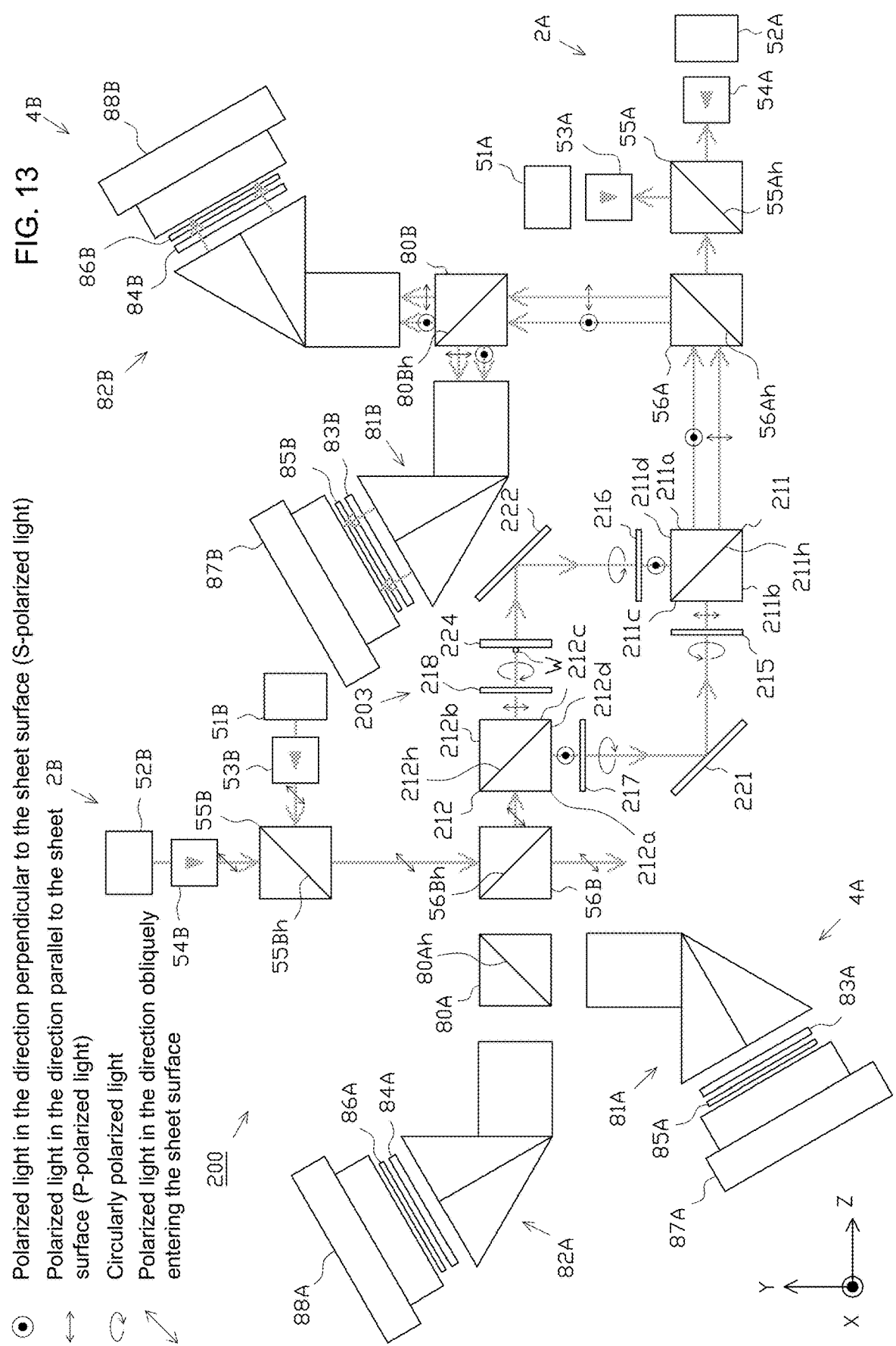
FIG. 13 is an optical path diagram illustrating an optical path of second light (third wavelength light and fourth wavelength light) according to one or more embodiments of the present invention.

The following describes the optical path of the second light (third wavelength light and fourth wavelength light) with reference to FIG. 13. As shown in FIG. 13, third wavelength light of a third wavelength $\lambda_3$ (linearly polarized light having the polarizing direction that is inclined at 45 degrees to the X-axis direction and the Y-axis direction) is emitted leftward in the Z-axis direction from a third light emitter 51B. Simultaneously, fourth wavelength light of a fourth wavelength $\lambda_4$ (linearly polarized light having the polarizing direction that is inclined at 45 degrees to the X-axis direction and the Z-axis direction) is emitted downward in the Y-axis direction from a fourth light emitter 52B.

The third wavelength light emitted from the third light emitter 51B passes through a third light isolator 53B and enters a second combining dichroic mirror 55B. Simultaneously, the fourth wavelength light emitted from the fourth light emitter 52B passes through a fourth light isolator 54B and enters the second combining dichroic mirror 55B.

The third wavelength light and the fourth wavelength light entering the second combining dichroic mirror 55B are combined with each other, and the combined light is emitted downward in the Y-axis direction toward the second non-polarizing beam splitter 56B, as the second light (linearly polarized light having the polarizing direction that is inclined at 45 degrees to the X-axis direction and the Z-axis direction).

Part (half) of the second light entering the second non-polarizing beam splitter 56B is transmitted downward in the Y-axis direction, while the remaining part (half) is reflected rightward in the Z-axis direction. The second light reflected rightward in the Z-axis direction enters the first surface 212a of the second polarizing beam splitter 212. The second light transmitted downward in the Y-axis direction, on the other hand, does not enter any optical system or the like but is left as waste light.

With regard to the second light entering the first surface 212a of the second polarizing beam splitter 212 rightward in the Z-axis direction, its S-polarized light component is reflected downward in the Y-axis direction and is emitted from the fourth surface 212d as reference light, whereas its P-polarized light component is transmitted rightward in the Z-axis direction and is emitted from the third surface 212c as measurement light.

The reference light (S-polarized light) with regard to the second light emitted from the fourth surface 212d of the second polarizing beam splitter 212 passes through the third quarter wave plate 217 to be converted into counterclockwise circularly polarized light and is then reflected rightward in the Z-axis direction by the first total reflection mirror 221. In this process, the rotating direction relative to the traveling direction of light is maintained.

The reference light with regard to the second light then passes through the first quarter wave plate 215 to be converted from the counterclockwise circularly polarized light into P-polarized light and enters the third surface 211c of the first polarizing beam splitter 211.

The measurement light (P-polarized light) with regard to the second light emitted from the third surface 212c of the second polarizing beam splitter 212, on the other hand, passes through the fourth quarter wave plate 218 to be converted into clockwise circularly polarized light and is then transmitted through the work W placed on the placement structure 224. The measurement light with regard to the second light is subsequently reflected by the second total reflection mirror 222 downward in the Y-axis direction. In this process, the rotating direction relative to the traveling direction of light is maintained.

The measurement light with regard to the second light reflected by the second total reflection mirror 222 passes through the second quarter wave plate 216 to be converted from the clockwise circularly polarized light into S-polarized light and then enters the fourth surface 211d of the first polarizing beam splitter 211.

The reference light (P-polarized light) with regard to the second light entering the third surface 211c of the first polarizing beam splitter 211 is transmitted through the joint surface 211h rightward in the Z-axis direction, while the measurement light (S-polarized light) with regard to the second light entering the fourth surface 211d of the first polarizing beam splitter 211 is reflected by the joint surface 211h rightward in the Z-axis direction. The combined light generated by combining the reference light and the measurement light with regard to the second light then emitted as the output light from the first surface 211a of the first polarizing beam splitter 211.

The combined light (reference light and measurement light) with regard to the second light emitted from the first surface 211a of the first polarizing beam splitter 211 enters the first non-polarizing beam splitter 56A. Part of the combined light with regard to the second light entering the first non-polarizing beam splitter 56A rightward in the Z-axis direction is transmitted rightward in the Z-axis direction, while the remaining part is reflected upward in the Y-axis direction.

The combined light (reference light and measurement light) reflected upward in the Y-axis direction enters the second separating dichroic mirror 80B of the second imaging system 4B. The combined light transmitted rightward in the Z-axis direction, on the other hand, enters the first combining dichroic mirror 55A but is blocked by the first light isolator 53A or by the second light isolator 54A to be left as waste light.

In the combined light (reference light and measurement light) with regard to the second light entering the second separating dichroic mirror 80B, the combined light (reference light and measurement light) with regard to the third wavelength light is reflected by the joint surface 80Bh leftward in the Z-axis direction and enters the third spectral optical system 81B, while the combined light (reference light and measurement light) with regard to the fourth wavelength light is transmitted through the joint surface 80Bh upward in the Y-axis direction and enters the fourth spectral optical system 82B.

The combined light (reference light and measurement light) with regard to the third wavelength light entering the third spectral optical system 81B is split into four split lights, and images of the four split lights are taken by the third camera 87B via the quarter wave plate unit 83B and the third filter unit 85B. This provides four interference fringe images with regard to the third wavelength light having phases that differ by 90 degrees each.

Simultaneously, the combined light with regard to the fourth wavelength light entering the fourth spectral optical system 82B is split into four split lights, and images of the four split lights are taken by the fourth camera 88B via the quarter wave plate unit 84B and the fourth filter unit 86B. This provides four interference fringe images with regard to the fourth wavelength light having phases that differ by 90 degrees each.

The following describes a procedure of shape measurement process executed by the control device 5. The control device 5 first drives and controls the first projection optical system 2A and the second projection optical system 2B to simultaneously execute radiation of the first wavelength light from the first light emitter 51A, radiation of the second wavelength light from the second light emitter 52A, radiation of the third wavelength light from the third light emitter 51B, and radiation of the fourth wavelength light from the fourth light emitter 52B.

This causes the first light that is the combined light of the first wavelength light and the second wavelength light to enter the first surface 211a of the first polarizing beam splitter 211, while causing the second light that is the combined light of the third wavelength light and the fourth wavelength light to enter the first surface 212a of the second polarizing beam splitter 212.

As a result, the combined light (reference light and measurement light) with regard to the first light is emitted from the first surface 212a of the second polarizing beam splitter 212, while the combined light (reference light and measurement light) with regard to the second light is emitted from the first surface 211a of the first polarizing beam splitter 211.

Part of the combined light with regard to the first light emitted from the second polarizing beam splitter 212 enters the first imaging system 4A to be separated into combined light (reference light and measurement light) with regard to the first wavelength light and combined light (reference light and measurement light) with regard to the second wavelength light. The combined light with regard to the first wavelength light is split into four by the first spectral optical system 81A and then enters the first camera 87A via the quarter wave plate unit 83A and the first filter unit 85A. Simultaneously, the combined light with regard to the second wavelength light is split into four by the second spectral optical system 82A and then enters the second camera 88A via the quarter wave plate unit 84A and the second filter unit 86A.

Part of the combined light with regard to the second light emitted from the first polarizing beam splitter 211, on the other hand, enters the second imaging system 4B to be separated into combined light (reference light and measurement light) with regard to the third wavelength light and combined light (reference light and measurement light) with regard to the fourth wavelength light. The combined light with regard to the third wavelength light is split into four by the third spectral optical system 81B and then enters the third camera 87B via the quarter wave plate unit 83B and the third filter unit 85B. Simultaneously, the combined light with regard to the fourth wavelength light is split into four by the fourth spectral optical system 82B and then enters the fourth camera 88B via the quarter wave plate unit 84B and the fourth filter unit 86B.

The control device 5 subsequently drives and controls the first imaging system 4A and the second imaging system 4B to simultaneously execute imaging with the first camera 87A, imaging with the second camera 88A, imaging with the third camera 87B and imaging with the fourth camera 88B.

As a result, the first camera 87A (imaging areas H1 to H4 of the imaging element 170) obtains four interference fringe images with regard to the first wavelength light having the phases that differ by 90 degrees each, as one image data. The second camera 88A (imaging areas H1 to H4 of the imaging element 170) obtains four interference fringe images with regard to the second wavelength light having the phases that differ by 90 degrees each, as one image data. The third camera 87B (imaging areas H1 to H4 of the imaging element 170) obtains four interference fringe images with regard to the third wavelength light having the phases that differ by 90 degrees each, as one image data. The fourth camera 88B (imaging areas H1 to H4 of the imaging element 170) obtains four interference fringe images with regard to the fourth wavelength light having the phases that differ by 90 degrees each, as one image data.

The control device 5 divides one image data obtained from the first camera 87A into four interference fringe image data (respective ranges corresponding to the imaging areas H1 to H4 of the imaging element 170) and stores the four interference fringe image data into first to fourth image memories provided in the image data storage device 154 corresponding to the first camera 87A.

Simultaneously, the control device 5 executes the similar process with regard to the image data obtained respectively from the second camera 88A, the third camera 87B and the fourth camera 88B, and stores interference fringe image data into first to fourth image memories corresponding to each of the cameras 88A, 87B and 88B.

The control device 5 subsequently measures the surface shape of the work W by the phase shift method, based on the four interference fringe image data with regard to the first wavelength light, the four interference fringe image data with regard to the second wavelength light, the four interference fringe image data with regard to the third wavelength light and the four interference fringe image data with regard to the fourth wavelength light stored in the image data storage device 154. More specifically, the control device 5 calculates height information at respective positions on the surface of the work W.

As described above in detail, one or more embodiments employ the relatively simple configuration based on the principle of the Mach-Zehnder interferometer and have similar functions and advantageous effects to those of the aforementioned embodiments.

The following describes embodiments with reference to the drawings. One or more embodiments include a different interference optical system that is different from that of the aforementioned embodiments employing the configuration of the Michelson interferometer and has a different configuration involved in the interference optical system from that of the aforementioned embodiments. The following describes the configuration of one or more embodiments different from that of the aforementioned embodiments in detail. The like components to those of the aforementioned embodiments are expressed by the like reference signs, and their detailed description is omitted.

Figure 14:
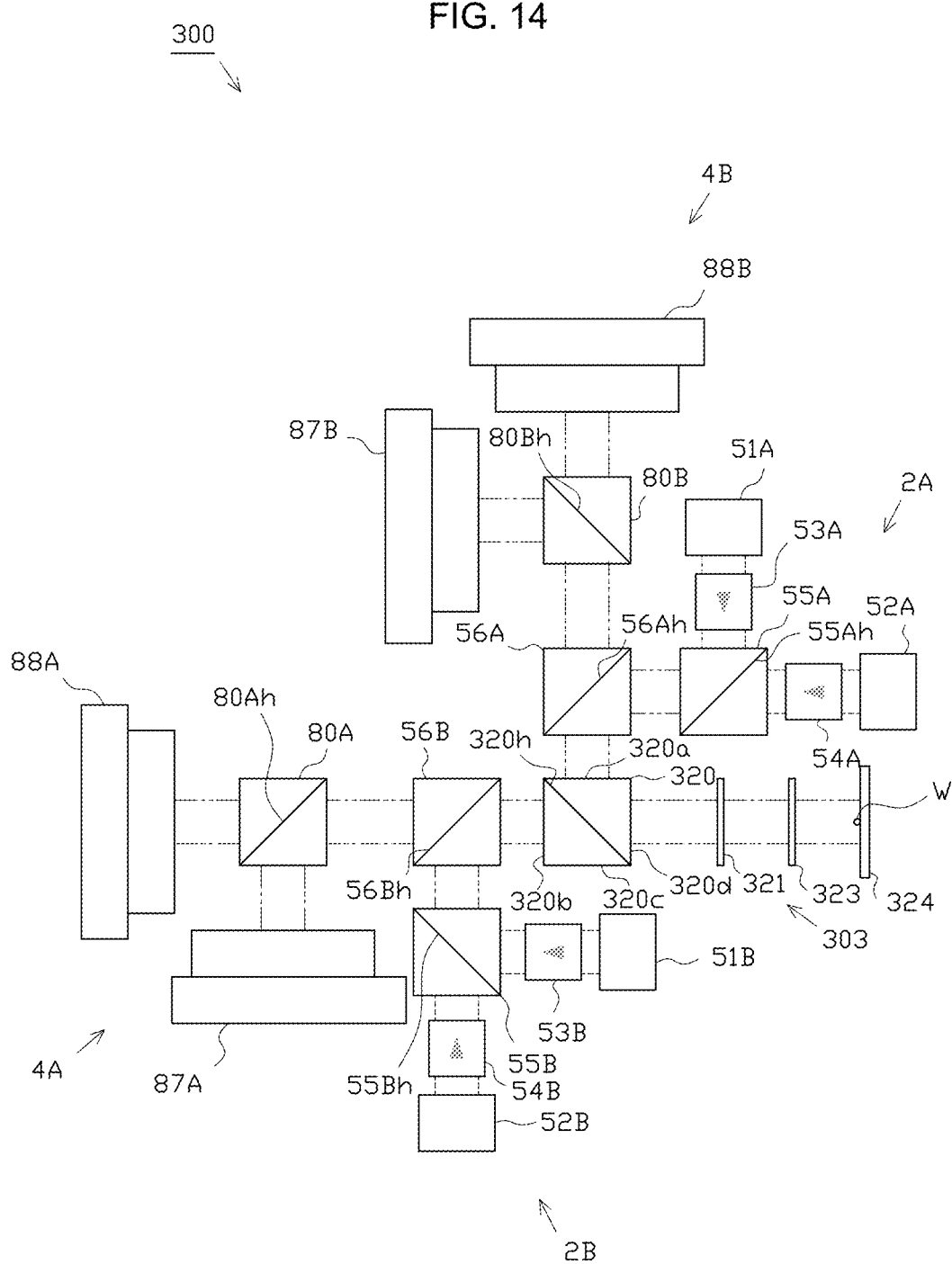
FIG. 14 is a schematic configuration diagram illustrating a three-dimensional measurement device according to one or more embodiments of the present invention.

FIG. 14 is a diagram illustrating the schematic configuration of a three-dimensional measurement device 300 according to one or more embodiments. In the description below, as a matter of convenience, a front-back direction of the sheet surface of FIG. 14 is called "X-axis direction", a top-bottom direction of the sheet surface is called "Y-axis direction" and a left-right direction of the sheet surface is called "Z-axis direction".

The three-dimensional measurement device 300 is configured based on the principle of a Fizeau interferometer and includes two projection optical systems 2A and 2B (first projection optical system 2A and second projection optical system 2B) configured to emit predetermined lights, an interference optical system 303 in which the lights respectively emitted from the projection optical systems 2A and 2B enter, two imaging systems 4A and 4B (first imaging system 4A and second imaging system 4B) in which the lights emitted from the interference optical system 303 enter, and a control device 5 configured to execute various controls, image processing, calculations and the like involved in the projection optical systems 2A and 2B, the interference optical system 303, the imaging systems 4A and 4B and the like. The "control device 5" is configured as the "image processor" according to one or more embodiments, and the "interference optical system 303" is configured as the "predetermined optical system" according to one or more embodiments.

The following describes the configuration of the interference optical system 303 in detail. The interference optical system 303 includes a polarizing beam splitter 320, a quarter wave plate 321, a half mirror 323, and a placement structure 324.

The polarizing beam splitter 320 is a cube-shaped known optical member configured by joining right angle prisms together to be integrated, and its joint surface (boundary surface) 320$h$ is coated with, for example, a dielectric multilayer film. According to one or more embodiments, the polarizing beam splitter 320 is configured to transmit the P-polarized light component and reflect the S-polarized light component. According to one or more embodiments, "P-polarized light" corresponds to the "polarized light having the first polarizing direction", and "S-polarized light" corresponds to the "polarized light having the second polarizing direction".

The polarizing beam splitter 320 is arranged such that one of two surfaces adjoining to each other across its joint surface 320$h$ is perpendicular to the Y-axis direction and the other of the two surfaces is perpendicular to the Z-axis direction. In other words, the joint surface 320$h$ of the polarizing beam splitter 320 is arranged to be inclined at 45 degrees to the Y-axis direction and the Z-axis direction.

More specifically, a first surface (upper side face in the Y-axis direction) 320$a$ of the polarizing beam splitter 320, which first light emitted downward in the Y-axis direction from a first non-polarizing beam splitter 56A of the first projection optical system 2A enters, and a third surface (lower side face in the Y-axis direction) 320$c$ opposed to the first surface 320$a$ are arranged to be perpendicular to the Y-axis direction. The "first surface 320$a$ of the polarizing beam splitter 320" corresponds to the "first input-output element" according to one or more embodiments.

A second surface (left side face in the Z-axis direction) 320$b$ of the polarizing beam splitter 320, which is a surface adjoining to the first surface 320$a$ across the joint surface 320$h$ and which second light emitted rightward in the Z-axis direction from a second non-polarizing beam splitter 56B of the second projection optical system 2B enters, and a fourth surface (right side face in the Z-axis direction) 320$d$ opposed to the second surface 320$b$ are arranged to be perpendicular to the Z-axis direction. The "second surface 320$b$ of the polarizing beam splitter 320" corresponds to the "second input-output element" according to one or more embodiments.

The quarter wave plate 321 is arranged to be opposed in the Z-axis direction to the fourth surface 320$d$ of the polarizing beam splitter 320. The half mirror 323 is arranged on the right side in the Z-axis direction of the quarter wave plate 321 to be opposed in the Z-axis direction to the quarter wave plate 321. The placement structure 324 is arranged on the right side in the Z-axis direction of the half mirror 323 to be opposed in the Z-axis direction to the half mirror 323. Strictly speaking, the half mirror 323 is arranged to be slightly inclined to the Z-axis direction, in order to generate periodical interference fringes (carrier).

The quarter wave plate 321 serves to convert linearly polarized light into circularly polarized light and to convert circularly polarized light into linearly polarized light. Accordingly, linearly polarized light (P-polarized light or S-polarized light) emitted from the fourth surface 320$d$ of the polarizing beam splitter 320 is converted into circularly polarized light by the quarter wave plate 321 and is radiated to the half mirror 323.

The half mirror 323 is configured to split incident light into transmitted light and reflected light at a ratio of 1:1. More specifically, the half mirror 323 causes part (half) of the circularly polarized light entering rightward in the Z-axis direction from the quarter wave plate 321 to be transmitted rightward in the Z-axis direction as measurement light and causes the remaining part (remaining half) of the circularly polarized light to be reflected leftward in the Z-axis direction as reference light. The circularly polarized light (measurement light) transmitted through the half mirror 323 is radiated to the work W as a measurement object placed on the placement structure 324. The "half mirror 323" is accordingly configured as the "reference surface" according to one or more embodiments. The "half mirror 323" also serves as means of splitting predetermined incident light into two split lights and as means of recombining the two split lights.

The following describes in detail the configuration of the first imaging system 4A and the second imaging system 4B according to one or more embodiments. The configuration of one or more embodiments excludes the "spectral optical systems 81A, 82A, 81B and 82B", the "quarter wave plate units 83A, 84A, 83B and 84B", and the "filter units 85A, 86A, 85B and 86B" from the configuration of the aforementioned embodiments.

The first imaging system 4A according to one or more embodiments includes a first separating dichroic mirror 80A configured to separate interfering light with regard to first light entering from the second non-polarizing beam splitter 56B into interfering light with regard to first wavelength light and interfering light with regard to second wavelength light, a first camera 87A configured to take an image of the interfering light with regard to the first wavelength light emitted downward in the Y-axis direction from the first separating dichroic mirror 80A, and a second camera 88A configured to take an image of the interfering light with regard to the second wavelength light emitted leftward in the Z-axis direction from the first separating dichroic mirror 80A.

Similarly, the second imaging system 4B includes a second separating dichroic mirror 80B configured to separate interfering light with regard to second light entering from the first non-polarizing beam splitter 56A into interfering light with regard to third wavelength light and interfering light with regard to fourth wavelength light, a third camera 87B configured to take an image of the interfering light with regard to the third wavelength light emitted leftward in the Z-axis direction from the second separating dichroic mirror 80B, and a fourth camera 88B configured to take an image of the interfering light with regard to the fourth wavelength light emitted upward in the Y-axis direction from the second separating dichroic mirror 80B.

The following describes the functions of the three-dimensional measurement device 300. Like the aforementioned embodiments, the configuration of one or more embodiments simultaneously executes radiation of first wavelength light and radiation of second wavelength light by the first projection optical system 2A and radiation of third wavelength light and radiation of fourth wavelength light by the second projection optical system 2B. Accordingly, the optical path of the first light as combined light of the first wavelength light and the second wavelength light and the optical path of the second light as combined light of the third wavelength light and the fourth wavelength light partly overlap each other. For the better understanding, the optical path of the first light and the optical path of the second light are illustrated in different drawings and are described individually.

Figure 15:
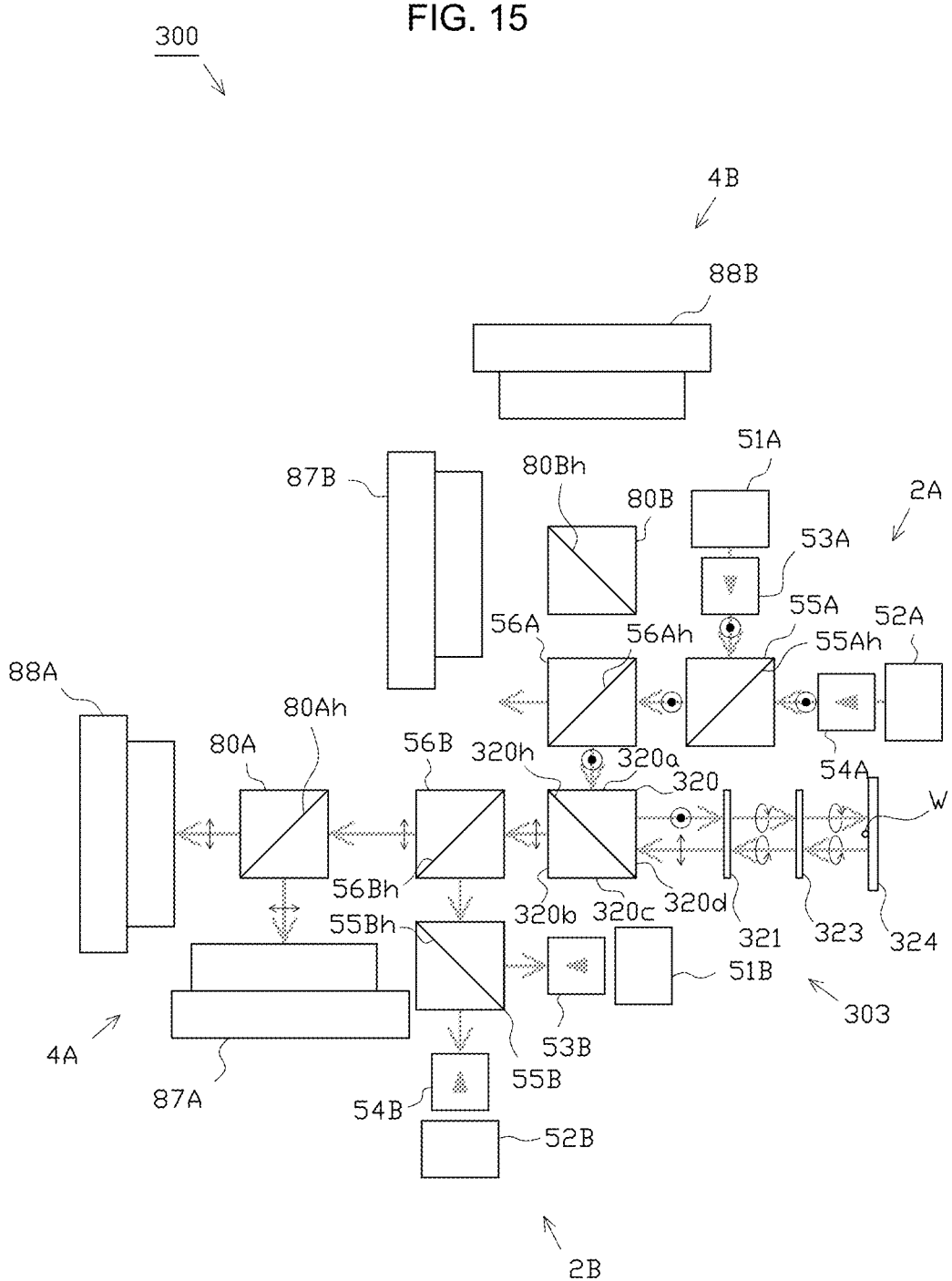
FIG. 15 is an optical path diagram illustrating an optical path of first light (first wavelength light and second wavelength light) according to one or more embodiments of the present invention.

The optical path of the first light (first wavelength light and second wavelength light) is described first with reference to FIG. 15. As shown in FIG. 15, first wavelength light of a first wavelength $\lambda_1$ (S-polarized light having a polarizing direction that is the X-axis direction) is emitted downward in the Y-axis direction from a first light emitter 51A. Simultaneously, second wavelength light of a second wavelength $\lambda_2$ (S-polarized light having a polarizing direction that is the X-axis direction) is emitted leftward in the Z-axis direction from a second light emitter 52A.

The first wavelength light emitted from the first light emitter 51A passes through a first light isolator 53A and enters a first combining dichroic mirror 55A. Simultaneously, the second wavelength light emitted from the second light emitter 52A passes through a second light isolator 54A and enters the first combining dichroic mirror 55A.

The first wavelength light and the second wavelength light entering the first combining dichroic mirror 55A are combined with each other, and the combined light is emitted leftward in the Z-axis direction toward the first non-polarizing beam splitter 56A, as the first light (S-polarized light having a polarizing direction that is the X-axis direction).

Part (half) of the first light entering the first non-polarizing beam splitter 56A is transmitted leftward in the Z-axis direction, while the remaining part (half) is reflected downward in the Y-axis direction. The first light reflected downward in the Y-axis direction enters the first surface 320a of the polarizing beam splitter 320. The first light transmitted leftward in the Z-axis direction, on the other hand, does not enter any optical system or the like but is left as waste light.

The first light (S-polarized light) entering the first surface 320a of the polarizing beam splitter 320 downward in the Y-axis direction is reflected by the joint surface 320h rightward in the Z-axis direction and is emitted from the fourth surface 320d.

The first light emitted from the fourth surface 320d of the polarizing beam splitter 320 passes through the quarter wave plate 321 to be converted from the S-polarizing light having the polarizing direction that is the X-axis direction into counterclockwise circularly polarized light and is radiated to the half mirror 323.

Part (half) of the first light radiated to the half mirror 323 is transmitted through the half mirror 323 rightward in the Z-axis direction as measurement light, while the remaining part is reflected leftward in the Z-axis direction as reference light. In this process, the rotating directions (counterclockwise) of the transmitted light (measurement light) and the reflected light (reference light) relative to the traveling direction of light are maintained.

The measurement light (counterclockwise circularly polarized light) with regard to the first light transmitted through the half mirror 323 rightward in the Z-axis direction is radiated to the work W placed on the placement structure 324 to be reflected by the work W. In this process, the rotating direction (counterclockwise) relative to the traveling direction of light is also maintained.

The measurement light with regard to the first light reflected by the work W again passes through the half mirror 323 leftward in the Z-axis direction and is combined with the reference light (counterclockwise circularly polarized light) with regard to the first light reflected by the half mirror 323 leftward in the Z-axis direction. Combining the measurement light and the reference light that are the counterclockwise circularly polarized lights of the same rotating direction causes interference between the measurement light and the reference light.

The interfering light with regard to the first light then passes through the quarter wave plate 321 to be converted from the counterclockwise circularly polarized light into P-polarized light having a polarizing direction that is the Y-axis direction and reenters the fourth surface 320d of the polarizing beam splitter 320.

The interfering light (P-polarized light) with regard to the first light reentering the fourth surface 320d of the polarizing beam splitter 320 is transmitted through the joint surface 320h leftward in the Z-axis direction and is emitted from the second surface 320b of the polarizing beam splitter 320 as the output light.

The interfering light with regard to the first light emitted from the second surface 320b of the polarizing beam splitter 320 enters the second non-polarizing beam splitter 56B. Part of the interfering light with regard to the first light entering the second non-polarizing beam splitter 56B leftward in the Z-axis direction is transmitted leftward in the Z-axis direction, while the remaining part is reflected downward in the Y-axis direction.

The interfering light transmitted leftward in the Z-axis direction enters the first separating dichroic mirror 80A of the first imaging system 4A. The interfering light reflected downward in the Y-axis direction, on the other hand, enters the second combining dichroic mirror 55B but is blocked by the third light isolator 53B or by the fourth light isolator 54B to be left as waste light.

In the interfering light with regard to the first light entering the first separating dichroic mirror 80A, the interfering light with regard to the first wavelength light is reflected by the joint surface 80Ah downward in the Y-axis direction and is imaged by the first camera 87A, while the interfering light with regard to the second wavelength light is transmitted through the joint surface 80Ah leftward in the Z-axis direction and is imaged by the second camera 88A.

Figure 16:
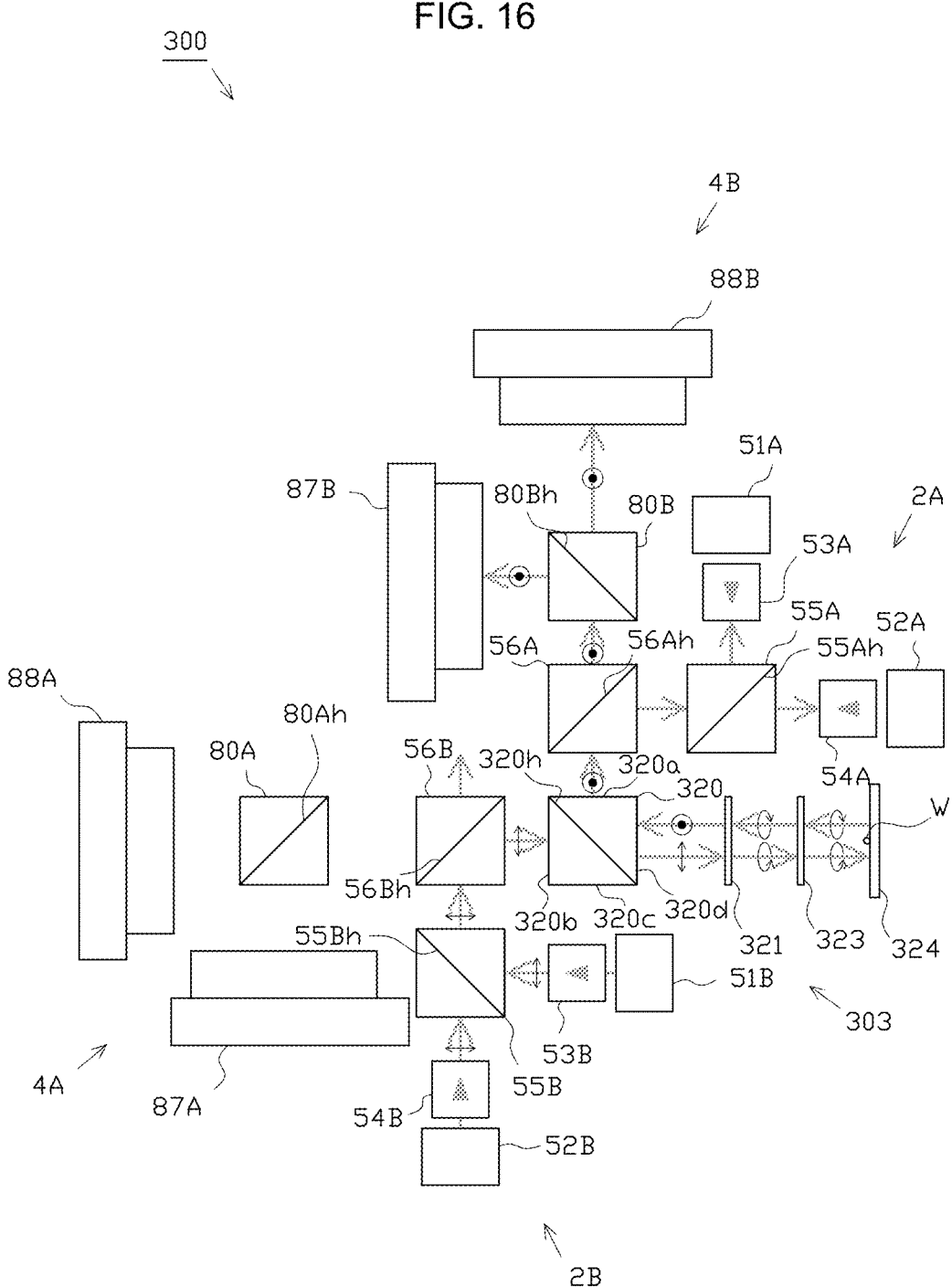
FIG. 16 is an optical path diagram illustrating an optical path of second light (third wavelength light and fourth wavelength light) according to one or more embodiments of the present invention.

The following describes the optical path of the second light (third wavelength light and fourth wavelength light) with reference to FIG. 16. As shown in FIG. 16, third wavelength light of a third wavelength $\lambda_3$ (P-polarized light having a polarizing direction that is the Y-axis direction) is emitted leftward in the Z-axis direction from a third light emitter 51B. Simultaneously, fourth wavelength light of a fourth wavelength $\lambda_4$ (P-polarized light having a polarizing direction that is the Z-axis direction) is emitted upward in the Y-axis direction from a fourth light emitter 52B.

The third wavelength light emitted from the third light emitter 51B passes through a third light isolator 53B and enters a second combining dichroic mirror 55B. Simultaneously, the fourth wavelength light emitted from the fourth light emitter 52B passes through a fourth light isolator 54B and enters the second combining dichroic mirror 55B.

The third wavelength light and the fourth wavelength light entering the second combining dichroic mirror 55B are combined with each other, and the combined light is emitted upward in the Y-axis direction toward the second non-polarizing beam splitter 56B, as the second light (P-polarized light having a polarizing direction that is the Z-axis direction).

Part (half) of the second light entering the second non-polarizing beam splitter 56B is transmitted upward in the Y-axis direction, while the remaining part (half) is reflected rightward in the Z-axis direction. The second light reflected rightward in the Z-axis direction enters the second surface 320b of the polarizing beam splitter 320. The second light transmitted upward in the Y-axis direction, on the other hand, does not enter any optical system or the like but is left as waste light.

The second light (P-polarized light) entering the second surface 320b of the polarizing beam splitter 320 rightward in the Z-axis direction is transmitted through the joint surface 320h rightward in the Z-axis direction and is emitted from the fourth surface 320d.

The second light emitted from the fourth surface 320d of the polarizing beam splitter 320 passes through the quarter wave plate 321 to be converted from the P-polarizing light having the polarizing direction that is the Y-axis direction into clockwise circularly polarized light and is radiated to the half mirror 323.

Part (half) of the second light radiated to the half mirror 323 is transmitted through the half mirror 323 rightward in the Z-axis direction as measurement light, while the remaining part is reflected leftward in the Z-axis direction as reference light. In this process, the rotating directions (clockwise) of the transmitted light (measurement light) and the reflected light (reference light) relative to the traveling direction of light are maintained.

The measurement light (clockwise circularly polarized light) with regard to the second light transmitted through the half mirror 323 rightward in the Z-axis direction is radiated to the work W placed on the placement structure 324 to be reflected by the work W. In this process, the rotating direction (clockwise) relative to the traveling direction of light is also maintained.

The measurement light with regard to the second light reflected by the work W again passes through the half mirror 323 leftward in the Z-axis direction and is combined with the reference light (clockwise circularly polarized light) with regard to the second light reflected by the half mirror 323 leftward in the Z-axis direction. Combining the measurement light and the reference light that are the clockwise circularly polarized lights of the same rotating direction causes interference between the measurement light and the reference light.

The interfering light with regard to the second light then passes through the quarter wave plate 321 to be converted from the clockwise circularly polarized light into S-polarized light having a polarizing direction that is the X-axis direction and reenters the fourth surface 320d of the polarizing beam splitter 320.

The interfering light (S-polarized light) with regard to the second light reentering the fourth surface 320d of the polarizing beam splitter 320 is reflected by the joint surface 320h upward in the Y-axis direction and is emitted from the first surface 320a of the polarizing beam splitter 320 as the output light.

The interfering light with regard to the second light emitted from the first surface 320a of the polarizing beam splitter 320 enters the first non-polarizing beam splitter 56A.

Part of the interfering light with regard to the second light entering the first non-polarizing beam splitter 56A upward in the Y-axis direction is transmitted upward in the Y-axis direction, while the remaining part is reflected rightward in the Z-axis direction.

The interfering light transmitted upward in the Y-axis direction enters the second separating dichroic mirror 80B of the second imaging system 4B. The interfering light reflected rightward in the Z-axis direction, on the other hand, enters the first combining dichroic mirror 55A but is blocked by the first light isolator 53A or by the second light isolator 54A to be left as waste light.

In the interfering light with regard to the second light entering the second separating dichroic mirror 80B, the interfering light with regard to the third wavelength light is reflected by the joint surface 80Bh leftward in the Z-axis direction and is imaged by the third camera 87B, while the interfering light with regard to the fourth wavelength light is transmitted through the joint surface 80Bh upward in the Y-axis direction and is imaged by the fourth camera 88B.

The following describes a procedure of shape measurement process executed by the control device 5. The control device 5 first drives and controls the first projection optical system 2A and the second projection optical system 2B to simultaneously execute radiation of the first wavelength light from the first light emitter 51A, radiation of the second wavelength light from the second light emitter 52A, radiation of the third wavelength light from the third light emitter 51B, and radiation of the fourth wavelength light from the fourth light emitter 52B.

This causes the first light that is the combined light of the first wavelength light and the second wavelength light to enter the first surface 320a of the polarizing beam splitter 320, while causing the second light that is the combined light of the third wavelength light and the fourth wavelength light to enter the second surface 320b of the polarizing beam splitter 320.

As a result, the interfering light with regard to the first light is emitted from the second surface 320b of the polarizing beam splitter 320, whereas the interfering light with regard to the second light is emitted from the first surface 320a of the polarizing beam splitter 320.

Part of the interfering light with regard to the first light emitted from the second surface 320b of the polarizing beam splitter 320 enters the first imaging system 4A and is separated into interfering light with regard to the first wavelength light and interfering light with regard to the second wavelength light. The interfering light with regard to the first wavelength light enters the first camera 87A. Simultaneously, the interfering light with regard to the second wavelength light enters the second camera 88A.

Part of the interfering light with regard to the second light emitted from the first surface 320a of the polarizing beam splitter 320, on the other hand, enters the second imaging system 4B and is separated into interfering light with regard to the third wavelength light and interfering light with regard to the fourth wavelength light. The interfering light with regard to the third wavelength light enters the third camera 87B. Simultaneously, the interfering light with regard to the fourth wavelength light enters the fourth camera 88B.

The control device 5 subsequently drives and controls the first imaging system 4A and the second imaging system 4B to simultaneously execute imaging with the first camera 87A, imaging with the second camera 88A, imaging with the third camera 87B and imaging with the fourth camera 88B.

As a result, the first camera 87A obtains an interference fringe image with regard to the first wavelength light. The second camera 88A obtains an interference fringe image with regard to the second wavelength light. The third camera 87B obtains an interference fringe image with regard to the third wavelength light. The fourth camera 88B obtains an interference fringe image with regard to the fourth wavelength light.

The control device 5 then stores the interference fringe image data respectively obtained from the first camera 87A, the second camera 88A, the third camera 87B and the fourth camera 88B into the image data storage device 154.

The control device 5 subsequently measures the surface shape of the work W by a Fourier transform method, based on the interference fringe image data with regard to the first wavelength light, the interference fringe image data with regard to the second wavelength light, the interference fringe image data with regard to the third wavelength light and the interference fringe image data with regard to the fourth wavelength light stored in the image data storage device 154. More specifically, the control device 5 calculates height information at respective positions on the surface of the work W.

The following describes the principle of height measurement by a standard Fourier transform method. An interference fringe intensity of the interference fringe image data with regard to the first light or the second light at an identical coordinate position (x,y), i.e., a luminance g(x,y), is expressed by a relational expression of [Math. 11] given below:

$$g(x,y)=a(x,y)+b(x,y)\cos[2\pi(f_{x0}x+f_{y0}y)+\phi(x,y)] \quad \text{[Math. 11]}$$

Here a(x,y) denotes an offset, b(x,y) denotes an amplitude, φ(x,y) denotes a phase, $f_{x0}$ denotes a carrier frequency in an x direction, and $f_{y0}$ denotes a carrier frequency in a y direction.

Two-dimensional space frequency spectra are obtained by two-dimensional Fourier transform of the luminance g(x,y). One of the left and right spectra is left, is shifted to the center and is then subjected to inverse Fourier transform.

The shifted spectrum is expressed by a relational expression of [Math. 12] given below, and the phase at each coordinate is determined by solving this relational expression with regard to the phase φ:

$$c(x, y) = \frac{1}{2}b(x, y)\exp[i\phi(x, y)] \quad \text{[Math. 12]}$$

Here c(x,y) denotes a spectrum.

When two different lights having different wavelengths are used, like the aforementioned embodiments, a phase $\varphi_1(\xi,\eta)$ with regard to first light at coordinates $(\xi,\eta)$ on the surface of the work W is calculated, based on a luminance $g_1(x,y)$ of the interference fringe image data with regard to the first light of a wavelength $\lambda_{c1}$.

Similarly, a phase $\varphi_2(\xi,\eta)$ with regard to second light at the coordinates $(\xi,\eta)$ on the surface of the work W is calculated, based on a luminance $g_2(x,y)$ of the interference fringe image data with regard to the second light of a wavelength $\lambda_{c2}$.

Height information $z(\xi,\eta)$ at the coordinates $(\xi,\eta)$ on the surface of the work W is then calculated from the phase $\varphi_1(\xi,\eta)$ with regard to the first light and the phase $\varphi_2(\xi,\eta)$ with regard to the second light obtained as described above. The measurement results (height information) of the work W thus determined are stored in the calculation result storage device 55 of the control device 5.

As described above in detail, one or more embodiments employ the relatively simple configuration based on the principle of the Fizeau interferometer and have similar functions and advantageous effects to those of the aforementioned embodiments.

Figure 17:
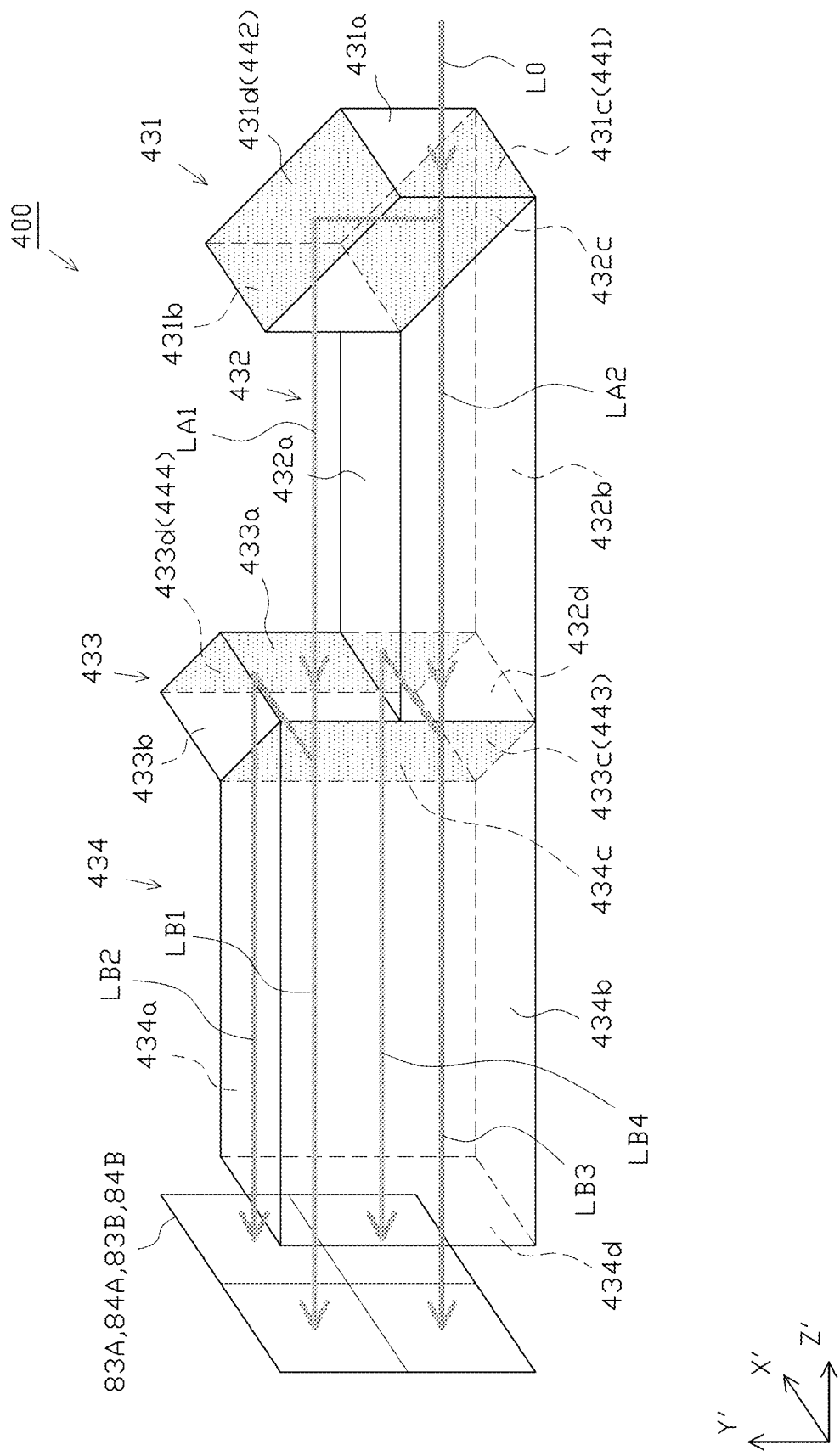
FIG. 17 is a schematic configuration diagram illustrating a spectral optical system and the like according to one or more embodiments of the present invention.

The following describes embodiments with reference to FIG. 17. One or more embodiments employ a spectral optical system 400 that is different from the spectral optical systems 81A, 82A, 81B and 82B used in the aforementioned embodiments, as the spectroscopic unit. The following accordingly describes only the configuration involved in the spectral optical system 400 in detail. The other components are expressed by the same reference signs as those of the aforementioned embodiments, and their detailed description is omitted.

In the description of the spectral optical system 400 with reference to FIG. 17, as a matter of convenience, a front-back direction of the sheet surface of FIG. 17 is called "X'-axis direction", a top-bottom direction of the sheet surface is called "Y'-axis direction", and a left-right direction of the sheet surface is called "Z'-axis direction". The coordinate system (X', Y', Z') used for describing the spectral optical system 400 alone is, however, a different coordinate system from the coordinate system (X, Y, Z) used for describing the entire three-dimensional measurement device 1.

The spectral optical system 400 according to one or more embodiments is configured as one optical member integrated by assembling four non-polarizing optical members (prisms).

More specifically, the spectral optical system 400 is configured by sequentially arranging a first prism 431, a second prism 432, a third prism 433 and a fourth prism 434 along a traveling direction (leftward in the Z'-axis direction) of predetermined light L0 entering from the separating dichroic mirror 80A or 80B.

Each of the above prisms 431 to 434 is made of an optical material (for example, glass or acrylic resin) having a predetermined refractive index higher than the refractive index of the air. The optical path length of light that travels in each of the prisms 431 to 434 is thus optically longer than the optical path length of light that ravels in the air. For example, all the four prisms 431 to 434 may be made of an identical material, or at least one of the prisms 431 to 434 may be made of a different material. The material of each of the prisms 431 to 434 may be selected arbitrarily as long as the material satisfies the functions of the spectral optical system 400 described later.

The first prism 431 is a quadrangular prism that has a parallelogram shape in the front view (Z'-Y' plane) and that is extended along the X'-axis direction. In the description below, the "first prism 431" is called "first rhombic prism 431".

The first rhombic prism 431 is arranged such that, out of its four rectangular surfaces along the X'-axis direction, a surface 431a located on the right side in the Z'-axis direction (hereinafter called "incident surface 431a") and a surface 431b located on the left side in the Z'-axis direction (hereinafter called "emission surface 431b") are respectively arranged orthogonal to the Z'-axis direction and such that a surface 431c located on the lower side in the Y'-axis direction and a surface 431d located on the upper side in the Y'-axis direction are respectively arranged to be inclined at 45 degrees to both the Z'-axis direction and the Y'-axis direction.

A non-polarizing half mirror 441 is provided on the surface 431c located on the lower side in the Y'-axis direction out of the two inclined surfaces 431c and 431d, and a non-polarizing total reflection mirror 442 configured to totally reflect inward is provided on the surface 431d located on the upper side in the Y'-axis direction.

In the description below, the surface 431c provided with the half mirror 441 is called "splitting surface 431c", and the surface 431d provided with the total reflection mirror 442 is called "reflecting surface 431d". As a matter of convenience, the splitting surface 431c (half mirror 441) and the reflecting surface 431d (total reflection mirror 442) are shown in dotted patterns in FIG. 17.

The second prism 432 is a quadrangular prism that has a trapezoidal shape in the front view (Z'-Y' plane) and that is extended along the X'-axis direction. In the description below, the "second prism 432" is called "first trapezoidal prism 432".

The first trapezoidal prism 432 is arranged such that, out of its four rectangular surfaces along the X'-axis direction, a surface 432a located on the upper side in the Y'-axis direction and a surface 432b located on the lower side in the Y'-axis direction are respectively arranged orthogonal to the Y'-axis direction, such that a surface 432c located on the right side in the Z'-axis direction is arranged to be inclined at 45 degrees to both the Z'-axis direction and the Y'-axis direction, and such that a surface 432d located on the left side in the Z'-axis direction is arranged orthogonal to the Z'-axis direction.

The surface 432c located on the right side in the Z'-axis direction is placed in close contact with the splitting surface 431c of the first rhombic prism 431 (half mirror 441). In the description below, the surface 432c located on the right side in the Z'-axis direction is called "incident surface 432c", and the surface 432d located on the left side in the Z'-axis direction is called "emission surface 432d".

The third prism 433 is a quadrangular prism that has a parallelogram shape in the front view (X'-Z' plane) and that is extended along the Y'-axis direction. In the description below, the "third prism 433" is called "second rhombic prism 433".

The second rhombic prism 433 is arranged such that, out of its four rectangular surfaces along the Y'-axis direction, a surface 433a located on the right side in the Z'-axis direction and a surface 433b located on the left side in the Z'-axis direction are respectively arranged orthogonal to the Z'-axis direction and such that a surface 433c located on the front side in the X'-axis direction and a surface 433d located on the back side in the X'-axis direction are respectively arranged to be inclined at 45 degrees to both the Z'-axis direction and the X'-axis direction.

A non-polarizing half mirror 443 is provided on the surface 433c located on the front side in the X'-axis direction out of the two inclined surfaces 433c and 433d, and a non-polarizing total reflection mirror 444 configured to totally reflect inward is provided on the surface 433d located on the back side in the X'-axis direction.

In the description below, the surface 433c provided with the half mirror 443 is called "splitting surface 433c", and the surface 433d provided with the total reflection mirror 444 is called "reflecting surface 433d". As a matter of convenience, the splitting surface 433c (half mirror 443) and the reflecting surface 433d (total reflection mirror 444) are shown in dotted patterns in FIG. 17.

A lower half in the Y'-axis direction of the surface 433a located on the right side in the Z'-axis direction of the second rhombic prism 433 is placed in close contact with the emission surface 432d of the first trapezoidal prism 432. An upper half in the Y'-axis direction is opposed to the emission surface 431b of the first rhombic prism 431. In the description below, the surface 433a located on the right side in the Z'-axis direction is called "incident surface 433a", and the surface 433b located on the left side in the Z'-axis direction is called "emission surface 433b".

The fourth prism 434 is a quadrangular prism that has a trapezoidal shape in the front view (X'-Z' plane) and that is extended along the Y'-axis direction. In the description below, the "fourth prism 434" is called "second trapezoidal prism 434".

The second trapezoidal prism 434 is arranged such that, out of its four rectangular surfaces along the Y'-axis direction, a surface 434a located on the back side in the X'-axis direction and a surface 434b located on the front side in the X'-axis direction are respectively arranged orthogonal to the X'-axis direction, such that a surface 434c located on the right side in the Z'-axis direction is arranged to be inclined at 45 degrees to both the Z'-axis direction and the X'-axis direction, and such that a surface 434d located on the left side in the Z'-axis direction is arranged orthogonal to the Z'-axis direction.

The surface 434c located on the right side in the Z'-axis direction is placed in close contact with the splitting surface 433c of the second rhombic prism 433 (half mirror 443). In the description below, the surface 434c located on the right side in the Z'-axis direction is called "incident surface 434c", and the surface 434d located on the left side in the Z'-axis direction is called "emission surface 434d".

The emission surface 433b of the second rhombic prism 433 and the emission surface 434d of the second trapezoidal prism 434 are respectively arranged to be opposed to the quarter wave plate unit 83A, 84A, 83B or 84B.

The functions of the spectral optical system 400 are described in detail below with reference to FIG. 17. Light L0 emitted from the separating dichroic mirror 80A or 80B enters the incident surface 431a of the first rhombic prism 431.

The light L0 entering the incident surface 431a is split in two directions by the splitting surface 431c (half mirror 441). More specifically, the light L0 is split into split light LA1 that is reflected upward in the Y'-axis direction and spit light LA2 that is transmitted through the half mirror 441 along the Z'-axis direction.

The split light LA1 reflected by the half mirror 441 travels along the Y'-axis direction in the first rhombic prism 431, is reflected leftward in the Z'-axis direction by the reflecting surface 431d (total reflection mirror 442) and is emitted from the emission surface 431b. The split light LA1 emitted from the emission surface 431a travels in the air along the Z'-axis direction and enters the incident surface 433a of the second rhombic prism 433.

The split light LA2 transmitted through the half mirror 441, on the other hand, enters the incident surface 432c of the first trapezoidal prism 432, travels along the Z'-axis direction in the first trapezoidal prism 432 and is emitted from the emission surface 432d. The split light LA2 emitted from the emission surface 432d enters the incident surface 433a of the second rhombic prism 433.

According to one or more embodiments, the refractive indexes and the lengths (length in the Z'-axis direction or length in the Y'-axis direction) of the first rhombic prism 431 and the first trapezoidal prism 432 are set arbitrarily, such that the optical path lengths of both the split lights LA1 and LA2 from the splitting surface 431c of the first rhombic prism 431 to the incident surface 433a of the second rhombic prism 433 are optically identical with each other.

Each of the split lights LA1 and LA2 entering the incident surface 433a of the second rhombic prism 433 is split in two directions by the splitting surface 433c (half mirror 443). More specifically, one split light LA1 is split into split light LB1 that is transmitted through the half mirror 443 along the Z'-axis direction and split light LB2 that is reflected backward in the X'-axis direction. The other split light LA2 is split into split light LB3 that is transmitted through the half mirror 443 along the Z'-axis direction and split light LB4 that is reflected backward in the X'-axis direction.

The split lights LB2 and LB4 reflected by the half mirror 443 respectively travel along the X'-axis direction in the second rhombic prism 433, are reflected leftward in the Z'-axis direction by the reflecting surface 433d (total reflection mirror 444) and are emitted from the emission surface 433b. The split lights LB2 and LB4 emitted from the emission surface 433a respectively travel in the air along the Z'-axis direction and enter the quarter wave plate unit 83A, 84A, 83B or 84B.

The split lights LB1 and LB3 transmitted through the half mirror 443, on the other hand, enter the incident surface 434c of the second trapezoidal prism 434, travel along the Z'-axis direction in the second trapezoidal prism 434 and are emitted from the emission surface 434d. The split lights LB1 and LB3 emitted from the emission surface 434d respectively enter the quarter wave plate unit 83A, 84A, 83B or 84B.

According to one or more embodiments, the refractive indexes and the lengths (length in the Z'-axis direction or length in the X'-axis direction) of the second rhombic prism 433 and the second trapezoidal prism 434 are set arbitrarily, such that the optical path lengths of the four split lights LB1 to LB4 from the splitting surface 433c of the second rhombic prism 433 to the quarter wave plate unit 83A, 84A, 83B or 84B are optically identical with one another.

As described above in detail, one or more embodiments have similar functions and advantageous effects to those of the aforementioned embodiments.

The present invention is not limited to the descriptions of the above embodiments but may also be implemented, for example, by configurations described below. One or more embodiments of the present invention may further be implemented by other applications and other modifications that are not specifically described below.

(a) The above respective embodiments do not specifically refer to concrete examples of the work W. The measurement object may be, for example, solder paste printed on a printed circuit board or a solder bump formed on a wafer substrate.

Figure 18:
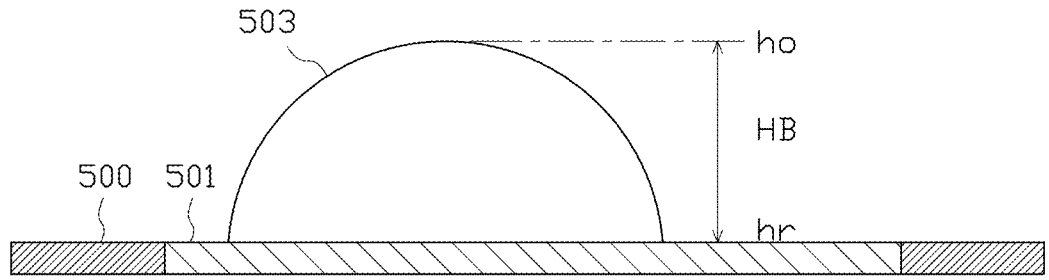
FIG. 18 is a diagram illustrating the principle of height measurement of a solder bump according to one or more embodiments of the present invention.

The following describes the principle of height measurement of, for example, a solder bump. As shown in FIG. 18, a height HB of a bump 503 relative to an electrode 501 (substrate 500) is determined by subtracting an absolute height hr of the electrode 501 in the periphery of the bump 503 from an absolute height ho of the bump 503 [HB=ho−hr]. For example, an absolute height at any one point on the electrode 501 or an average value of absolute heights in a predetermined range on the electrode 501 may be used as the absolute height hr of the electrode 501. The "absolute height ho of the bump 503" and the "absolute height hr of the electrode 501" may be determined as the height information $z(\xi, \eta)$ according to the respective embodiments described above.

A solder printing inspection apparatus or a solder bump inspection apparatus equipped with an inspection unit configured to inspect the quality of solder paste or a solder bump according to preset quality criteria may be configured to include the three-dimensional measurement device 1 (200, 300).

The three-dimensional measurement device 1 according to the above embodiments that employs the optical configuration of the Michelson interferometer and the three-dimensional measurement device 300 according to the above embodiments that employs the optical configuration of the Fizeau interferometer are suitable for reflection works, whereas the three-dimensional measurement device 200 according to the above embodiments that employs the optical configuration of the Mach-Zehnder interferometer is suitable for transmission works. Using the phase shift method allows for measurement with exclusion of zero dimension (transmitted light).

The configuration of the above embodiments may be modified to measure a reflection work by omitting the second total reflection mirror 222 and the placement structure 224 and placing the work W at the position of the second total reflection mirror 222.

According to the above respective embodiments, the placement structure 64 (224, 324) on which the work W is placed may be configured to be movable. The surface of the work W may be divided into a plurality of measurement areas, and shape measurement of the entire work W may be executed by executing shape measurement multiple times for the respective measurement areas by successively changing the measurement area.

(b) The configuration of the interference optical system (predetermined optical system) is not limited to those of the respective embodiments described above. For example, the above embodiments employ the optical configuration of the Michelson interferometer, the optical configuration of the Mach-Zehnder interferometer, and the optical configuration of the Fizeau interferometer, as the interference optical system. These are, however, not restrictive, but any other optical configuration may be employed to divide incident light into reference light and measurement light and execute shape measurement of the work W.

According to the respective embodiments described above, a cube-type polarizing beam splitter configured by joining right angle prisms together to be integrated is employed for the polarizing beam splitter 60 (211, 212, 320). This is, however, not restrictive. For example, a plate-type polarizing beam splitter may be employed.

The above polarizing beam splitter 60 (211, 212, 320) is configured to transmit the P-polarized light component and reflect the S-polarized light component. This is, however, not restrictive. According to a modification, the polarizing beam splitter may be configured to reflect the P-polarized light component and transmit the S-polarized light component. The "S-polarized light" may correspond to the "polarized light having the first polarizing direction", and the "P-polarized light" may correspond to the "polarized light having the second polarizing direction".

(c) The configurations of the projection optical systems 2A and 2B are not limited to those of the respective embodiments described above. For example, according to the above respective embodiments, the projection optical systems 2A and 2B are configured to cause the first wavelength light having the first wavelength $\lambda_1$ (for example, $\lambda_1$=491 nm) to be emitted from the first light emitter 51A, to cause the second wavelength light having the second wavelength $\lambda_2$ (for example, $\lambda_2$=540 nm) to be emitted from the second light emitter 52A, to cause the third wavelength light having the third wavelength $\lambda_3$ (for example, $\lambda_3$=488 nm) to be emitted from the third light emitter 51B, and to cause the fourth wavelength light having the fourth wavelength $\lambda_4$ (for example, $\lambda_4$=532 nm) to be emitted from the fourth light emitter 52B. The wavelengths of the respective lights are, however, not limited to those of the embodiments.

The smaller wavelength difference between the first wavelength light and/or the second wavelength light radiated by the first projection optical system 2A and the third wavelength light and/or the fourth wavelength light radiated by the second projection optical system 2B, the further measurement range expanded. The first wavelength light and the second wavelength light radiated by the first projection optical system 2A are polarized lights having wavelengths separate from each other such as to be separable by the first separating dichroic mirror 80A. Similarly, the third wavelength light and the fourth wavelength light radiated by the second projection optical system 2B are polarized lights having wavelengths separate from each other such as to be separable by the second separating dichroic mirror 80B.

The first projection optical system 2A (for example, the first light emitter 51A) and the second projection optical system 2B (for example, the third light emitter 51B) may be configured to radiate lights of an identical wavelength.

As described above, the three-dimensional measurement device (interferometer) using laser light has conventionally been known as the three-dimensional measurement device configured to measure the shape of a measurement object. This three-dimensional measurement device is, however, likely to decrease the measurement accuracy by the effect of, for example, fluctuation of the output light from the laser light source.

For example, in the case where a measurement object is relatively small and only one light (one wavelength) is sufficient for the measurement range, the configuration of radiating lights of an identical wavelength from two different light sources and executing three-dimensional measurement using these two lights achieves improvement of the measurement accuracy.

In three-dimensional measurement using two lights, however, there is a need to take an image of the output light with regard to the first light and take an image of the output light with regard to the second light at different timings. This is likely to decrease the measurement efficiency.

For example, in three-dimensional measurement by the phase shift method, when the phase is changed in four different levels, there is a need to obtain four different image data. In the configuration using two lights, a required imaging time is accordingly for four imaging processes at different timings, i.e., a total of eight imaging processes.

One or more embodiments that radiate two lights of an identical wavelength take into account the above circumstances. One or more embodiments of the present invention provide a three-dimensional measurement device that achieves improvement of the measurement efficiency by using tow lights.

One or more embodiments enable imaging of the output light with regard to the first light and imaging of the output light with regard to the second light to be executed simultaneously and thereby obtain a total of eight interference fringe images with regard to the two lights in an imaging time for a total of four imaging processes. As a result, this shortens the total imaging time and improves the measurement efficiency.

Especially in the three-dimensional measurement device 200 according to the above embodiments that is configured based on the principle of the Mach-Zehnder interferometer, one work W is irradiated with two lights (measurement lights) from different directions. This enables the overall image of, for example, a work of a complicated shape to be measured with the higher accuracy.

According to the above respective embodiments, the projection optical systems 2A and 2B are configured with the light isolators 53A, 54A, 53B and 54B. The projection optical systems 2A and 2B may, however, be configured without the light isolators 53A, 54A, 53B and 54B.

In the above respective embodiments, the positions of the first projection optical system 2A and the second imaging system 4B that are placed across the first non-polarizing beam splitter 56A may be exchanged. The positions of the second projection optical system 2B and the first imaging system 4A that are placed across the second non-polarizing beam splitter 56B may be exchanged.

In the above respective embodiments, the positions of the first light emitter 51A and the second light emitter 52A that are placed across the first combining dichroic mirror 55A may be exchanged. The positions of the third light emitter 51B and the fourth light emitter 52B that are placed across the second combining dichroic mirror 55B may be exchanged.

The configuration of the light guiding unit is not limited to the non-polarizing beam splitters 56A and 56B of the above respective embodiments. Another configuration may be employed as long as the configuration causes at least part of the first light (second light) emitted from the first irradiation unit (second irradiation unit) to enter the first input-output element (second input-output element) and causes at least part of the output light with regard to the second light (output light with regard to the first light) emitted from the first input-output element (second input-output element) to enter the second imaging unit (first imaging unit).

For example, another configuration may be employed in the above embodiments as long as the configuration causes the first light (second light) radiated from the first projection optical system 2A (second projection optical system 2B) to enter the first surface 60a (second surface 60b) of the polarizing beam splitter 60 and causes the output light with regard to the second light (output light with regard to the first light) emitted from the first surface 60a (second surface 60b) of the polarizing beam splitter 60 to be imaged by the second imaging system 4B (first imaging system 4A).

According to the respective embodiments described above, a cube-type non-polarizing beam splitter configured by joining right angle prisms together to be integrated is employed for the first non-polarizing beam splitter 56A and the second non-polarizing beam splitter 56B. This is, however, not restrictive. For example, a plate-type predetermined half mirror may be employed.

According to the respective embodiments described above, a cube-type dichroic mirror configured by joining right angle prisms together to be integrated is employed for the first combining dichroic mirror 55A and the second combining dichroic mirror 55B as well as for the first separating dichroic mirror 80A and the second separating dichroic mirror 80B. This is, however, not restrictive. For example, a plate-type predetermined dichroic mirror may be employed.

(d) The above respective embodiments are configured to execute the phase shift method, based on the four different interference fringe image data having different phases. This is, however, not essential. For example, a modified configuration may execute the phase shift method, based on two or three different interference fringe image data having different phases.

The three-dimensional measurement device 1 according to the above embodiments and the three-dimensional measurement device 200 according to the above embodiments may be applied to the configuration that executes three-dimensional measurement by another technique different from the phase shift method, for example, the Fourier transform method employed in the above embodiments.

On the contrary, the three-dimensional measurement device 300 according to the above embodiments may be applied to the configuration that executes three-dimensional measurement by another technique different from the Fourier transform method, for example, the phase shift method.

(e) The above respective embodiments employ the filter units 85A, 86A, 85B and 86B, each having four polarizers of different transmission axis directions, as the phase shift units. The configuration of the phase shift unit is, however, not limited to these embodiments.

For example, the filter units 85A, 86A, 85B and 86B may be replaced by rotary polarizers configured to have variable transmission axis directions. The spectral optical systems 81A, 82A, 81B and 82B may be omitted according to this modification.

More specifically, the first imaging system 4A may include a quarter wave plate configured to convert combined light (a reference light component and a measurement light component) with regard to first wavelength light into circularly polarized light, a rotary first polarizer configured to selectively transmit a predetermined component of the light transmitted through the quarter wave plate, and a first camera 87A configured to take an image of the light transmitted through the first polarizer, as well as a quarter wave plate configured to convert combined light (a reference light component and a measurement light component) with regard to second wavelength light into circularly polarized light, a rotary second polarizer configured to selectively transmit a predetermined component of the light transmitted through the quarter wave plate, and a second camera 88A configured to take an image of the light transmitted through the second polarizer.

Similarly, the second imaging system 4B may include a quarter wave plate configured to convert combined light (a reference light component and a measurement light component) with regard to third wavelength light into circularly polarized light, a rotary third polarizer configured to selectively transmit a predetermined component of the light transmitted through the quarter wave plate, and a third camera 87B configured to take an image of the light transmitted through the third polarizer, as well as a quarter wave plate configured to convert combined light (a reference light component and a measurement light component) with regard to fourth wavelength light into circularly polarized light, a rotary fourth polarizer configured to selectively transmit a predetermined component of the light transmitted through the quarter wave plate, and a fourth camera 88B configured to take an image of the light transmitted through the fourth polarizer.

Each of the rotary polarizers is controlled to change its transmission axis direction by 45 degrees each. More specifically, the rotary polarizer is controlled to change the transmission axis direction to "0 degree", "45 degrees", "90 degrees" and "135 degrees". This configuration causes interference of the reference light component and the measurement light component of the light transmitted through each polarizer in four different phases. This accordingly generates interfering lights having phases that are different from one another by 90 degrees. More specifically, this generates an interfering light having a phase of "0 degree", an interfering light having a phase of "90 degrees", an interfering light having a phase of "180 degrees" and an interfering light having a phase of "270 degrees".

The following describes a procedure of shape measurement process executed by the control device 5 in the modified configuration of the above embodiments employing the rotary polarizers.

The control device 5 first sets the transmission axis directions of the first polarizer and the second polarizer of the first imaging system 4A at a predetermined reference position (for example, "0 degree") and sets the transmission axis directions of the third polarizer and the fourth polarizer of the second imaging system 4B at a predetermined reference position (for example, "0 degree").

The control device 5 subsequently drives and controls the first projection optical system 2A and the second projection optical system 2B to simultaneously execute radiation of the first wavelength light from the first light emitter 51A, radiation of the second wavelength light from the second light emitter 52A, radiation of the third wavelength light from the third light emitter 51B, and radiation of the fourth wavelength light from the fourth light emitter 52B.

This causes first light that is combined light of the first wavelength light and the second wavelength light to enter the first surface 60a of the polarizing beam splitter 60 of the interference optical system 3, while causing second light that is combined light of the third wavelength light and the fourth wavelength light to enter the second surface 60b of the polarizing beam splitter 60.

As a result, the combined light (reference light and measurement light) with regard to the first light is emitted from the second surface 60b of the polarizing beam splitter 60, while the combined light (reference light and measurement light) with regard to the second light is emitted from the first surface 60a of the polarizing beam splitter 60.

Part of the combined light with regard to the first light emitted from the polarizing beam splitter 60 enters the first imaging system 4A to be separated into combined light (reference light and measurement light) with regard to the first wavelength light and combined light (reference light and measurement light) with regard to the second wavelength light. The combined light with regard to the first wavelength light enters the first camera 87A via the quarter wave plate and the first polarizer (transmission axis direction of "0 degree"). Simultaneously, the combined light with regard to the second wavelength light enters the second camera 88A via the quarter wave plate and the second polarizer (transmission axis direction of "0 degree").

Part of the combined light with regard to the second light emitted from the polarizing beam splitter 60, on the other hand, enters the second imaging system 4B to be separated into combined light (reference light and measurement light) with regard to the third wavelength light and combined light (reference light and measurement light) with regard to the fourth wavelength light. The combined light with regard to the third wavelength light enters the third camera 87B via the quarter wave plate and the third polarizer (transmission axis direction of "0 degree"). Simultaneously, the combined light with regard to the fourth wavelength light enters the fourth camera 88B via the quarter wave plate and the fourth polarizer (transmission axis direction of "0 degree").

The control device 5 subsequently drives and controls the first imaging system 4A and the second imaging system 4B to simultaneously execute imaging with the first camera 87A, imaging with the second camera 88A, imaging with the third camera 87B and imaging with the fourth camera 88B.

As a result, the first camera 87A takes an interference fringe image of the phase "0 degree" with regard to the first wavelength light. The second camera 88A takes an interference fringe image of the phase "0 degree" with regard to the second wavelength light. The third camera 87B takes an interference fringe image of the phase "0 degree" with regard to the third wavelength light. The fourth camera 88B takes an interference fringe image of the phase "0 degree" with regard to the fourth wavelength light. The control device 5 then stores the interference fringe image data obtained from the the respective cameras 87A, 88A, 87B and 88B into the image data storage device 154.

The control device 5 subsequently executes a changeover process of the first polarizer and the second polarizer of the first imaging system 4A and a changeover process of the third polarizer and the fourth polarizer of the second imaging system 4B. More specifically, the respective polarizers are rotated and shifted to the position having the transmission axis direction of "45 degrees".

On completion of the changeover processes, the control device 5 executes a second measurement process that is similar to the series of the first measurement process described above. Accordingly, the control device 5 radiates first to fourth wavelength lights and takes images of interfering lights with regard to the first to fourth wavelength lights.

As a result, the control device 5 obtains an interference fringe image of the phase "90 degrees" with regard to the first wavelength light, an interference fringe image of the phase "90 degrees" with regard to the second wavelength light, an interference fringe image of the phase "90 degrees" with regard to the third wavelength light, and an interference fringe image of the phase "90 degrees" with regard to the fourth wavelength light.

The control device 5 repeats two more measurement processes that are similar to the first and the second measurement processes described above. More specifically, the control device 5 sets the transmission axis directions of the respective polarizers at "90 degrees" and executes a third measurement process to obtain an interference fringe image of the phase "180 degrees" with regard to the first wavelength light, an interference fringe image of the phase "180 degrees" with regard to the second wavelength light, an interference fringe image of the phase "180 degrees" with regard to the third wavelength light, and an interference fringe image of the phase "180 degrees" with regard to the fourth wavelength light.

The control device 5 then sets the transmission axis directions of the respective polarizers at "135 degrees" and executes a fourth measurement process to obtain an interference fringe image of the phase "270 degrees" with regard to the first wavelength light, an interference fringe image of the phase "270 degrees" with regard to the second wavelength light, an interference fringe image of the phase "270 degrees" with regard to the third wavelength light, and an interference fringe image of the phase "270 degrees" with regard to the fourth wavelength light.

Executing the four measurement processes as described above obtains all the image data required for three-dimensional measurement by the phase shift method (total of sixteen interference fringe image data including four interference fringe image data with regard to the first wavelength light, four interference fringe image data with regard to the second wavelength light, four interference fringe image data with regard to the third wavelength light and four interference fringe image data with regard to the fourth wavelength light). The control device 5 then measures the surface shape of the work W by the phase shift method, based on the interference fringe image data stored in the image data storage device 154.

The above method using the rotary polarizers as the phase shift units, however, needs to execute imaging at multiple different timings, in order to obtain all the image data required for three-dimensional measurement. In terms of shortening the imaging time, for example, the filter units 85A, 86A, 85B and 86B that enable all the image data to be taken at only one timing are employed, like the embodiments described above.

For example, in the above embodiments, a configuration that moves the reference surface 63 along the optical axis by means of a piezoelectric element or the like to physically change the optical path length may be employed as the phase shift unit.

In the above embodiments, a configuration that moves the total reflection mirror 221 (reference surface) along a direction perpendicular to the direction of inclination by means of a piezoelectric element or the like to physically change the optical path length, while maintaining the inclination of the total reflection mirror 221 at 45 degrees to the Y-axis direction and the Z-axis direction may be employed as the phase shift unit.

In the above embodiments, a configuration that moves the half mirror 323 (reference surface) along the optical axis by means of a piezoelectric element or the like to physically change the optical path length may be employed for the phase shift method.

The above methods employing the configuration of moving the reference surface as the phase shift unit, however, need to provide different operation amounts (phase shift amounts) of the reference surface with regard to multiple lights having different wavelengths and accordingly fail to take images of the multiple lights simultaneously. In terms of shortening the imaging time, for example, the filter units 85A, 86A, 85B and 86B that enable all the image data to be taken at only one timing are employed, like the embodiments described above.

(f) The above respective embodiments are configured to determine the height information $z(\xi,\eta)$ according to the computational expression in the two-wavelength phase shift method. This configuration is, however, not essential, but a modified configuration may store a numerical table or table data representing the correspondence relationship of the phases $\varphi_1$ and $\varphi_2$ and the fringe orders $m_1$ and $m_2$ to the height information z and refer to the numerical table or table data to obtain the height information z. In this modified configuration, it is not necessary to specify the fringe orders.

(g) The configuration of the spectroscopic unit is not limited to the above embodiments. For example, the spectral optical systems 81A, 82A, 81B and 82B of the above embodiments and the spectral optical system 400 of the above embodiments are configured to split incident light into four split lights. This is, however, not essential, but the configuration may split the incident light into at least a required number of split lights required for measurement by the phase shift method, for example, into three split lights.

The above embodiments are configured to split the incident combined light L0 or the like into the four lights FB1 to FB4 or the like having the optical paths arrayed in matrix on the plane perpendicular to the traveling direction of light. In a configuration that uses a plurality of cameras to take the images of the respective split lights FB1 to FB4 or the like, it is not necessary to split the light into split lights arrayed in matrix.

The above embodiments employ the spectral optical system 81A or the like integrated by assembling a plurality of optical members (prisms) as the spectroscopic unit. This is, however, not restrictive, but a diffraction grating may be employed as the spectroscopic unit.

(h) The configuration of the filtering unit is not limited to the above embodiments. For example, according to the above embodiments, the filter unit 85A, 86A, 85B or 86B includes the first polarizer 160a having the transmission axis direction of 0 degree, the second polarizer 160b having the transmission axis direction of 45 degrees, the third polarizer 160c having the transmission axis direction of 90 degrees and the fourth polarizer 160d having the transmission axis direction of 135 degrees and is configured to obtain four different interference fringe images having phases that differ by 90 degrees each by using the four polarizers 160a to 160d having the transmission axis directions that differ by 45 degrees each, and to execute the shape measurement by the phase shift method, based on the four different interference fringe images.

Figure 19:
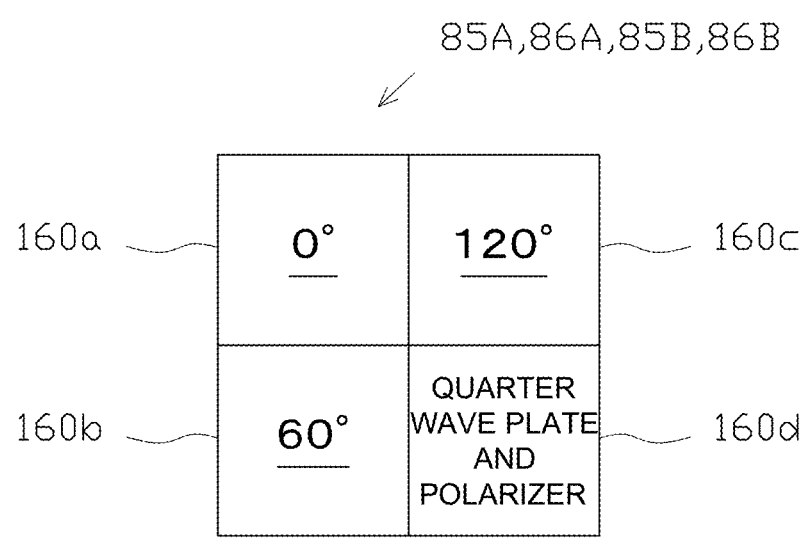
FIG. 19 is a schematic configuration diagram illustrating a filter unit according to one or more embodiments of the present invention.

The following configuration may be employed in place of the above configuration to execute shape measurement by the phase shift method, based on three different interference fringe images having different phases. For example, as shown in FIG. 19, the first polarizer 160a, the second polarizer 160b, the third polarizer 160c and the fourth polarizer 160d of the filter unit 85A, 86A, 85B or 86B may be respectively configured by a polarizer having the transmission axis direction of 0 degree, a polarizer having the transmission axis direction of 60 degrees (or 45 degrees), a polarizer having the transmission axis direction of 120 degrees (or 90 degrees), and a combination of a quarter wave plate configured to convert measurement light (for example, clockwise circularly polarized light) and reference light (for example, counterclockwise circularly polarized light) into linearly polarized lights and a polarizer configured to selectively transmit the linearly polarized light of the measurement light. The combination of the "quarter wave plate" and the "polarizer" may be replaced by a "circularly polarizing plate".

This configuration enables a luminance image of the work W, in addition to three different interference fringe images having phases that differ by 120 degrees each (or by 90 degrees each) to be obtained by one imaging process using one imaging element. This allows for measurement based on the luminance image in combination with the shape measurement by the phase shift method based on the three different interference fringe images. This configuration allows for, for example, mapping with respect to three-dimensional data obtained by the shape measurement by the phase shift method or for extraction of a measurement area. As a result, this configuration allows for comprehensive evaluation by combination of a plurality of different measurements and further improves the measurement accuracy.

In the illustrated example of FIG. 19, the combination of the quarter wave plate configured to convert the circularly polarized light into the linearly polarized light and the polarizer configured to selectively transmit the linearly polarized light of the measurement light is employed as the fourth polarizer 160d. This is, however, not essential, but another configuration may be employed as long as the configuration allows for selective transmission of only the measurement light.

Furthermore, another modified configuration may omit the fourth polarizer 160d. More specifically, this modified configuration may cause images of three lights that are respectively transmitted through the first polarizer 160a, the second polarizer 160b and the third polarizer 160c of the filter unit 85A, 86A, 85B or 86B and an image of one light that is directly entered without passing through the filter unit 85A, 86A, 85B or 86 B (polarizer) to be taken simultaneously by using one imaging element.

This configuration has similar functions and advantageous effects to those of the above configuration that employs the combination of the "quarter wave plate" and the "polarizer" as the fourth polarizer 160d. More specifically, this configuration enables a luminance image of the work W, in addition to three different interference fringe images having phases that differ by 120 degrees each (or by 90 degrees each) to be obtained by one imaging process using one imaging element.

Even in the case where the images of the measurement light (for example, clockwise circularly polarized light) and the reference light (for example, counterclockwise circularly polarized light) are taken directly, since the reference light is known (or is determinable in advance by measurement) and is uniform, the signal of the measurement light may be extracted by a post process after imaging, for example, a process of removing this reference light component or a process of removing the uniform light.

The configuration with omission of the fourth polarizer 160d advantageously reduces the number of optical components by omission of the "quarter wave plate" and the "polarizer" and thereby achieves, for example, the simplified configuration and suppression of an increase in total number of components, compared with the configuration that employs the combination of the "quarter wave plate" and the "polarizer" as the fourth polarizer 160d.

(i) The configuration of the imaging systems 4A and 4B is not limited to those of the respective embodiments described above. For example, the above embodiments use the cameras equipped with lenses. The lens is, however, not essential. A focused image may be obtained by calculation, for example, according to the relational expression of [Math. 6] given above even when a camera without lens is used.

In the above respective embodiments, the positions of the "first spectral optical system 81A, the quarter wave plate unit 83A, the first filter unit 85A and the first camera 87A" and the positions of the "second spectral optical system 82A, the quarter wave plate unit 84A, the second filter unit 86A and the second camera 88A" that are placed across the first separating dichroic mirror 80A may be exchanged. The positions of the "third spectral optical system 81B, the quarter wave plate unit 83B, the third filter unit 85B and the third camera 87B" and the positions of the "fourth spectral optical system 82B, the quarter wave plate unit 84B, the fourth filter unit 86B and the fourth camera 88B" that are placed across the second separating dichroic mirror 80B may be exchanged.

(j) The above respective embodiments are configured to simultaneously use four wavelength lights, i.e., "first wavelength light", "second wavelength light", "third wavelength light" and "fourth wavelength light". More specifically, these embodiments are configured to simultaneously emit the four wavelength lights, simultaneously take interference fringe images with regard to these four wavelength lights, and execute three-dimensional measurement based on these images. This configuration is, however, not restrictive, but another configuration may be employed.

For example, another configuration may simultaneously emit three wavelength lights, for example, the "first wavelength light", the "second wavelength light" and the "third wavelength light" without emitting the "fourth wavelength light" out of the four wavelength lights, the "first wavelength light", the "second wavelength light", the "third wavelength light" and the "fourth wavelength light", simultaneously take interference fringe images with regard to these three wavelength lights, and execute three-dimensional measurement based on these images.

Similarly, another configuration may simultaneously emit two wavelength lights, for example, the "first wavelength light" and the "third wavelength light" without emitting the "second wavelength light" and the "fourth wavelength light" out of the four wavelength lights, the "first wavelength light", the "second wavelength light", the "third wavelength light" and the "fourth wavelength light", simultaneously take interference fringe images with regard to these two wavelength lights, and execute three-dimensional measurement based on these images.

At least the configuration of simultaneously emitting the first light ("first wavelength light" and/or "second wavelength light") and the second light ("third wavelength light" and/or "fourth wavelength light") from the first projection optical system 2A and the second projection optical system 2B and simultaneously taking interference fringe images with regard to these lights shortens the total imaging time and improves the measurement efficiency, compared with the prior art.

In other words, when shortening the imaging time is not essential, the configuration may not necessarily use the four wavelength lights, the "first wavelength light", the "second wavelength light", the "third wavelength light" and the "fourth wavelength light", simultaneously. Another configuration may simultaneously emit two wavelength lights, for example, the "first wavelength light" and the "third wavelength light" without emitting the "second wavelength light" and the "fourth wavelength light", simultaneously take interference fringe images with regard to these two wavelength lights, then simultaneously emit two wavelength lights, "second wavelength light" and "fourth wavelength light" without emitting the "first wavelength light" and the "third wavelength light", and simultaneously take interference fringe images with regard to these two wavelength lights.

(k) When at most three wavelength lights or two wavelength lights are used as described above in (j), the three-dimensional measurement device 1 (200, 300) may be configured with omission of the emission mechanism and the imaging mechanism of the unused wavelength light from the above embodiments.

For example, when the second wavelength light is not used, the first projection optical system 2A may be configured with omission of the emission mechanism of emitting the second wavelength light (second light emitter 52A and the second light isolator 54A) and the combining mechanism of combining two wavelength lights (first combining dichroic mirror 55A). When the second wavelength light is not used, the first imaging system 4A may also be configured with omission of the separating mechanism of causing the predetermined output light to be subjected to wavelength separation (first separating dichroic mirror 80A) and the imaging mechanism of imaging the output light with regard to the second wavelength light (second spectral optical system 82A, quarter wave plate 84A, second filter unit 86A and second camera 88A).

(1) As described above in (j), when the first projection optical system 2A and/or the second projection optical system 2B are configured to continually switch over the wavelength light that is to be emitted (for example, when the first projection optical system 2A is configured to emit only either one of the "first wavelength light" and the "second wavelength light"), the first imaging system 4A may be configured with omission of the separating mechanism of causing the predetermined output light to be subject to wavelength separation (first separating dichroic mirror 80A) and may be configured to share either one of the imaging mechanism of imaging the output light with regard to the first wavelength light and the imaging mechanism of imaging the output light with regard to the second wavelength light with omission of the other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 51A . . . first light emitter, 52A . . . second light emitter, 51B . . . third light emitter, 52B . . . fourth light emitter, 53A . . . first light isolator, 54A . . . second light isolator, 53B . . . third light isolator, 54B . . . fourth light isolator, 55A . . . first combining dichroic mirror, 56A . . . first non-polarizing beam splitter, 55B . . . second combining dichroic mirror, 56B . . . second non-polarizing beam splitter, 60 . . . polarizing beam splitter, 60a . . . first surface, 60b . . . second surface, 60c . . . third surface, 60d . . . fourth surface, 61, 62 . . . quarter wave plates, 63 . . . reference surface, 64 . . . placement structure, 80A . . . first separating dichroic mirror, 81A . . . first spectral optical system, 83A . . . quarter wave plate unit, 85A . . . first filter unit, 87A . . . first camera, 82A . . . second spectral optical system, 84A . . . quarter wave plate unit, 86A . . . second filter unit, 88A . . . second camera, 80B . . . second separating dichroic mirror, 81B . . . third spectral optical system, 83B . . . quarter wave plate unit, 85B . . . third filter unit, 87B . . . third camera, 82B . . . fourth spectral optical system, 84B . . . quarter wave plate unit, 86B . . . fourth filter unit, 88B . . . fourth camera, W . . . work

The invention claimed is:

1. A three-dimensional measurement device, comprising:
an optical system that splits incident light into two lights, radiates one of the two lights as measurement light to a measurement object and the other of the two lights as reference light to a reference surface, and recombines the two lights to emit combined light;
a first irradiator that emits first light entering the optical system;
a second irradiator that emits second light entering the optical system;
a first imaging system into which output light that is obtained from the first light and is emitted from the optical system enters;
a second imaging system into which output light that is obtained from the second light and is emitted from the optical system enters; and
an image processor that executes three-dimensional measurement of the measurement object, based on interference fringe images taken by the first imaging system and the second imaging system, wherein
the first light and the second light enter different positions of the optical system, and the output light obtained from the first light and the output light obtained from the second light are emitted from different positions of the optical system, wherein the first irradiator comprises: a first wavelength light emitter that emits first wavelength light comprising polarized light of a first wavelength; and a second wavelength light emitter that emits second wavelength light comprising polarized light of a second wavelength, and emits the first light including the polarized light of the first wavelength and the polarized light of the second wavelength, the second irradiator comprises: a third wavelength light emitter that emits third wavelength light comprising polarized light of a third wavelength; and a fourth wavelength light emitter that emits fourth wavelength light comprising polarized light of a fourth wavelength, and emits the second light including the polarized light of the third wavelength and the polarized light of the fourth wavelength, the first imaging system comprises:
a first camera that takes an image of output light obtained from the polarized light of the first wavelength, wherein the polarized light of the first wavelength is included in the output light obtained from the first light emitted from the optical system, and the first light includes the polarized light of the first wavelength and enters the optical system; and
a second camera that takes an image of output light obtained from the polarized light of the second wavelength, wherein the polarized light of the second wavelength is included in the output light obtained from the first light emitted from the optical system, and the first light includes the polarized light of the second wavelength and enters the optical system, and the second imaging system comprises:
a third camera that takes an image of output light obtained from the polarized light of the third wavelength, wherein the polarized light of the third wavelength is included in the output light obtained from the second light emitted from the optical system, and the second light includes the polarized light of the third wavelength and enters the optical system; and
a fourth camera that takes an image of output light obtained from the polarized light of the fourth wavelength, wherein the polarized light of the fourth wavelength is included in the output light obtained from the second light emitted from the optical system, and the second light includes the polarized light of the fourth wavelength and enters the optical system, the three-dimensional measurement device further comprises
at least one of:
a first filter that gives a relative phase difference between the reference light and the measurement light obtained from the polarized light of the first wavelength; and
a second filter that gives a relative phase difference between the reference light and the measurement light obtained from the polarized light of the second wavelength; and at least one of:
a third filter that gives a relative phase difference between the reference light and the measurement light obtained from the polarized light of the third wavelength; and
a fourth filter that gives a relative phase difference between the reference light and the measurement light obtained from the polarized light of the fourth wavelength, the image processor executes
at least one of:
shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and
shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and at least one of:
shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and
shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and the image processor obtains height information specified from at least one of the first measurement value and the second measurement value and at least one of the third measurement value and the fourth measurement value, as height information of the measurement object, the three-dimensional measurement device further comprises
at least one of:
a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:

a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

2. The three-dimensional measurement device according to claim 1, wherein the first irradiator comprises:

a first combining mirror that combines the first wavelength light emitted from the first wavelength light emitter and the second wavelength light emitted from the second wavelength light emitter, as the first light, the second irradiator comprises:

a second combining mirror that combines the third wavelength light emitted from the third wavelength light emitter and the fourth wavelength light emitted from the fourth wavelength light emitter, as the second light, the first imaging system comprises:

a first separating mirror that separates the output light obtained from the first light into the output light obtained from the polarized light of the first wavelength, and the output light obtained from the polarized light of the second wavelength, and the first light includes the polarized light of the first wavelength and the polarized light of the second wavelength is emitted from the first irradiator, and the second imaging system comprises:

a second separating mirror that separates the output light obtained from the second light into the output light obtained from the polarized light of the third wavelength, and the output light obtained from the polarized light of the fourth wavelength, and the second light includes the polarized light of the third wavelength and the polarized light of the fourth wavelength is emitted from the second irradiator.

3. The three-dimensional measurement device according to claim 1, wherein at least one of the first to fourth spectral optical systems comprises:

a first triangular prism that has a triangular sectional shape along a first plane and three surfaces along a direction perpendicular to the first plane, and includes a first splitting mirror arranged along a second plane, wherein the second plane goes through a line of intersection between a first surface and a second surface among the three surfaces, and the second plane is orthogonal to a third surface among the three surfaces; and a second triangular prism that has a triangular sectional shape along a third plane orthogonal to the first plane and three surfaces along a direction perpendicular to the third plane, and includes a second splitting mirror arranged along a fourth plane, wherein the fourth plane goes through a line of intersection between a first surface and a second surface among the three surfaces, and the fourth plane is orthogonal to a third surface among the three surfaces, wherein the third surface of the first triangular prism is arranged to be opposed to the first surface of the second triangular prism, wherein light entering the first surface of the first triangular prism is split in two directions by the first splitting mirror, wherein the split light reflected by the first splitting mirror is reflected at the first surface toward the third surface, and the split light transmitted through the first splitting mirror is reflected at the second surface toward the third surface, and two parallel split lights are emitted from the third surface, and the two split lights emitted from the third surface of the first triangular prism enter the first surface of the second triangular prism, and each of the two split lights is split in two directions by the second splitting mirror, wherein the two split lights reflected by the second splitting mirror are respectively reflected at the first surface toward the third surface, and the two split lights transmitted through the second splitting mirror are respectively reflected at the second surface toward the third surface, and four parallel split lights are emitted from the third surface.

4. The three-dimensional measurement device according to claim 1, wherein at least one of the first camera and the second camera includes a single imaging sensor that simultaneously takes images of the plurality of split lights transmitted through at least one of the first filter and the second filter, and at least one of the third camera and the fourth camera includes a single imaging sensor that simultaneously takes images of the plurality of split lights transmitted through at least one of the third filter and the fourth filter.

5. The three-dimensional measurement device according to claim 1, wherein the measurement object is either solder paste printed on a printed circuit board or a solder bump formed on a wafer substrate.

6. A three-dimensional measurement device, comprising:

an optical system that splits incident light into two polarized lights having polarizing directions that are orthogonal to each other, radiates one of the polarized lights as measurement light to a measurement object and the other of the polarized lights as reference light to a reference surface, and recombines the two polarized lights to emit combined light;

a first irradiator that emits first light entering the optical system;

a second irradiator that emits second light entering the optical system;

a first imaging system into which output light obtained from the first light emitted from the optical system enters;

a second imaging system into which output light obtained from the second light emitted from the optical system enters; and an image processor that executes three-dimensional measurement of the measurement object, based on interference fringe images taken by the first imaging system and the second imaging system, wherein the first light and the second light enter different positions of the optical system, and the optical system:

splits the first light into the reference light that is polarized light having a first polarizing direction and the measurement light that is polarized light having a second polarizing direction;

splits the second light into the reference light that is polarized light having the second polarizing direction and the measurement light that is polarized light having the first polarizing direction; and causes output light obtained from the first light and generated by recombining the split lights, and output light obtained from the second light and generated by recombining the split lights, to be emitted from different positions of the optical system, wherein the first irradiator:

comprises: a first wavelength light emitter that emits first wavelength light comprising polarized light of a first wavelength; and a second wavelength light emitter that emits second wavelength light comprising polarized light of a second wavelength; and emits the first light including the polarized light of the first wavelength and the polarized light of the second wavelength, the second irradiator:

comprises: a third wavelength light emitter that emits third wavelength light comprising polarized light of a third wavelength; and a fourth wavelength light emitter that emits fourth wavelength light comprising polarized light of a fourth wavelength, and emits the second light including the polarized light of the third wavelength and the polarized light of the fourth wavelength, the first imaging system comprises:

a first camera that takes an image of output light obtained from the polarized light of the first wavelength, wherein the polarized light of the first wavelength is included in the output light obtained from the first light emitted from the optical system, and the first light includes the polarized light of the first wavelength and enters the optical system; and a second camera that takes an image of output light obtained from the polarized light of the second wavelength, wherein the polarized light of the second wavelength is included in the output light obtained from the first light emitted from the optical system, and the first light includes the polarized light of the second wavelength and enters the optical system, and the second imaging system comprises:

a third camera that takes an image of output light obtained from the polarized light of the third wavelength, wherein the polarized light of the third wavelength is included in the output light obtained from the second light emitted from the optical system, and the second light includes the polarized light of the third wavelength and enters the optical system; and a fourth camera that takes an image of output light obtained from the polarized light of the fourth wavelength, wherein the polarized light of the fourth wavelength is included in the output light obtained from the second light emitted from the optical system, and the second light includes the polarized light of the fourth wavelength and enters the optical system the three-dimensional measurement device further comprises at least one of:

a first filter that gives a relative phase difference between the reference light and the measurement light obtained from the polarized light of the first wavelength; and a second filter that gives a relative phase difference between the reference light and the measurement light obtained from the polarized light of the second wavelength; and at least one of:

a third filter that gives a relative phase difference between the reference light and the measurement light obtained from the polarized light of the third wavelength; and a fourth filter that gives a relative phase difference between the reference light and the measurement light obtained from the polarized light of the fourth wavelength, the image processor executes at least one of:

shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and at least one of:

shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and the image processor obtains height information specified from at least one of the first measurement value and the second measurement value and at least one of the third measurement value and the fourth measurement value, as height information of the measurement object, the three-dimensional measurement device further comprises at least one of:

a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:

a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

7. The three-dimensional measurement device according to claim 6, wherein the first irradiator comprises:

a first combining mirror that combines the first wavelength light emitted from the first wavelength light emitter and the second wavelength light emitted from the second wavelength light emitter, as the first light, the second irradiator comprises:

a second combining mirror that combines the third wavelength light emitted from the third wavelength light emitter and the fourth wavelength light emitted from the fourth wavelength light emitter, as the second light, the first imaging system comprises:

a first separating mirror that separates the output light obtained from the first light into the output light obtained from the polarized light of the first wavelength, and the output light obtained from the polarized light of the second wavelength, and the first light includes the polarized light of the first wavelength and the polarized light of the second wavelength is emitted from the first irradiator, and the second imaging system comprises:

a second separating mirror that separates the output light obtained from the second light into the output light obtained from the polarized light of the third wavelength, and the output light obtained from the polarized light of the fourth wavelength, and the second light includes the polarized light of the third wavelength and the polarized light of the fourth wavelength is emitted from the second irradiator.

8. A three-dimensional measurement device, comprising:

an optical system that splits incident light into two lights, radiates one of the two lights as measurement light to a measurement object and the other of the two lights as reference light to a reference surface, and recombines the two lights to emit combined light;

a first irradiator that emits first light entering a first surface of the optical system:

a second irradiator that emits second light entering a second surface of the optical system;

a first imaging system into which output light obtained from the first light enters, wherein the first light is emitted from the second surface and the first light enters the first surface;

a second imaging system into which output light obtained from the second light enters, wherein the second light is emitted from the first surface and the second light enters the second surface; and an image processor that executes three-dimensional measurement of the measurement object, based on interference fringe images taken by the first imaging system and the second imaging system, wherein the first irradiator:

comprises: a first wavelength light emitter that emits first wavelength light comprising polarized light of a first wavelength; and a second wavelength light emitter that emits second wavelength light comprising polarized light of a second wavelength; and emits the first light including the polarized light of the first wavelength and the polarized light of the second wavelength, the second irradiator:
comprises: a third wavelength light emitter that emits third wavelength light comprising polarized light of a third wavelength; and a fourth wavelength light emitter that emits fourth wavelength light comprising polarized light of a fourth wavelength; and
emits the second light including the polarized light of the third wavelength and the polarized light of the fourth wavelength, the first imaging system comprises:
a first camera that takes an image of output light obtained from the polarized light of the first wavelength, wherein the polarized light of the first wavelength is included in the output light obtained from the first light emitted from the second surface, and the first light includes the polarized light of the first wavelength and enters the first surface; and
a second camera that takes an image of output light obtained from the polarized light of the second wavelength, wherein the polarized light of the second wavelength is included in the output light obtained from the first light emitted from the second surface, and the first light includes the polarized light of the second wavelength and enters the first surface, and the second imaging system comprises:
a third camera that takes an image of output light obtained from the polarized light of the third wavelength, wherein the polarized light of the third wavelength is included in the output light obtained from the second light emitted from the first surface, and the second light includes the polarized light of the third wavelength and enters the second surface; and
a fourth camera that takes an image of output light obtained from the polarized light of the fourth wavelength, which wherein the polarized light of the fourth wavelength is included in the output light obtained from the second light emitted from the first surface, and the second light includes the polarized light of the fourth wavelength and enters the second surface the three-dimensional measurement device further comprises
at least one of:
a first filter that gives a relative phase difference between the reference light and the measurement light obtained from the polarized light of the first wavelength; and
a second filter that gives a relative phase difference between the reference light and the measurement light obtained from the polarized light of the second wavelength; and
at least one of:
a third filter that gives a relative phase difference between the reference light and the measurement light obtained from the polarized light of the third wavelength; and
a fourth filter that gives a relative phase difference between the reference light and the measurement light obtained from the polarized light of the fourth wavelength, the image processor executes
at least one of:
shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and
shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and
at least one of:
shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and
shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and
the image processor obtains height information specified from at least one of the first measurement value and the second measurement value and at least one of the third measurement value and the fourth measurement value, as height information of the measurement object,
the three-dimensional measurement device further comprises
at least one of:
a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and
a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:
- a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and
- a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

9. The three-dimensional measurement device according to claim 8, further comprising:
a first beam splitter that causes at least part of the first light emitted from the first irradiator to enter the first surface, and causes at least part of the output light obtained from the second light emitted from the first surface to enter the second imaging system; and
a second beam splitter that causes at least part of the second light emitted from the second irradiator to enter the second surface, and causes a least part of the output light obtained from the first light emitted from the second surface to enter the first imaging system.

10. The three-dimensional measurement device according to claim 9,
wherein the first irradiator comprises at least one of:
a first light isolator that transmits only light in one direction emitted from the first wavelength light emitter and blocks light in a reverse direction; and
a second light isolator that transmits only light in one direction emitted from the second wavelength light emitter and blocks light in a reverse direction, and
the second irradiator comprises at least one of:
a third light isolator that transmits only light in one direction emitted from the third wavelength light emitter and blocks light in a reverse direction; and
a fourth light isolator that transmits only light in one direction emitted from the fourth wavelength light emitter and blocks light in a reverse direction.

11. The three-dimensional measurement device according to claim 8,
wherein the first irradiator comprises:
a first combining mirror that combines the first wavelength light emitted from the first wavelength light emitter and the second wavelength light emitted from the second wavelength light emitter, as the first light,
the second irradiator comprises:
a second combining mirror that combines the third wavelength light emitted from the third wavelength light emitter and the fourth wavelength light emitted from the fourth wavelength light emitter, as the second light,
the first imaging system comprises:
a first separating mirror that separates the output light obtained from the first light into the output light obtained from the polarized light of the first wavelength, and the output light obtained from the polarized light of the second wavelength, and the first light includes the polarized light of the first wavelength and the polarized light of the second wavelength is emitted from the first irradiator, and
the second imaging system comprises:
a second separating mirror that separates the output light obtained from the second light into the output light obtained from the polarized light of the third wavelength, and the output light obtained from the polarized light of the fourth wavelength, and the second light includes the polarized light of the third wavelength and the polarized light of the fourth wavelength is emitted from the second irradiator.

12. A three-dimensional measurement device, comprising:
a polarizing beam splitter that has a boundary surface that splits incident light into two polarized lights having polarizing directions orthogonal to each other, radiates one of the split polarized lights as measurement light to a measurement object and the other of the split polarized lights as reference light to a reference surface, and recombines the two split polarized lights to emit combined light;
a first irradiator that emits first light entering a first surface of the polarizing beam splitter among the first surface and a second surface of the polarizing beam splitter arranged to adjoin to each other across the boundary surface;
a second irradiator that emits second light entering the second surface of the polarizing beam splitter;
a first quarter wave plate placed between the reference surface and a third surface of the polarizing beam splitter into which the reference light enters and from which the reference light is emitted;
a second quarter wave plate placed between the measurement object and a fourth surface of the polarizing beam splitter into which the measurement light enters and from which the measurement light is emitted;
a first imaging system into which output light obtained from the first light enters, wherein the first light is emitted from the second surface and the first light enters the first surface of the polarizing beam splitter;
a second imaging system into which output light obtained from the second light enters, wherein the second light is emitted from the first surface and the second light enters the second surface of the polarizing beam splitter; and
an image processor that executes three-dimensional measurement of the measurement object, based on interference fringe images taken by the first imaging system and the second imaging system, wherein
the first irradiator:
comprises a first wavelength light emitter that emits first wavelength light comprising polarized light of a first wavelength; and a second wavelength light emitter that emits second wavelength light comprising polarized light of a second wavelength; and emits the first light including the polarized light of the first wavelength and the polarized light of the second wavelength, the second irradiator:
comprises: a third wavelength light emitter that emits third wavelength light comprising polarized light of a third wavelength; and a fourth wavelength light emitter that emits fourth wavelength light comprising polarized light of a fourth wavelength; and emits the second light including the polarized light of the third wavelength and the polarized light of the fourth wavelength, the first imaging system comprises:
a first camera that takes an image of output light obtained from the polarized light of the first wavelength, wherein the polarized light of the first wavelength is included in the output light obtained from the first light emitted from the second surface, and the first light includes he polarized light of the first wavelength and enters the first surface; and a second camera that takes an image of output light obtained from the polarized light of the second wavelength, wherein the polarized light of the second wavelength is included in the output light obtained from the first light emitted from the second surface, and the first light includes the polarized light of the second wavelength and enters the first surface, and the second imaging system comprises:
a third camera that takes an image of output light obtained from the polarized light of the third wavelength, wherein the polarized light of the third wavelength is included in the output light obtained from the second light emitted from the first surface, and the second light includes the polarized light of the third wavelength and enters the second surface; and a fourth camera that takes an image of output light obtained from the polarized light of the fourth wavelength, wherein the polarized light of the fourth wavelength is included in the output light obtained from the second light emitted from the first surface, and the second light includes the polarized light of the fourth wavelength and enters the second surface, the three-dimensional measurement device further comprises at least one of:
a first filter that gives a relative phase difference between the reference light and the measurement light obtained from the polarized light of the first wavelength; and a second filter that gives a relative phase difference between the reference light and the measurement light obtained from the polarized light of the second wavelength; and at least one of:
a third filter that gives a relative phase difference between the reference light and the measurement light obtained from the polarized light of the third wavelength; and a fourth filter that gives a relative phase difference between the reference light and the measurement light obtained from the polarized light of the fourth wavelength, the image processor executes
at least one of:
shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and at least one of:
shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and the image processor obtains height information specified from at least one of the first measurement value and the second measurement value and at least one of the third measurement value and the fourth measurement value, as height information of the measurement object, the three-dimensional measurement device further comprises at least one of:
a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:
a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

13. The three-dimensional measurement device according to claim 12, further comprising:

a first beam splitter that causes at least part of the first light emitted from the first irradiator to enter the first surface, and causes at least part of the output light obtained from the second light emitted from the first surface to enter the second imaging system; and a second beam splitter that causes at least part of the second light emitted from the second irradiator to enter the second surface and causes a least part of the output light obtained from the first light emitted from the second surface to enter the first imaging system.

14. The three-dimensional measurement device according to claim 13, wherein the first irradiator comprises at least one of:

a first light isolator that transmits only light in one direction emitted from the first wavelength light emitter and blocks light in a reverse direction; and a second light isolator that transmits only light in one direction emitted from the second wavelength light emitter and blocks light in a reverse direction, and the second irradiator comprises at least one of:

a third light isolator that transmits only light in one direction emitted from the third wavelength light emitter and blocks light in a reverse direction; and a fourth light isolator that transmits only light in one direction emitted from the fourth wavelength light emitter and blocks light in a reverse direction.

15. The three-dimensional measurement device according to claim 12, wherein the first irradiator comprises:

a first combining mirror that combines the first wavelength light emitted from the first wavelength light emitter and the second wavelength light emitted from the second wavelength light emitter, as the first light, the second irradiator comprises:

a second combining mirror that combines the third wavelength light emitted from the third wavelength light emitter and the fourth wavelength light emitted from the fourth wavelength light emitter, as the second light, the first imaging system comprises:

a first separating mirror that separates the output light obtained from the first light into the output light obtained from the polarized light of the first wavelength, and the output light obtained from the polarized light of the second wavelength, and the first light includes the polarized light of the first wavelength and the polarized light of the second wavelength is emitted from the first irradiator, and the second imaging system comprises:

a second separating mirror that separates the output light obtained from the second light into the output light obtained from the polarized light of the third wavelength, and the output light obtained from the polarized light of the fourth wavelength, and the second light includes the polarized light of the third wavelength and the polarized light of the fourth wavelength is emitted from the second irradiator.

16. A three-dimensional measurement device, comprising:

a first irradiator that emits first light;

a second irradiator that emits second light;

a first polarizing beam splitter that splits the first light entering from the first irradiator into two polarized lights having polarizing directions orthogonal to each other, radiates one of the polarized lights as measurement light to a measurement object and the other of the polarized lights as reference light to a reference surface, and combines measurement light obtained from the second light entering via the measurement object with reference light obtained from the second light entering via the reference surface to emit combined light;

a second polarizing beam splitter that splits the second light entering from the second irradiator into two polarized lights having polarizing directions orthogonal to each other, radiates one of the polarized lights as measurement light to the measurement object and the other of the polarized lights as reference light to the reference surface, and combines measurement light obtained from the first light entering via the measurement object with reference light obtained from the first light entering via the reference surface to emit combined light;

a first quarter wave plate placed between the first polarizing beam splitter and the reference surface;

a second quarter wave plate placed between the first polarizing beam splitter and the measurement object;

a third quarter wave plate placed between the second polarizing beam splitter and the reference surface;

a fourth quarter wave plate placed between the second polarizing beam splitter and the measurement object;

a first imaging system into which output light obtained from the first light enters, wherein the first light is emitted from the second polarizing beam splitter and the first light enters the first polarizing beam splitter;

a second imaging system into which output light obtained from the second light enters, wherein the second light is emitted from the first polarizing beam splitter and the second light enters the second polarizing beam splitter; and an image processor that executes three-dimensional measurement of the measurement object, based on interference fringe images taken by the first imaging system and the second imaging system, wherein the first irradiator:

comprises: a first wavelength light emitter that emits first wavelength light comprising polarized light of a first wavelength; and a second wavelength light emitter that emits second wavelength light comprising polarized light of a second wavelength; and emits the first light including the polarized light of the first wavelength and the polarized light of the second wavelength, the second irradiator:
comprises: a third wavelength light emitter that emits third wavelength light comprising polarized light of a third wavelength; and a fourth wavelength light emitter that emits fourth wavelength light comprising polarized light of a fourth wavelength, and emits the second light including the polarized light of the third wavelength and the polarized light of the fourth wavelength, the first imaging system comprises:
a first camera that takes an image of output light obtained from the polarized light of the first wavelength, wherein the polarized light of the first wavelength is included in the output light obtained from the first light emitted from the second polarizing beam splitter, and the first light includes the polarized light of the first wavelength and enters the first polarizing beam splitter; and a second camera that takes an image of output light obtained from the polarized light of the second wavelength, wherein the polarized light of the second wavelength is included in the output light obtained from the first light emitted from the second polarizing beam splitter, and the first light includes the polarized light of the second wavelength and enters the first polarizing beam splitter, and the second imaging system comprises:
a third camera that takes an image of output light obtained from the polarized light of the third wavelength, wherein the polarized light of the third wavelength is included in the output light obtained from the second light emitted from the first polarizing beam splitter, and the second light includes the polarized light of the third wavelength and enters the second polarizing beam splitter; and a fourth camera that takes an image of output light obtained from the polarized light of the fourth wavelength, wherein the polarized light of the fourth wavelength is included in the output light obtained from the second light emitted from the first polarizing beam splitter, and the second light includes the polarized light of the fourth wavelength and enters the second polarizing beam splitter, the three-dimensional measurement device further comprises
at least one of:
a first filter that gives a relative phase difference between the reference light and the measurement light obtained from the polarized light of the first wavelength; and
a second filter that gives a relative phase difference between the reference light and the measurement light obtained from the polarized light of the second wavelength; and at least one of:
a third filter that gives a relative phase difference between the reference light and the measurement light obtained from the polarized light of the third wavelength; and
a fourth filter that gives a relative phase difference between the reference light and the measurement light obtained from the polarized light of the fourth wavelength, the image processor executes
at least one of:
shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and at least one of:
shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and the image processor obtains height information specified from at least one of the first measurement value and the second measurement value and at least one of the third measurement value and the fourth measurement value, as height information of the measurement object, the three-dimensional measurement device further comprises
at least one of:
a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:
- a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and
- a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

17. A three-dimensional measurement device, comprising:
- a polarizing beam splitter that has a boundary surface that transmits or reflects polarizing light having a first polarizing direction and that reflects or transmits polarized light having a second polarizing direction;
- a first irradiator that emits first light that comprises the polarized light having the first polarizing direction and that enters a first surface of the polarizing beam splitter among the first surface and a second surface of the polarizing beam splitter arranged to adjoin to each other across the boundary surface;
- a second irradiator that emits second light that includes the polarized light having the second polarizing direction and that enters the second surface of the polarizing beam splitter;
- a quarter wave plate arranged to be opposed to a predetermined surface of the polarizing beam splitter from which the first light transmitted through or reflected by the boundary surface and the second light reflected by or transmitted through the boundary surface are emitted;
- a half mirror that is arranged to be opposed to the quarter wave plate on an opposite side to the polarizing beam splitter, transmits part of light radiated via the quarter wave plate as measurement light, and radiates the measurement light to a measurement object, while reflecting the remaining of the light as reference light;
- a first imaging system to which output light obtained from the first light enters, wherein the first light is emitted from the second surface and the first light enters the first surface of the polarizing beam splitter;
- a second imaging system to which output light obtained from the second light enters, wherein the second light is emitted from the first surface and the second light enters the second surface of the polarizing beam splitter; and
- an image processor that executes three-dimensional measurement of the measurement object, based on interference fringe images taken by the first imaging system and the second imaging system, wherein the first irradiator:
- comprises: a first wavelength light emitter that emits first wavelength light comprising polarized light of a first wavelength; and a second wavelength light emitter that emits second wavelength light comprising polarized light of a second wavelength; and
- emits the first light including the polarized light of the first wavelength and the polarized light of the second wavelength, the second irradiator:
- comprises: a third wavelength light emitter that emits third wavelength light comprising polarized light of a third wavelength; and a fourth wavelength light emitter that emits fourth wavelength light comprising polarized light of a fourth wavelength, and
- emits the second light including the polarized light of the third wavelength and the polarized light of the fourth wavelength, the first imaging system comprises:
- a first camera that takes an image of output light obtained from the polarized light of the first wavelength, wherein the polarized light of the first wavelength is included in the output light obtained from the first light emitted from the second surface, and the first light includes the polarized light of the first wavelength and enters the first surface; and
- a second camera that takes an image of output light obtained from the polarized light of the second wavelength, wherein the polarized light of the second wavelength is included in the output light obtained from the first light emitted from the second surface, and the first light includes the polarized light of the second wavelength and enters the first surface, and the second imaging system comprises:
- a third camera that takes an image of output light obtained from the polarized light of the third wavelength, wherein the polarized light of the third wavelength is included in the output light obtained from the second light emitted from the first surface, and the second light includes the polarized light of the third wavelength and enters the second surface; and
- a fourth camera that takes an image of output light obtained from the polarized light of the fourth wavelength, wherein the polarized light of the fourth wavelength is included in the output light obtained from the second light emitted from the first surface, and the second light includes the polarized light of the fourth wavelength and enters the second surface, the three-dimensional measurement device further comprises at least one of:
- a first filter that gives a relative phase difference between the reference light and the measurement light obtained from the polarized light of the first wavelength; and
- a second filter that gives a relative phase difference between the reference light and the measurement light obtained from the polarized light of the second wavelength; and at least one of:
- a third filter that gives a relative phase difference between the reference light and the measurement light obtained from the polarized light of the third wavelength; and a fourth filter that gives a relative phase difference between the reference light and the measurement light obtained from the polarized light of the fourth wavelength, the image processor executes at least one of:
shape measurement of the measurement object by a phase shift method, based on multiple different interference fringe images of the output light obtained from the polarized light of the first wavelength taken by the first camera and the output light obtained from the polarized light of the first wavelength is subjected to multiple phase shifts by the first filter, to obtain a measurement value of the shape measurement as a first measurement value; and shape measurement of the measurement object by the phase shift method, based on multiple different interference fringe images of the output light obtained from the polarized light of the second wavelength taken by the second camera and the output light obtained from the polarized light of the second wavelength is subjected to multiple phase shifts by the second filter, to obtain a measurement value of the shape measurement as a second measurement value; and at least one of:
shape measurement of the measurement object by the phase shift method, based on multiple different interference fringe images of the output light obtained from the polarized light of the third wavelength taken by the third camera and the output light obtained from the polarized light of the third wavelength is subjected to multiple phase shifts by the third filter, to obtain a measurement value of the shape measurement as a third measurement value; and shape measurement of the measurement object by the phase shift method, based on multiple different interference fringe images of the output light obtained from the polarized light of the fourth wavelength taken by the fourth camera and the output light obtained from the polarized light of the fourth wavelength is subjected to multiple phase shifts by the fourth filter, to obtain a measurement value of the shape measurement as a fourth measurement value; and the image processor obtains height information specified from at least one of the first measurement value and the second measurement value and at least one of the third measurement value and the fourth measurement value, as height information of the measurement object, the three-dimensional measurement device further comprises at least one of:
a combination of a first spectral optical system that splits the output light obtained from the polarized light of the first wavelength into a plurality of split lights, and a first filter as the first filter that gives respectively different phase differences to at least a required number of split lights required for measurement by the phase shift method among the plurality of split lights split by the first spectral optical system; and a combination of a second spectral optical system that splits the output light obtained from the polarized light of the second wavelength into a plurality of split lights, and a second filter as the second filter that gives respectively different phase differences to at least a required number of split lights required for measurement by the phase shift method among the plurality of split lights split by the second spectral optical system; and at least one of:
a combination of a third spectral optical system that splits the output light obtained from the polarized light of the third wavelength into a plurality of split lights, and a third filter as the third filter that gives respectively different phase differences to at least a required number of split lights required for measurement by the phase shift method among the plurality of split lights split by the third spectral optical system; and a combination of a fourth spectral optical system that splits the output light obtained from the polarized light of the fourth wavelength into a plurality of split lights, and a fourth filter as the fourth filter that gives respectively different phase differences to at least a required number of split lights required for measurement by the phase shift method among the plurality of split lights split by the fourth spectral optical system, at least one of the first camera and the second camera simultaneously takes images of the plurality of split lights transmitted through at least one of the first filter and the second filter, and at least one of the third camera and the fourth camera simultaneously takes images of the plurality of split lights transmitted through at least one of the third filter and the fourth filter.

* * * * *